US008856723B2

(12) United States Patent
Lam

(10) Patent No.: US 8,856,723 B2
(45) Date of Patent: *Oct. 7, 2014

(54) APPARATUS AND METHOD FOR NETWORK DRIVER INJECTION INTO TARGET IMAGE

(71) Applicant: Mandy Sui Mei Lam, Fremont, CA (US)

(72) Inventor: Mandy Sui Mei Lam, Fremont, CA (US)

(73) Assignee: WYSE Technology L.L.C., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/778,711

(22) Filed: Feb. 27, 2013

(65) Prior Publication Data

US 2013/0179856 A1    Jul. 11, 2013

Related U.S. Application Data

(63) Continuation of application No. 12/824,029, filed on Jun. 25, 2010, now Pat. No. 8,407,662.

(51) Int. Cl.
| G06F 9/44 | (2006.01) |
| H04L 29/08 | (2006.01) |
| G06F 9/445 | (2006.01) |
| H04L 12/24 | (2006.01) |

(52) U.S. Cl.
CPC .......... *H04L 29/08981* (2013.01); *H04L 67/34* (2013.01); *G06F 9/4411* (2013.01); *G06F 8/63* (2013.01); *G06F 9/44505* (2013.01); *H04L 41/0873* (2013.01)
USPC ........... 717/100; 717/121; 717/122; 717/168; 717/169; 717/170; 717/171; 717/172; 717/173; 709/220; 709/221; 709/222

(58) Field of Classification Search
None
See application file for complete search history.

(56) References Cited

U.S. PATENT DOCUMENTS

| 5,918,039 | A | 6/1999 | Buswell et al. |
| 6,681,323 | B1 * | 1/2004 | Fontanesi et al. ................. 713/1 |
| 6,718,463 | B1 * | 4/2004 | Malik ............................... 713/2 |
| 6,804,774 | B1 * | 10/2004 | Larvoire et al. ................... 713/2 |
| 7,330,967 | B1 * | 2/2008 | Pujare et al. ...................... 713/2 |
| 7,558,867 | B2 * | 7/2009 | Le et al. ........................ 709/230 |
| 7,630,341 | B2 | 12/2009 | Buddhikot et al. |

(Continued)

OTHER PUBLICATIONS

International Search Report and Written Opinion, International Searching Authority, PCT/US2011/031290, Jun. 17, 2011.

(Continued)

*Primary Examiner* — Don Wong
*Assistant Examiner* — Roberto E Luna
(74) *Attorney, Agent, or Firm* — Baker Botts L.L.P.

(57) ABSTRACT

A method provides network driver injection into a target image to transform the target image to be compatible with one or more source machines, for facilitating operating system streaming over a network. The method may include: facilitating access to a source system registry file of a source machine; facilitating access to a target system registry file of the target image, without copying the target image; determining whether source network interface cards of the source machine are compatible with the target image; and if the source network interface cards are not compatible with the target image, performing network interface driver injection into the target image. The target image may include an operating system. A machine-readable storage medium and apparatus are provided. A method is described for building a program for providing network driver injection into a target image to transform the target image to be compatible with computing machines.

17 Claims, 24 Drawing Sheets

(56) References Cited

U.S. PATENT DOCUMENTS

| | | |
|---|---|---|
| 7,644,140 B2 | 1/2010 | Lee et al. |
| 8,037,198 B2 * | 10/2011 | Le et al. ............. 709/230 |
| 8,209,680 B1 * | 6/2012 | Le et al. ............. 717/174 |
| 8,301,874 B1 | 10/2012 | Heidingsfeld et al. |
| 8,417,796 B2 * | 4/2013 | Crosbie ............. 709/220 |
| 2002/0065872 A1 * | 5/2002 | Genske et al. ............. 709/202 |
| 2005/0010918 A1 | 1/2005 | Childs et al. |
| 2005/0229175 A1 | 10/2005 | McCrory et al. |
| 2005/0235280 A1 * | 10/2005 | Le et al. ............. 717/173 |
| 2006/0173781 A1 | 8/2006 | Donner |
| 2007/0283343 A1 * | 12/2007 | Aridor et al. ............. 717/174 |
| 2009/0006449 A1 | 1/2009 | MacLeod et al. |
| 2009/0043890 A1 | 2/2009 | Noonan, III |
| 2009/0282128 A1 * | 11/2009 | Le et al. ............. 709/219 |
| 2009/0282157 A1 * | 11/2009 | Le et al. ............. 709/230 |
| 2010/0037041 A1 | 2/2010 | Joshi et al. |
| 2010/0037207 A1 | 2/2010 | Chambers et al. |
| 2010/0257349 A1 * | 10/2010 | Lee ............. 713/2 |
| 2011/0072118 A1 | 3/2011 | Day et al. |
| 2011/0320799 A1 * | 12/2011 | Lam ............. 713/2 |

OTHER PUBLICATIONS

"Common Image Guide"; Ardence™ 3.5.1, Document Rec 02, pp. 1-7, Jun. 2006.

"Plug and Play Device Driver Deployment in Windows Vista and Windows Server 2008"; Versions 1.1; pp. 1-21, Jan. 26, 2006.

Mansell; "New way to Upgrade with PVS 5.1 and HyperV"; The Citrix Blog, Citrix Community, Jul. 28, 2009.

"Administrators Guide"; Wyse WSM™, Issue 122107, 2007.

* cited by examiner

APPARATUS AND METHOD FOR NETWORK DRIVER INJECTION INTO TARGET IMAGE

CROSS-REFERENCE TO RELATED APPLICATIONS

This application is a continuation of pending U.S. patent application Ser. No. 12/824,029 filed on Jun. 25, 2010; the contents of which is incorporated in its entirety by reference.

FIELD

The subject technology relates in general to virtual disk images, driver injection or streaming, and more particularly to apparatus and method for network driver injection into a target image.

BACKGROUND

In one aspect, operating system (OS) streaming is a technology to boot a computer (or a virtual machine) from an image file stored on a network. The actual operating system may be centrally located on a server and may stream to a client device on demand. In one aspect, such an image file may be sometimes referred to as a "virtual disk."

Typically, a virtual disk created from a specific device can be streamed to multiple devices if they bear the same hardware characteristics. More specifically, the motherboard, the network adapter and the video card must be the same in this typical scenario. Being able to use a single virtual disk to boot multiple devices greatly simplifies information technology (IT) department's maintenance effort and cost. For example, to perform Windows updates, a system administrator only needs to apply the changes on the centrally located common virtual disk once. All client devices booted from this virtual disk will receive the changes.

SUMMARY

Various aspects of the disclosure relate to methods, apparatuses, machine-readable storage media encoded with instructions, computer programs, and/or other means for providing network driver injection into a target image. In one aspect of the disclosure, a machine-readable storage medium may be encoded with instructions that may be executable by a processing system to perform a method for providing network driver injection into a target image. In one aspect, the method may transform the target image to be compatible with one or more source machines. In one aspect, the method may facilitate operating system streaming over a network.

The instructions may comprise code for some or all of the following: facilitating access to a source system registry file of a source machine; facilitating access to a target system registry file of the target image, without copying the target image; determining whether one or more source network interface cards of the source machine are compatible with the target image; and if the one or more source network interface cards are not compatible with the target image, performing network interface driver injection. The target image may comprise an operating system.

The operation of performing network interface driver injection may comprise some or all of the following: determining one or more source network components associated with the one or more source network interface cards; determining source network configuration of the one or more source network components; determining target network configuration of one or more target network components of the target image; determining whether the source network configuration conflicts with the target network configuration; if the source network configuration conflicts with the target network configuration, adjusting the source network configuration so that the source network configuration does not conflict with the target network configuration; and injecting, to the target system registry file, the source network configuration of the one or more source network components.

The operation of performing network interface driver injection may further comprise facilitating copying of one or more files associated with the one or more source network components of the source machine onto the target image.

In yet a further aspect of the disclosure, a method may build a computer program for providing network driver injection into a target image. In one aspect, this may transform the target image to be compatible with one or more computing machines. In one aspect, the method may facilitate operating system streaming over a network.

The method may comprise some or all of the following: selecting a first computing machine and a second computing machine, wherein the first computing machine comprises a first network interface card, the second computing machine comprises a second network interface card, wherein configuration of the second network interface card is different from configuration of the first network interface card; building a first virtual disk image of the first computing machine; building a second virtual disk image that is compatible with the first computing machine and the second computing machine; booting the first computing machine using the first virtual disk image; extracting first system registry information of the first computing machine after booting the first computing machine using the first virtual disk image, the first system registry information comprising configuration values for the first network interface card based on the first virtual disk image; booting the first computing machine using the second virtual disk image; extracting second system registry information of the first computing machine after booting the first computing machine using the second virtual disk image, the second system registry information comprising configuration values for the first network interface card and the second network interface card based on the second virtual disk image; determining network driver injection components based on differences between the first system registry information and the second system registry information and based on registries that do not affect network functionalities; injecting the network driver injection components into the first virtual disk image; and producing the computer program based on the network driver injection components.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1A:
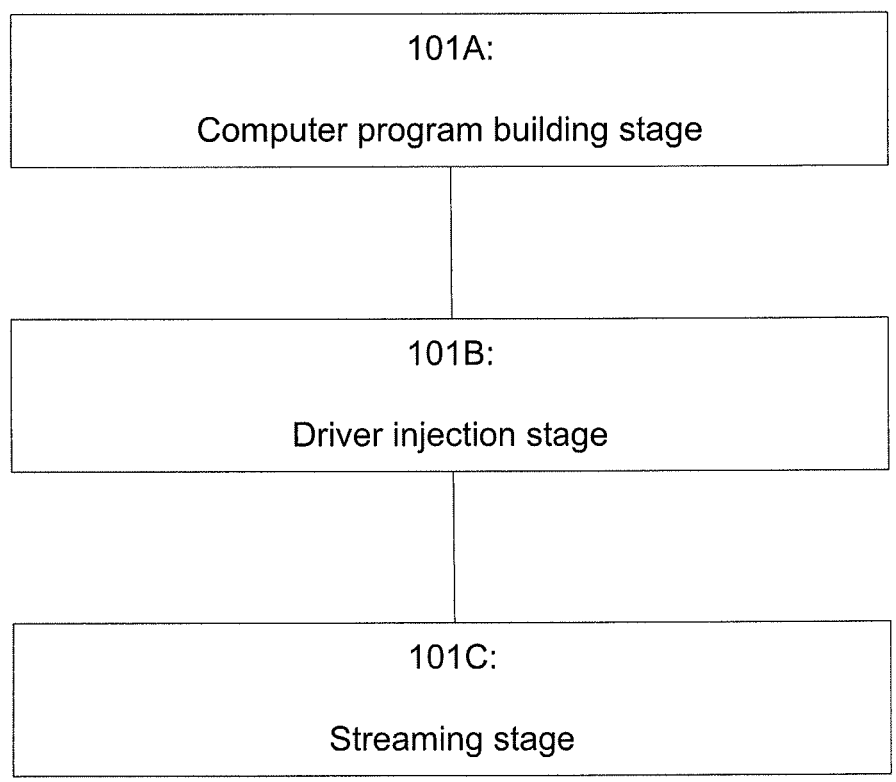
FIG. 1A is a conceptual block diagram illustrating an example of stages of operations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Overview

An aspect of the disclosure provides using driver injection to enhance an existing virtual disk image to support multiple heterogeneous platforms for streaming.

Since it is very rare that there is only one type of platform in any OS streaming deployment, it is desirable to have a single virtual disk image streamable to multiple client platforms bearing different hardware characteristics. In one aspect, such a virtual disk image may be sometimes referred to as a "golden" image.

In one aspect, the subject technology enables a user to inject OS streaming related drivers and configurations into an existing virtual disk image to support multiple heterogeneous platforms for OS streaming The resulting virtual disk image becomes a "golden" image.

The importance of a golden image may be exemplified in the scenario described below:

On an OS streaming deployment, a customer may have 100 client devices scattered in nine branch offices. The 100 devices are purchased from 10 different manufacturers/models. If a golden image is not available, the customer needs to create 10 different virtual disk images, each supporting a unique hardware platform. A typical VDisk image is 10 GB in size.

To deploy OS streaming on all branch offices, the customer needs to distribute all 10 VDisk images from the headquarters to all nine branch offices. That is 10*10 GB*9=900 GB of data traveling on wire, which is typically low-bandwidth channels. To keep the images up to date with latest OS patches, each of the 10 VDisk images needs to be updated from the headquarters. The changes applied on all 10 images would then need to be pushed to each branch office, again on low-bandwidth channels.

If a golden image is available, the customer only needs to create a single virtual disk image supporting all 10 platforms (and 100 client devices). To deploy OS streaming on all branch offices, the customer would need to distribute only one VDisk image from the headquarters to the nine branch offices. That is 10 GB*9=90 GB of data traveling on wire, which is ten times less than without a golden image. To keep the image up to date with latest OS patches, the changes need to be applied on only the single golden image and distributed to the branch offices subsequently.

Obviously, the capability to create a golden image supporting multiple heterogeneous platforms greatly improves the usability of OS streaming, and truly achieves scalability on an enterprise level.

Illustration of Various Approaches

A first approach enables a user to create a golden virtual disk image to support multiple heterogeneous platforms for OS streaming. This approach, however, requires installation of a common network interface card (e.g., a network adapter) on each source platforms during the virtual disk creation process. It involves opening up each source platform and finding a spare bus interface slot to accommodate the new network interface card. It is challenging to common users and often not feasible on platforms where a spare bus slot is not available, which is the case on most laptops. It is also not desirable because opening up a computer chassis may void the manufacturer's warranty. This approach also requires all source platforms to have OS installation that uses the same hardware abstraction layer (HAL).

An aspect of the subject technology overcomes the drawbacks of the foregoing approach. For example, an aspect of the subject technology does not require a common network interface card among different source platforms, does not require a user to open up each source platform, and does not require a spare bus slot to insert a new network interface card. In addition, an aspect of the subject technology does not require all source platforms to have the same HAL.

A second approach enables a user to create a golden virtual disk image to support multiple heterogeneous platforms for OS streaming. This approach helps a user to prepare an OS installation on a physical hard disk, which contains all drivers for all source platforms before capturing a snapshot of the hard disk installation into a virtual disk image. The process involves backing up a hard disk OS installation of one platform to a file (e.g., a wup file), restoring the file from the first source platform to a non-active partition of a second source platform. The process also involves booting the second source platform from the "restored" partition and installing drivers for the second source platform. The resulting hard disk OS installation, which resides on the "restored" partition, contains all drivers from both the first and the second source platforms. Such backup and restore process needs to be repeated on all source platforms.

The repeated backup and restore process is long and tedious. It often may take hours to create a golden image for three to four platforms. It also requires each source platform, except the first, to have at least two hard disk partitions, one for boot up and another for restore (e.g., a wup file). If source platforms have an operating system pre-installed on a single partition, a user needs to remove the existing installation, re-partition the hard disk and re-install the OS first. This approach also requires all source platforms to have OS installation on a hard disk that uses the same hardware abstraction layer (HAL).

An aspect of the subject technology overcomes the drawbacks of the foregoing second approach. For example, an aspect of the subject technology does not require multiple hard disk partitions on any source platforms, does not require copying of an entire hard disk image onto a source platform, and does not require copying of an entire operating system image onto a source platform. In addition, an aspect of the subject technology does not require all source platforms to have the same HAL. In accordance with one aspect of the disclosure, while the foregoing features are not required, the subject technology can also function in the presence of the foregoing drawbacks.

A third approach utilizes a process to create a common virtual disk image between a physical device and a virtual machine. This method can create a common virtual disk for only a single platform and a virtual machine. It does not achieve the goal of creating a single virtual disk for any number of heterogeneous hardware platforms.

An aspect of the subject technology overcomes the drawbacks of the foregoing third approach. For example, an aspect of the subject technology can create a golden virtual disk image for any number of heterogeneous hardware platforms.

A fourth approach uses a method of preinstalling plug-and-play (PnP) drivers into an offline Windows OS image to be deployed to new hardware. An original equipment manufacturer (OEM) or corporate IT staff may utilize this method. This method can be utilized on a Windows image targeted to boot a hard disk physically attached to a target device only. It, however, cannot be used on a virtual disk image, which resides on the network, since a virtual disk image residing on a network needs a network interface card bound to an OS streaming driver designed specifically to support OS streaming This fourth approach does not inject the binding relationship between the network interface card and the OS streaming driver, and hence cannot be used on a virtual disk image. Furthermore, this approach supports only a plug-and-play driver.

Illustration of Various Advantages

An aspect of the subject technology overcomes the drawbacks of the foregoing fourth approach. For example, an aspect of the subject technology can support injecting a network interface card driver and corresponding network components onto plug-and-play interfaces as well as non plug-and-play interfaces.

In accordance with one aspect of the disclosure, the subject technology can provide, among others, the following advantages.

1. An aspect of the subject technology can enable a user to enhance an existing virtual disk image to support multiple source platforms (e.g., multiple client devices) that have heterogeneous hardware characteristics for OS streaming 2. An aspect of the subject technology can allow any number of additional source platforms to be added at any time to utilize an existing virtual disk image.

3. In one aspect, a virtual disk image can support an unlimited number of platforms.

4. An aspect of the subject technology does not require additional hardware and does not involve manipulation on the physical hardware.

5. An aspect of the subject technology does not require re-installing or re-configuring of an existing operating system.

6. An aspect of the subject technology does not require replicating the entire OS installation.

7. An aspect of the subject technology provides a fast process. The process may take only a matter of seconds, rather than hours, on each additional platform to support.

8. An aspect of the subject technology is less error prone. For example, there is no need to know or remember the exact bus interface slot to insert a common network interface card, and there is no need to know or remember the long sequence of backing up and restoring OS installation.

9. An aspect of the subject technology can be used on most computer platforms. For example, there is no additional hard disk capacity, network interface card, spare bus slot or any other hardware requirements beyond what a normal (hard disk) OS installation requires.

Illustration of Code/Pseudo Code Representation

Shown below is an aspect of the subject technology written in C++ programming language, but the subject technology is not limited to C++ and can be written in other programming languages. Some examples of subroutines, functions, data structures and defines are shown below, and some of these are referred to later in this disclosure.

```
#define    Net Device class      // This is a global unique identifier (GUID) for Net
Device class devices as defined by Microsoft
#define    NDIS LAN class        // This is a GUID for NDIS LAN class devices as
defined by Microsoft
// type of NETNODE
enum  nodetype_t  {
       ntype_NIC,    // physical network interface card
       ntype_OSMNS,  // OS streaming driver
       ntype_UPPER   // other OS network component such as an NDIS intermediate
                        driver that is bound to OS streaming driver on the
upper edge                      (e.g., packet scheduler driver);
};
typedef struct _NETNODE {
       struct _NETNODE    *pUpper;             // pointer to upper bound NETNODE
       nodetype_t    nType;
       DWORD         dwBusType;       // bus type
       CString       csComponentID;   // ComponentId registry value
       CString       csGUID;          // NetCfgInstanceID registry value
       CString       csDriverDesc;    // DriverDesc registry value
       CString       csOldInfPath;    // inf file (driver installation file) name used in source
                                            platform
       CString       csNewInfPath;// inf file (driver installation file) name to be used in
Target
       CString       csOldNetClassSubKey; // subkey under "class\<Net Device class >"
                                            in source platform
       CString       csNewNetClassSubKey; // subkey under "class\<Net Device class >"
                                            in Target
       BOOL          bToBeInjected;         // This is 1 if this node is to be injected into Target
       CString       csEnumKey;       // Enum key path,
       CString       csOldBusSpecificID; // Enum subkey in source platform
       CString       csNewBusSpecificID; // Enum subkey to be used in Target, for PCI
device                                      this does not change, for others it may
change to                                      a different number
       CString       csService;       // service name
       CString       csOldDeviceClassKey; // subkey under "DeviceClasses\<NDIS LAN
                                            class>"
       CString       csNewDeviceClassKey; // if csOldBusSpecificID is the same as
                                            csNewBusSpecificID, this value is
                                            csOldDeviceClassKey.
Otherwise the
"#<csOldBusSpecificID>#" token is changed to
"#<csNewBusSpecificIC>#" token
       CString       csDeviceInstanceID;
}NETNODE, *PNETNODE;
typedef struct _INSTANCES {
       DWORD         dwOrigLastInstance;
       DWORD         dwNewLastInstance;
}INSTANCES, *PINSTANCES;
class CInject
{
public:
       CString       m_SrcDir;        // drive letter assigned to the System volume of a Source
Platform OR a path where the system configurations, driver binaries and installation files of
the Source Platform can be found. (e.g., "c:\")
CString        m_DstDir;       // drive letter assigned to the System volume of a Target VDisk
OR a path where the network component information of the Target VDisk can be found
(e.g., "f:\")
       CString       m_csSrcSysKey;   // registry key root path under which the Source
                                            Platform's system information is
loaded.
       CString       m_csDstSysKey;   // registry key root path under which the Target
                                            VDisk's system information is loaded.
       DWORD         m_InjectCount;   // number of NIC from the Source Platform to be
                                            injected to the Target
       CPtrList      m_SrcNICNodeList;  // linked list of PNETNODEs from Source
Platform
       CPtrList      m_DstNICNodeList;  // linked list of PNETNODEs from Target
VDisk
       CMapStringToPtr    m_EnumInstanceList; // map from Enum key string to
                                                  PINSTANCES
       CMapStringToPtr    m_NetworkInstanceList;    // map from Network Description
to                                                  PINSTANCES
}
CInject( );
       virtual ~CInject( );
       int CheckNICCompatibility(LPCTSTR srcKey, LPCTSTR dstKey, CString&
errMsg);
       BOOL EnumWSMNIC(LPCTSTR csSysKey, CPtrList& nList, CString& errMsg);
       BOOL AddNICNode(LPCTSTR csSysKey, CPtrList& nList, CString& nicGUID,
```

```
        CString& errMsg);
    BOOL FoundMatch(CPtrList& nList, PNETNODE pTargetNode);
    BOOL InjectDriver(const CString& winDir, const CString& dstDir, CString&
errMsg);
    BOOL InjectWSMNIC(CString& errMsg);
private:
    PNETNODE BuildNetNode(nodetype_t nType, LPCTSTR classSubKey,
CRegKeyEx& classKey);
    void FreeNetNode(PNETNODE pNode);
    BOOL FindEnumEntry(LPCTSTR csSysKey, LPCTSTR key, PNETNODE pNode,
        DWORD recurseLevel = 1);
    PNETNODE FindUpper(CString& csSysKey, PNETNODE pNode, nodetype_t
upperType);
    BOOL FindDeviceClassEntry(CString& csSysKey, PNETNODE pNode);
    DWORD FindLastSubKey(LPCTSTR regKey);
    void AssignNewNetClassSubKey(PNETNODE pNode, DWORD *dwLastSubKey);
    BOOL AssignNewBusSpecificID(LPCTSTR csSysKey, PNETNODE pNode);
    BOOL AssignNewDeviceClassKey(PNETNODE pNode);
    BOOL TallyNetworkDescriptionInstances(LPCTSTR csSysKey, PNETNODE
pNode);
    int FindLastStringValue(LPCTSTR regKey, LPCTSTR regValue);
    BOOL AssignNewInfPath(PNETNODE pNode, CString& dstDir, int
*pLastOEMInfCount);
    int FindLastOEMInf(CString& csDir);
    BOOL CopyInfFile(PNETNODE pNode, CString& csSrcDir, CString& csDstDir);
    BOOL CopyDriverFile(PNETNODE pNode, CString& csSrcDir, CString&
csSrcSysKey, CString& csDstDir);
    BOOL MergeNetClassSubKeys(PNETNODE pNode, CString& csSrcSysKey,
CString& csDstSysKey);
    BOOL MergeDeviceClassesSubKeys(PNETNODE pNode, CString& csSrcSysKey,
CString& csDstSysKey);
    BOOL MergeEnumSubKeys(PNETNODE pNode, CString& csSrcSysKey, CString&
csDstSysKey);
    LONG MyRegCopyTree(HKEY hSrcKey, LPCTSTR srcSubKey, HKEY
hDstSubKey, LPCTSTR dstSubKeyPath, CString& errMsg);
    LONG MyRegCreateKey(HKEY hRootKey, CString& csKey, PDWORD
pdwExpectedDeposition, PHKEY phKey);
    BOOL MyRegChangeValue(HKEY hKey, LPCTSTR subKey, LPCTSTR
valueName, LPCTSTR oldValue, LPCTSTR newValue);
    BOOL MyRegChangeValue(HKEY hKey, LPCTSTR subKey, LPCTSTR
valueName, DWORD oldValue, DWORD newValue);
    BOOL MyRegChangeValue(HKEY hKey, LPCTSTR subKey, LPCTSTR
valueName, CStringArray& oldValue, CStringArray& newValue);
    LONG AddLinkage(PNETNODE pNode, CString& csRefGUID, CString&
csSysKey);
    LONG AddLinkage(PNETNODE pNode, CString& csRefGUID, CRegKeyEx&
rKey);
    LONG AddLinkage(PNETNODE pNode, CString& csRefGUID, CRegKeyEx&
rKey, LPCTSTR szRegValue);
    LONG AdjustLana(HKEY hSvcKey);
    LONG AddSvcInterfaces(PNETNODE pNode, CString& csRefGUID, CString&
csSrcSysKey, CString& csDstSysKey);
    LONG AddSvcInterfacesDo(CString& csNewGUIDKeyName, LPCTSTR szSubKey,
CString& csSrcSvcXParamKeyPath, HKEY hDstParamKey);
    int FindRefSubKey(HKEY hKey, LPCTSTR csSubKey, CString& csRefGUID,
CString& csNewGUID, CString& csNewGUIDKeyName);
    LONG AddRemoteAccessInterfaces(PNETNODE pNode, CString& csSrcSysKey,
CString& csDstSysKey);
};
```

Illustration of Terminology

In accordance with one aspect of the subject technology, some of the terms are described below with examples.

Streaming Component: In one aspect, a streaming component may include, for example, a software package to be installed on a machine such as a client device to enable the machine to communicate with an OS streaming server over a network, so that the machine can be booted from a virtual disk image that resides on the network. An example of a streaming component is the WSM Client software, which is a streaming manager product of Wyse. Another example is Citrix's provisioning server product, called the Master Target Device software.

Compatible: In one aspect, the term compatible may be used to describe a relationship between multiple entities, such as between a virtual disk image and a client device. Two entities may be considered compatible if, for example, one entity can be booted using the other entity. A virtual disk image and a client device may be considered to be compatible if, for example, the client device can be booted from the virtual disk image through OS streaming Two entities may be considered incompatible if, for example, one entity cannot be booted using the other entity. A virtual disk image and a client device may be considered to be incompatible if, for example, the client device cannot be properly booted from the virtual disk image through OS streaming.

Source Platform (or Source): In one aspect, a Source Platform, Source, source platform, or source may be a device or a machine, and in one aspect, it can be a physical device or machine, or a virtual device or machine. For example, it may be a computing machine or a computer, which a user would like to make a virtual disk image be compatible with. In one example, it may be referred to as a client device or a client. In one aspect, a Source Platform may be referred to as a source machine. Sometimes the terms platform, device and machine are used interchangeably in this disclosure.

Target Platform: In one aspect, a Target Platform may be a device or a machine. For example, it may be a server on which a Target VDisk resides or a server from which a Target VDisk is streamed to a Source Platform(s). In one aspect, a Target Platform may be referred to as a target machine. In one aspect, a Target VDisk does not necessarily reside in a Target Platform. For example, a Target VDisk can appear as a file residing in a Source Platform or on a Development Machine. Thus, a Target VDisk may reside on a Target Platform (e.g., 304 in FIG. 3) or on another machine. In one aspect, the term "target" may refer to a target in a general sense (e.g., a component that is being handled currently by a process).

Target VDisk (or Target): In one aspect, a Target VDisk, Target, Target Vdisk, VDisk, target VDisk, or target vdisk may describe a virtual disk or a virtual disk image. A virtual disk image may be, for example, a software image into which support for a Source Platform is to be added so that the virtual disk image can become compatible with the Source Platform. In one aspect, a Target VDisk may be referred to as a target image. In one example, a Target VDisk may be an image file stored on a network. In one aspect, a Target VDisk may be used for driver injection and/or streaming.

Development Machine: In one aspect, a Development Machine or a development machine is a physical or virtual device or machine. For example, a Development Machine may be utilized to perform driver injection (e.g., the driver injection stage 101B of FIG. 1). A Development Machine may be a Source Platform or another machine. In one aspect, a Development Machine may even be a Target Platform.

In one aspect, a Development Machine simply needs access to certain system information of a Source Platform and certain associated network file(s). Accordingly, in one aspect, a Development Machine does not need to be the Source Platform (even though it may be the Source Platform). In one aspect, a Development Machine does not need to store a disk image of the Source Platform (even though it may store the disk image). In one aspect, a Development Machine does not need to store a copy of the system information or the associate network file(s) needed by the Development Machine or any other information or file of the Source Platform (even though it may do so). In one aspect, the system information of a Source Platform may include network configuration of the network component(s) of a Source Platform (e.g., the network configuration information under HKLM\SYSTEM\CurrentControlSet\ and certain other network configuration information such as the location of the associated files). In one aspect, the associated network files may include driver installation file(s) and driver binary file(s) of the network component(s) of a Source Platform.

In one aspect, a Development Machine simply needs access to certain system information of a Target VDisk. Accordingly, in one aspect, a Development Machine does not need to store a copy of the Target VDisk (even though it may store the Target VDisk). In one aspect, a Development Machine does not need to store a copy of the system information of the Target VDisk, any associate network file(s), or any other information or file(s) of the Target VDisk (even though it may do so). In one aspect, the system information of a Target VDisk may include network configuration of the network component(s) of a Target VDisk (e.g., the network configuration information under HKLM\{_SYSTEM_}\ControlSet00x\ and certain other network configuration information such as the location of the associated files). In one aspect, the associated network files may include driver installation file(s) and driver binary file(s) of the network component(s) of a Target VDisk.

In one aspect, some of the advantages of not copying the disk image, the system information or the files may be the following: First, it can accelerate the driver injection process by not having this step. Second, if there are any changes to the disk image, the system information or the files, the updated disk image, system information or files can become automatically available to a Development Machine, without the need to update the copy on the Development Machine.

NIC: In one aspect, a NIC may refer to a network interface card. In one aspect, a NIC can be a physical hardware, or a virtual hardware when a Source Platform is a virtual machine.

Figure 11:
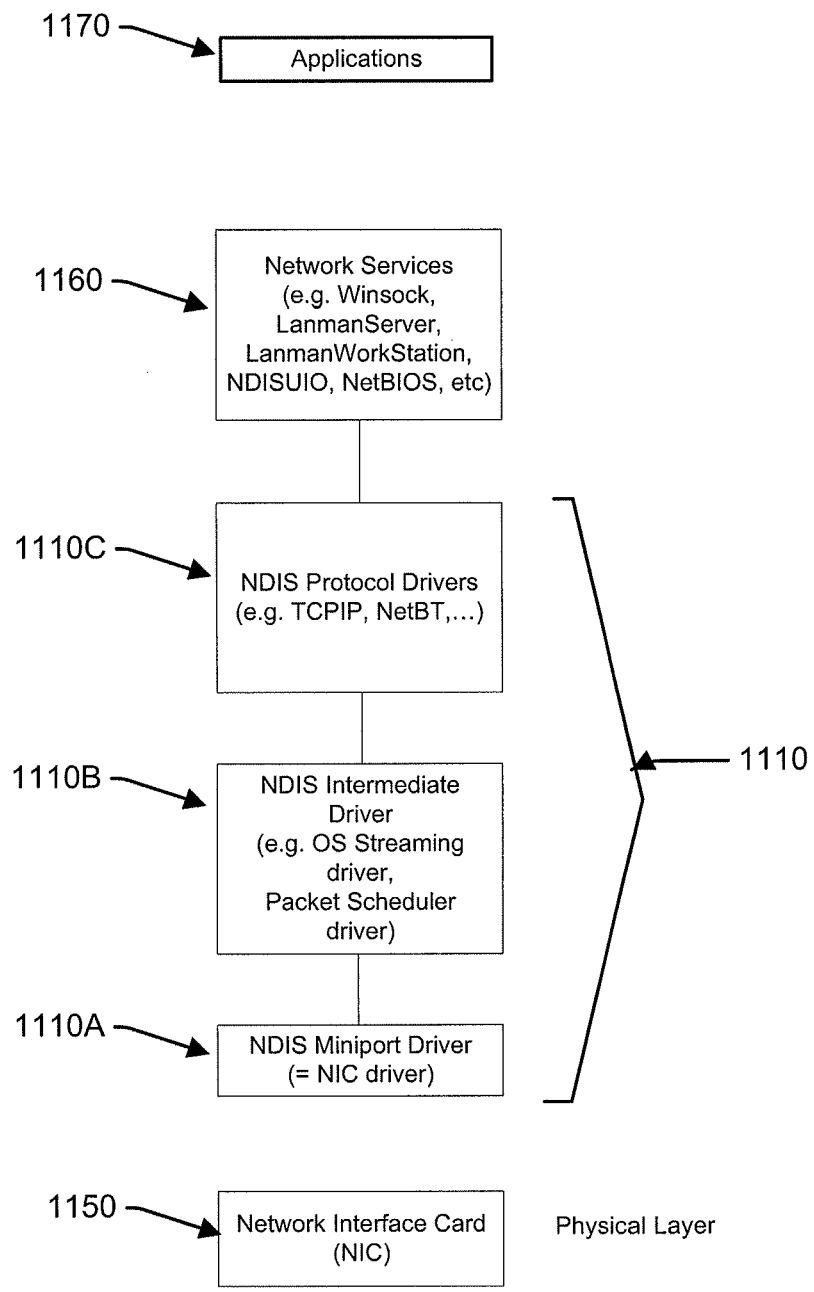
FIG. 11 is a conceptual block diagram illustrating an example of various network-related software layers and a network-related hardware physical layer on a machine.

Network Component: In one aspect, a network component may be a component relating to a network(s). A network component may be, for example, a network driver interface specification (NDIS) miniport driver 1110A (e.g., an NIC driver), an NDIS intermediate driver 1110B, an NDIS protocol driver 1110C, an NDIS protocol driver 1110C, or a network service 1160, as shown in FIG. 11. In one aspect, a network component is a software module or a software driver related to a network interface card, which is hardware. In one aspect, a network component resides in a layer between a physical hardware layer and an application layer. See FIG. 11.

System Registry File: In one aspect, a System registry file or system registry file may be system information. For example, a system registry file may contain configuration information, setup information or system registry information. In one aspect, a system registry file may be editable. In one aspect, a system registry file may contain at least some of network configuration. In one aspect, a system registry file for a source machine may be referred to as a source system registry file. In one aspect, a system registry file for a target image may be referred to as a target system registry file.

Network Configuration: In one aspect, network configuration may include configuration information associated with network component(s). An example of a description about network configuration is provided below with reference to operation 1020 in FIG. 10 under the subheading "Illustration of Performing Network Interface Driver Injection."

Driver Injection: In one aspect, the term Driver Injection or driver injection may refer to a process of injecting one or more network components (e.g., one or more drivers or one or more driver components). In one example, after applying this process from the Source Platform onto a Target VDisk, the resulting Target VDisk may become compatible with the Source Platform. The process may involve injecting information of selected network components present in a Source Platform into a Target VDisk. The selected network components may be referred to as "to-be-injected" components.

NetNode structure: In one aspect, each selected network component of the Source Platform and Target VDisk may be described by an instance of this data structure referred to as NetNode (or sometimes referred to as NETNODE or netnode). This structure may have fields that may describe the characteristics and binding relationship of its network component with other network component(s). For example, this structure may include a display name, the type of interface bus, a global unique identifier assigned by the operating system to the component, the installation file used to install the driver for this component, the registry key paths under which various information of this component can be found, a pointer to another NetNode structure which this component is bound to in the operating system's network stack. An example of a NetNode structure is shown above in C++ code within the structure named "typedef struct_NETNODE { ... }".

System Volume: In one aspect, a System volume (or a system volume) may be the disk volume where an operating system's system files and system information reside. For example, in Windows OS, this is where the kernel binaries and the system registry hive file are located.

HKLM: In one aspect, the term HKLM may refer to HKEY_LOCAL_MACHINE (see item 210 in FIG. 2). For example, in Windows OS, this is a pre-defined registry handle under which settings specific to the local computer is stored.

Figure 5:
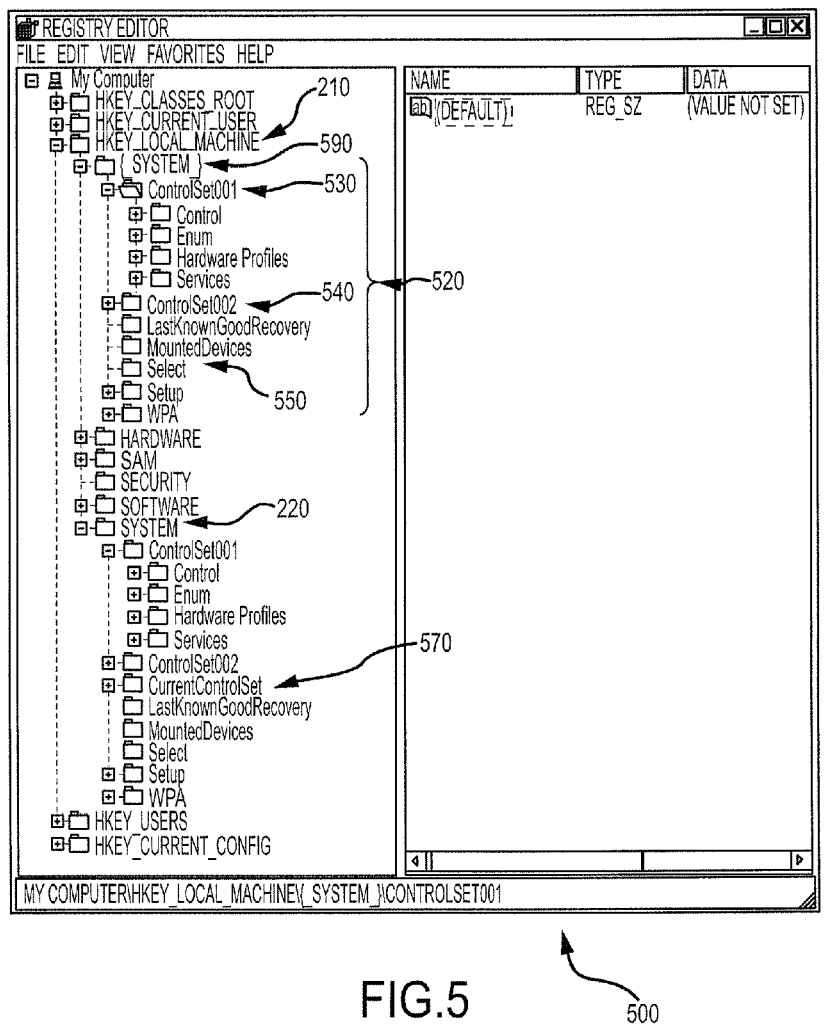
FIG. 5 illustrates an example of a screen shot of a registry editor 500 showing various operating system registries that may be utilized by a Windows OS on a machine or Source Platform.

In some examples used in this disclosure, the current system registry hive name of a Source Platform may indicate a registry key path under which a Source Platform's system information is loaded. For example, the current system registry hive name of a Source Platform may be referred to as "HKLM\SYSTEM\CurrentControlSet." "HKLM\SYSTEM\CurrentControlSet" may be sometimes referred to as "SYSTEM\CurrentControlSet". In another example, the current system registry hive name of a Source Platform may be referred to as "HKLM\{_SRCSYSTEM_}\ControlSet00x" where x is an integer. In one aspect, the name of the registry key path under which a Source Platform's system information is loaded can be another name, and it is not limited to the above examples. In some examples used in this disclosure, a current system registry hive name of a Target VDisk may indicate a registry key path under which the Target VDisk's system information is loaded. For example, the current system registry hive name of a Target VDisk may be referred to as "HKLM\{_SYSTEM_}\ControlSet00x", where x is an integer (or x is the "Select" registry value 550 in FIG. 5).

"HKLM\{_SYSTEM_}\ControlSet00x" may be sometimes referred to as "{_SYSTEM_}\ControlSet00x". In one aspect, the name of the registry key path under which a Target VDisk's system information is loaded can be another name, and it is not limited to the above example.

While, in one aspect, it may be preferable to load (rather than to store) the Source Platform's system information and the Target VDisk's system information onto a Development Machine, in another aspect, the Source Platform's system information and the Target VDisk's system information may be stored in a Development Machine.

Below describes examples of some of the major functions of the CInject class.

InjectDriver: In one aspect, the InjectDriver function may be the top most function in CInject class. The InjectDriver function can check compatibility between multiple entities such as a Source Platform and a Target VDisk. If the two entities are not compatible, this function may perform the Driver Injection process to make the two entities compatible. This function may take two input parameters:

winDir may be the drive letter assigned to the System volume of a Source Platform or a path where the System configurations (e.g., network component information), driver binaries and installation files of the Source Platform can be found.

dstDir may be the drive letter assigned to the System volume of a Target VDisk or a path where the network component information of the Target VDisk can be found This function may return TRUE if succeeds, or FALSE otherwise CheckNICCompatibility: In one aspect, the function CheckNICCompatibility may check compatibility of NIC between multiple entities such as a Source Platform and a Target VDisk.

This function may take two input parameters:
   dstKey: This may be a registry key path to a Target VDisk's system information (e.g., "HKLM\{_SYSTEM_}\ControlSet001") (see item 530 in FIG. 5)
   srcKey: This may be a registry key path to a Source Platform's system information (e.g., "HKLM\SYSTEM\CurrentControlSet") (see item 230 in FIG. 2 or item 570 in FIG. 5)

This function may return −1 if fails; otherwise,
   it may return the total number of NICs in a Source Platform that is not compatible with NICs in a Target.
   it may return 0 if all NICs in the Source Platform are supported in the Target This function can construct mSrcNICNodeList and mDstNICNodeList, which are linked lists of NETNODEs describing streaming related network components of the Source Platform and Target VDisk, respectively.

InjectWSMNIC: In one aspect, this function InjectWSMNIC may inject OS streaming and NIC related registries from a Source to a Target. This function can also copy a NIC driver binary file and a NIC driver installation file from a Source to a Target. This function may require some variables in the CInject class be set correctly before being called:
   m_SrcDir, m_DstDir, m_csSrcSysKey, m_csDstSysKey, m_osvi: In one aspect, these variables are predetermined and set before this function is performed.
   m_SrcNICNodeList, m_DstNICNodeList: In one aspect, these variables are constructed and filled with streaming related network component information before this function is performed.

This function may return TRUE if succeeds, or FALSE if fails.

Below describes examples of some of the helper functions for the functions described above:

EnumWSMNIC: In one aspect, this function EnumWSMNIC may enumerate the registry csSysKey to get a list of NICs whose drivers are currently bound to a network component such as the OS streaming driver. It constructs a NETNODE for each NIC found and adds it to "nList".

This function may take two input parameters:
   csSysKey: This may be a registry key root path in which the Source Platform's or Target VDisk's system information is stored. (e.g., "HKLM\SYSTEM\ CurrentControlSet\"). The function EnumWSMNIC may evaluate information under this path to extract NIC and associated drivers information.
   nList: This may be a linked list of NETNODE to which the result is to be added.

This function may return TRUE if succeeds, or FALSE if fail.

BuildNetNode: In one aspect, this function BuildNetNode may create a NETNODE, fills in the content according to values under classKey registry.

This function may take three input parameters:
   classKey: This may be a registry key handle under which the net node belongs. In one aspect, ClassKey should have been opened with read access.

classSubKey: This may be a string describing the path of classKey handle (e.g., "HKLM\System\CurrentControlSet\ . . . \<Net Device class>\000x")

nType: This may be a constant of nodetype_t (e.g., ntype_NIC)

This function may return a pointer to a newly created and filled NETNODE structure. In the example shown below, the fields of a NETNODE structure are filled in:

csDriverDesc: value read from "<classKey>\\DriverDesc" registry csGUID: value read from "<classKey>\\NetCfgInstanceID" registry csOldInfPath: value read from "<classKey>\\InfPath" registry csComponentID: value read from "<classKey>\\ComponentId" registry dwBusType: value deduced from "<classKey>\\BusType" registry nType: value equal to input parameter nType csOldNetClassSubKey: value equal to input parameter classSubKey FindEnumEntry: In one aspect, this function FindEnumEntry may find an entry under the "Enum" registry key where a network component described by pNode belongs. This function enumerates all keys under <csSysKey>\Enum, reads the "Driver" registry values under each subkey, and tries to find a match on "<Net Device class>\<pNode->csOldNetClassSubKey>"

This function may take three input parameters:

csSysKey: This may be a registry key root path under which the source platform's or Target VDisk's system information is stored (e.g., "HKLM\SYSTEM\CurrentControlSet\"). This value stays the same on each recursive call.

key: This may be a registry subkey under which the search should begin. This parameter changes on each recursive call, going deeper and deeper into the "Enum" registry tree.

pNode: This may be a pointer to a NETNODE structure describing a target network component.

If a target network component is found, the function FindEnumEntry fills up csEnumKey, csOldBusSpecificID, csService fields in pNode, where csEnumKey is the "Enum" key under which target network component is found, csOldBusSpecificID is the subkey under csEnumKey where target network component is found, csService is a string value of "Service" registry under <csSysKey>\<csEnumKey>\<csOldBusSpecificID>.

FindUpper: In one aspect, this function FindUpper may find the upper node of a target network component. The upper node is the network component currently bound to a target network component from the upper edge in the operating system's network stack. This function looks into the Net Device class key and locates a subkey which "RootDevice" contains target node's GUID.

This function may take three input parameters:

csSysKey: This may be a registry key root path under which the source platform's or Target VDisk's system information is stored (e.g., "HKLM\SYSTEM\ControlSet\").

pNode: This may be a pointer to a NETNODE that describes a target network component of which the upper node is to be located.

upperType: This may be a type of resulting upper node. If found, the function creates a new NETNODE for the upper component, fills in the content of the NETNODE, and returns a pointer to a newly created NETNODE. Otherwise this function returns NULL.

FindDeviceClassEntry: In one aspect, this function FindDeviceClassEntry may find the Device Class registry entry for a target network component. This function looks into the NDIS LAN class key and locates a subkey value that matches a target node's GUID. The parent key of the above subkey is the Device Class entry.

This function may take two input parameters:

csSysKey: This may be a registry key root path under which the source platform's or Target VDisk's system information is stored (e.g., "HKLM\SYSTEM\ControlSet\").

pNode: This may be a pointer to NETNODE that describes a target network component of which the Device Class registry entry is to be located.

If found, the function returns TRUE and fills in the csOldDeviceClassKey field of the target NETNODE to the parent key name. Otherwise, the function returns FALSE.

FindLastSubKey: In one aspect, this function FindLastSubKey may find the last subkey index under regKey. This function may take one input parameter:

regKey: This may be a string describing the registry key of which the last subkey is to be returned.

This function returns a numeric number indicating the current last subkey under regKey.

AssignNewNetClassSubKey: In one aspect, a function AssignNewNetClassSubKey may recursively assign the next NetClass subkey number to a to-be-injected network component and its upper nodes.

NetClass is a subkey under registry key "HKLM\{_SYSTEM_}\ControlSet00x\Control\Class\<Net Device class>". Each functional network component registered to the OS is represented by a subkey under such key. Subkeys are arranged in 4-digits consecutive numeric strings (e.g., "0000", "0001", "0002", . . . ). A new network component registered to the OS occupies the next number up subkey. A network component at a Source can be injected to a Target by copying its NetClass registry trees from the Source to a valid unused NetClass subkey in the Target. This function finds out the valid unused subkey to be used in Target.

This function may take two input parameters:

pNode: This may be a pointer to a NETNODE whose new NetClass subkey number is to be assigned.

pdwLastSubKey: This may be a pointer to a buffer storing the last NetClass subkey index used.

This function may assign the last NetClass subkey index+1 to the csNewNetClassSubKey field of NETNODE pointed by pNode then increases the last NetClass subkey index. The same operation may be performed to a target net node and its upper nodes recursively.

AssignNewBusSpecificID: In one aspect, this function AssignNewBusSpecificID may recursively assign newBusSpecificID to a to-be-injected network component and its upper nodes.

For example, in Windows OS, the Enum registry key contains the subkeys for specific hardware components a computer uses. The OS uses this information to allocate resources (e.g., IO addresses and interrupt numbers for the components). Each controller bus type has its own subkey under the "Enum" key (e.g., "PCI", "ROOT"). The "PCI" subkey contains entries for the plug-and-play equipment on a peripheral component interconnect (PCI) bus. Each PCI equipment is represented by a registry key under the PCI subkey, bearing the manufacturer (or vendor) and product ID of the equipment. Information of a specific PCI equipment instance is stored under a subkey representing the bus locations. Hence, the full path for hardware equipment under the "Enum" registry key is constructed by its bus type (PCI), hardware ID, and bus specific ID. If a to-be-injected network component is a PCI device, its bus specific ID stays the same after it is moved to the Target because the component sits on the same PCI bus slot.

The "ROOT" subkey contains entries for legacy, non plug-and-play hardware. Equipment instances under the "ROOT" device subkey are arranged by 4-digits consecutive numeric string (e.g., "0000", "0001" etc). Such numeric subkey string is its bus specific ID. If a to-be-injected network component is a ROOT device, it occupies a new bus specific ID bearing the next number up subkey in the Target.

This function may take two input parameters:
   csSysKey: This may be a registry key root path under which the Target's system information is loaded (e.g., "HKLM\{_SYSTEM_}\ControlSet00x\")
   pNode: This may be a pointer to a NETNODE whose new bus specific ID is to be assigned.

This function returns TRUE if succeeds. It also fills in the csNewBusSpecificID field of the NETNODE pointed by pNode.

AssignNewDeviceClassKey: In one aspect, this function AssignNewDeviceClassKey may recursively assign the csNewDeviceClassKey value to a to-be-injected network component and its upper nodes.

If a target network component's csOldBusSpecificID is equal to csNewBusSpecificID, csNewDeviceClassKey value is the same as csOldDeviceClassKey.

Otherwise the "#<csOldBusSpecificID>#" token within the old csOldDeviceClassKey value is changed to "#<csNewBusSpecificIC>#" token, which becomes its csNewDeviceClassKey value.

This function may take one input parameter:
   pNode: This may be a pointer to a NETNODE whose csNewDeviceClassKey is to be set csOldBusSpecificID and csNewBusSpecificID of target NETNODE must have been set before calling this function.

This function returns TRUE if succeeds. csNewDeviceClassKey of target NETNODE is filled in.

TallyNetworkDescriptionInstances: In one aspect, this function TallyNetworkDescriptionInstances tallies the number of Driver Description instances that will appear in a Target VDisk after injecting a network component and its upper nodes. This function stores the information in a string to pointer mapping list, m_NetworkInstanceList. During driver injection, information in m_NetworkInstanceList is used to update the "Descriptions" registry key under "<System registry hive name>\Class\Network\<Net Device class>" registry key at Target.

This function may set up m_NetworkInstanceList to prepare for the update.

This function may take two input parameters:
   csSysKey: This may be a registry key root path under which a Target's system information is loaded (e.g., "HKLM\{_SYSTEM_}\ControlSet00x\"). This function looks up registry under this key to determine the current number of instances for target network components.
   pNode: This may be a pointer to a NETNODE describing network component to be injected.

AssignNewInfPath: In one aspect, this function AssignNewInfPath may set the csNewInfPath field of a to-be-injected net node. This is the path where the OS would find the installation file for a target component after it is moved to the Target.

Windows OS stores all driver installation files under "Windows \inf" folder of the system volume. Windows' native drivers bear a unique name that is different than others (e.g., netpsa.inf for a packet scheduler driver). Installation files provided by third party vendors will be renamed to, e.g., oemx.inf, where x is a unique number that exists in the current device.

The driver installation file for a network component from a third party vendor may bear a different oem.inf number after copying from a Source to a Target. This function finds out the last oem.inf number used in the Target, and assign the next number up for the driver installation file of a to-be-injected network component and its upper nodes.

This function may take three input parameters:
   pNode: This may be a pointer to a NETNODE describing a network component to be injected.
   dstDir: This may be a drive letter of Target's system volume or a path where the driver installation files of the Target VDisk can be found
   pLastOEMInfCount: This may be a pointer to a buffer storing the last oem.inf file number found under dstDir.

This function returns TRUE if succeeds. pNode->csNewInfPath is filled in. A buffer pointed by pLastOEMInfCount is updated.

CopyInfFile: In one aspect, this function CopyInfFile may copy a driver installation file for a to-be-injected network component from a Source to a Target unless an inf file already exists in the Target. The inf file name at the Source is recorded in the csOldInfPath of a NETNODE structure. The inf file name to be used after copying to the Target is recorded in the csNewInfPath of a NETNODE structure.

This function may take three input parameters:
   pNode: This may be a pointer to a NETNODE describing a network component whose driver installation file is to be copied.
   csSrcDir: This may be a root drive to copy a driver installation file from (e.g., "c:\").
   csDstDir: This may be a root drive to copy a driver installation file to (e.g., "f:\").

CopyDriverFile: In one aspect, this function CopyDriverFile may copy a driver binary file for a to-be-injected network component from a Source to a Target unless the driver file already exists in the Target.

This function may take four input parameters:
   pNode: This may be a pointer to a NETNODE describing a network component whose driver file is to be copied.
   csSrcDir: This may be a root drive to copy a driver file from (e.g., "c:\").
   csDstDir: This may be a root drive to copy a driver file to (e.g., "f:\").
   csSrcSysKey: This may be a registry key root path under which a Source Platform's system information is loaded (e.g., "HKLM\SYSTEM\CurrentControlSet\").

This function reads the "ImagePath" registry value of a "Service" key for a target component to find the driver file name and path.

MergeNetClassSubKeys: In one aspect, this function MergeNetClassSubKeys may merge the "csSrcSysKey\Class\<Net Device class>" subkeys of the to-be-injected network component (and its uppers) to Target.

This function may perform the following:
   1. Copy registry tree "csSrcSysKey\Control\Class\<Net Device class>\<csOldNetClassSubKey>" to "csDstSysKey\Control\Class\<Net Device class>\<csNewNetClassSubKey>"
   2. Change registry value "InfPath" from <csOldInfPath> to <csNewInfPath> under new registry key at Target This function may take three input parameters:
  pNode: This may be a pointer to a NETNODE describing a network component whose registry is to be merged.
  csSrcSysKey: This may be a registry key root path under whose Source Platform's system information is loaded (e.g., "HKLM\SYSTEM\CurrentControlSet\").
  csDstSysKey: This may be a registry key root path under which a Target's system information is loaded (e.g., "HKLM\{_SYSTEM_}\ControlSet00x\").

This function returns TRUE if succeeds, or FALSE otherwise.

MergeDeviceClassSubKeys: In one aspect, this function MergeDeviceClassSubKeys may merge the NDIS LAN class subkeys of the to-be-injected network component (and its uppers) from a Source to a Target.

This function may perform the following:
  1. Copy registry tree "csSrcSysKey\Control\DeviceClasses\<NDIS LAN class>\<csOldDeviceClassKey>" to "csDstSysKey\Control\DeviceClasses\<NDIS LAN class>\<csNewDeviceClassKey>"
  2. if pNode->csOldBusSecificID !=pNode->csNewBusSpecificID, replace:
    a. "#<csOldBusSpecificID>#" token to "#<csNewBusSpecificID>#" in "symbolicname" value of the #<csGUID>subkey
    b. "<csEnumKey-"Enum\">\\csOldBusSpecificID" token to "<csEnumKey-"Enum\">\\csNewBusSpecificID" in "Device Instance" value This function may take three input parameters:
  pNode: This may be a pointer to a NETNODE describing a network component whose registry is to be merged.
  csSrcSysKey: This may be a registry key root path under which a Source Platform's system information is loaded (e.g., "HKLM\SYSTEM\CurrentControlSet\").
  csDstSysKey: This may be a registry key root path under which a Target's system information is loaded (e.g., "HKLM\{_SYSTEM_}\ControlSet00x\").

This function returns TRUE if succeeds, FALSE otherwise

MergeEnumSubKey: In one aspect, this function MergeEnumSubKey may merge the Enumsubkeys of the to-be-injected network component (and its uppers) from a Source to a Target.

This function may perform the following:
  1. Copy "Enum" registry key (value and all subkeys) from a Source to a Target. Source Enum subkey name is in csOldBusSpecificID. Target Enum subkey name is in csNewBusSpecificID.
  2. If csOldNetClassSubKey !=csNewNetClassSubKey, update registry value "Driver" from "<Net Device class>\\csOldOldClassSubKey" to "<Net Device class>\\csOldNewClassSubKey"
  3. If csOldBusSpecificID !=csNewBusSpecificID, update registry value "Device Parameters\InstanceIndex" from csOldBusSpecificID+1 to csNewBusSpecificID+1

This function may take three input parameters:
  pNode: This may be a pointer to a NETNODE describing a network component whose registry is to be merged.
  csSrcSysKey: This may be a registry key root path under which a Source Platform's system information is loaded (e.g., "HKLM\SYSTEM\CurrentControlSet\").
  csDstSysKey: This may be a registry key root path under which a Target's system information is loaded (e.g., "HKLM\{_SYSTEM_}\ControlSet00x\").

This function returns TRUE if succeeds, or FALSE otherwise.

AddLinkage: In one aspect, this function AddLinkage may enumerate all "services" registry keys at a Target. If a subkey's existing "linkage\bind", "linkage\Route" and "linkage\Export" values contain csRefGUID, this function constructs a similar string by replacing csRefGUID to csGUID of the to-be-injected network component, then adds a new string into the "linkage\bind", "linkage\Route" and "linkage\Export" registry values. This is to bind the new NIC and/or network component to those services.

This function may take three input parameters:
  pNode: This may be a pointer to a NETNODE describing a network component, which is to be linked into existing network services in a Target.
  csRefGUID: This may be a GUID of a reference NIC that has already been linked to appropriate network services in the Target.
  csDstSysKey: This may be a registry key root path under which the Target's system information is loaded (e.g., "HKLM\{_SYSTEM_}\ControlSet00x\").

This function returns ERROR_SUCCESS if succeeds, or an error code if fails.

AddSvcInterfaces: In one aspect, this function AddSvcInterfaces may enumerate subkeys under "services" registry keys at a Target. If the key name matches the csRefGUID value, this function constructs a similar key name for a target NIC by replacing csRefGUID to target NIC's GUID. This function then looks for this key from a Source. If found, the function copies the whole key from the Source to the Target This function may take four input parameters:
  pNode: This may be a pointer to a NETNODE describing a network component, which is to be linked into existing network services in the Target.
  csRefGUID: This may be a GUID of a reference NIC.
  csSrcSysKey: This may be a registry key root path under which a Source Platform's system information is loaded (e.g., "HKLM\SYSTEM\CurrentControlSet\").
  csDstSysKey: This may be a registry key root path under which a Target's system information is loaded (e.g., "HKLM\{_SYSTEM_}\ControlSet00x\").

This function returns ERROR_SUCCESS if succeeds, or an error code if fails.

AddRemoteAccessInterfaces: In one aspect, this function AddRemoteAccess Interfaces may add an interface to a Target's Remote Access service registry key to represent the new NIC. This function may perform the following:
  1. Find a registry subkey containing registry value "InterfaceName" that is the same as the target NIC node's GUID under "Services\RemoteAccess\Interfaces" at a Source.
  2. Find the last subkey number under "Services\RemoteAccess\Interfaces" at the Target.
  3. Copy the registry values and subkeys found at the Source to "Services\RemoteAccess\Interfaces\<last subkey#>+1" at the Target.

This function may take three input parameters:
  pNode: This may be a pointer to a NETNODE describing a network component, which is to be added to a Remote Access service in the Target.
  csSrcSysKey: This may be a registry key root path under which a Source Platform's system information is loaded (e.g., "HKLM\SYSTEM\CurrentControlSet\").
  csDstSysKey: This may be a registry key root path under which a Target's system information is loaded (e.g., "HKLM\{_SYSTEM_}\ControlSet00x\").

This function returns ERROR_SUCCESS if succeeds, or an error code if fails.

Organization of Illustrations

Figure 6A:
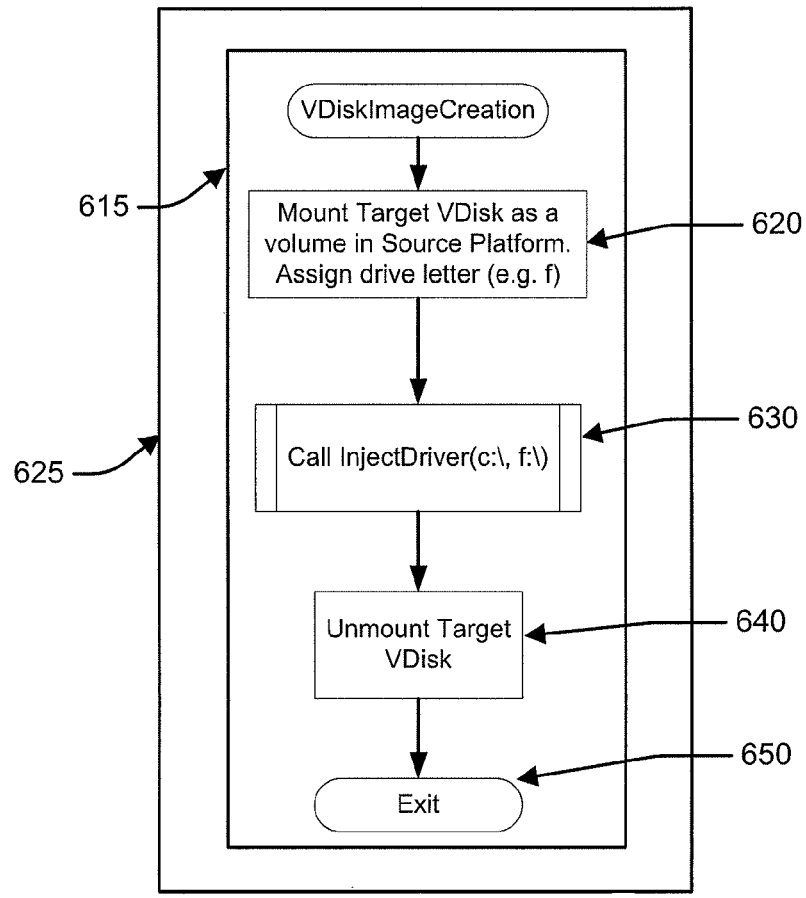
FIG. 6A is a conceptual flow diagram illustrating an example of a method for driver injection.
Figure 6B:
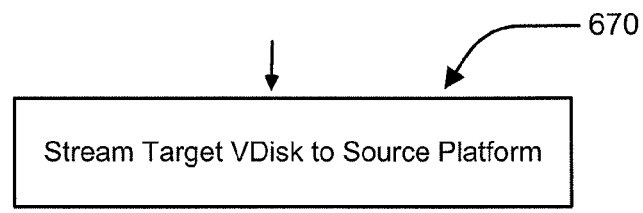
FIG. 6B is a conceptual flow diagram illustrating an example of a method for streaming.
Figure 7:
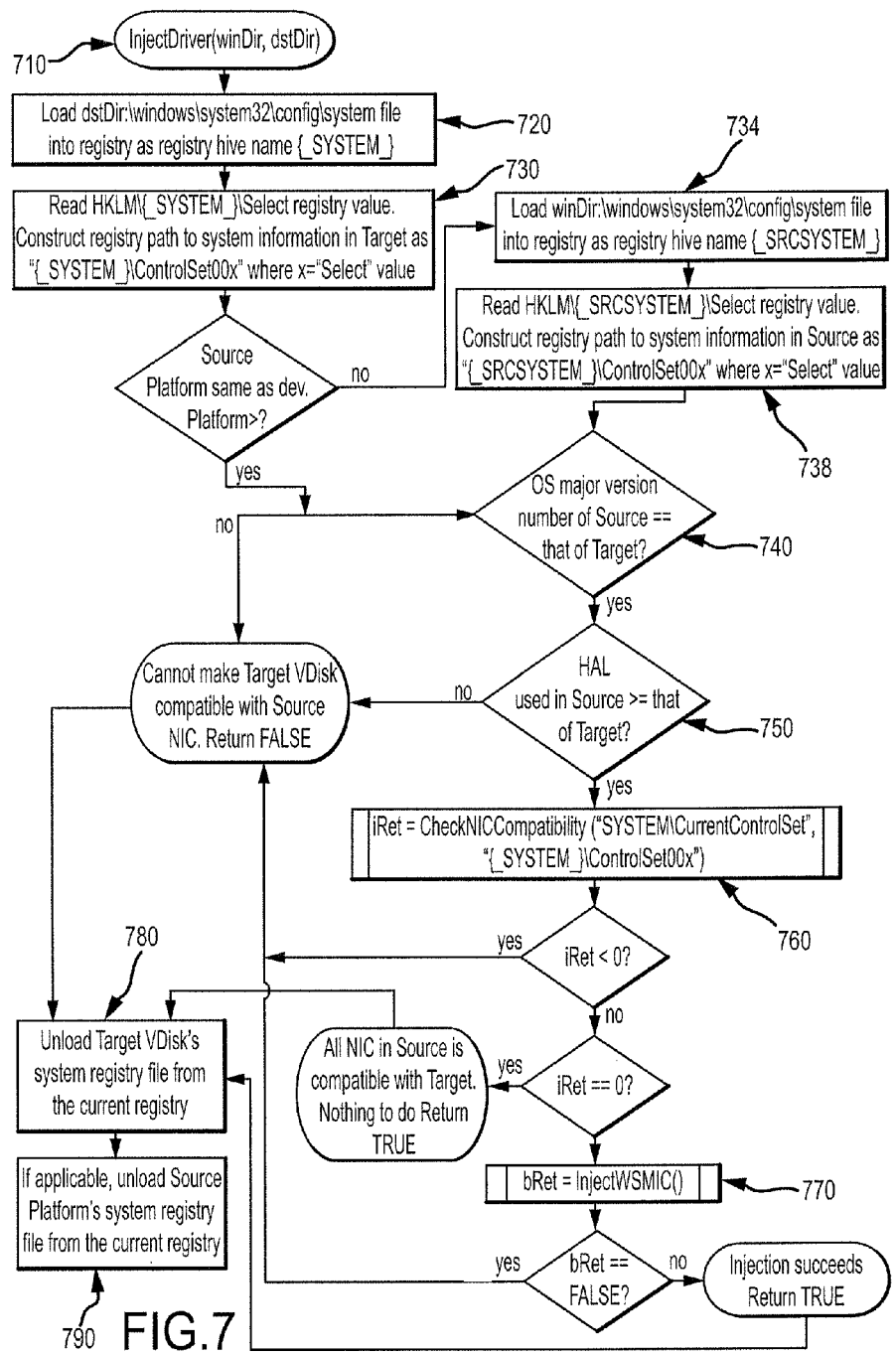
FIG. 7 is a conceptual flow diagram illustrating an example of a method for performing an inject driver function (e.g., InjectDriver) in response to the operation 630 of FIG. 6A.

Now referring to FIG. 1A, in one aspect, the disclosure below provides, for example, a description relating to three stages of operations: a computer program building stage 101A, a driver injection stage 101B and a streaming stage 101C. In one aspect, the computer program building stage 101A is described, for example, with reference to FIG. 1B and FIG. 22. In one aspect, the driver injection stage 101B is described, for example, with reference to FIGS. 6A, 7, 9, 10, 13-17, and 18-21. In one aspect, the streaming stage 101C is described, for example, with reference to FIG. 6B. The computer program building stage 101A may utilize two or more physical or virtual machines. The driver injection stage 101B may utilize one or more physical or virtual machines. The streaming stage 101C may utilize two or more physical or virtual machines. In one aspect, the machines utilized may be different among the three stages 101A, 101B and 101C. In another aspect, some of the machines utilized may be the same among stages 101B and 101C, or, possibly, among stages 101A, 101B and 101C.

Illustration of Process for Building Software Program for Driver Injection

In one aspect of the disclosure, a Driver Injection process involves injecting information of selected network components present in a Source Platform into a Target VDisk. By doing this, the operating system in the Target VDisk, when booted up on the Source Platform, will recognize the network component(s) present in the Source Platform, know where to find the driver binary for such component(s) and how to bind such component(s) into its network stack. The result is a functional chain of network drivers (network stack) capable of performing normal network activities as well as OS streaming.

An example of building a software program for performing these features is outlined below.

1. Observe and Analyze: Different operating systems store information related to network components and their binding relationships in different forms. For example, Windows OS stores the information in various registries under the system registry hive (see, e.g., 210 in FIG. 2). The system registry hive is presented as a binary file that resides in the system volume of the disk. For Linux, the information may be stored as configuration files under the /etc or /proc directory. Hence, the first step is to observe how such information is recorded in target OS, and analyze exactly what data is to be changed to what value.

Figure 1B:
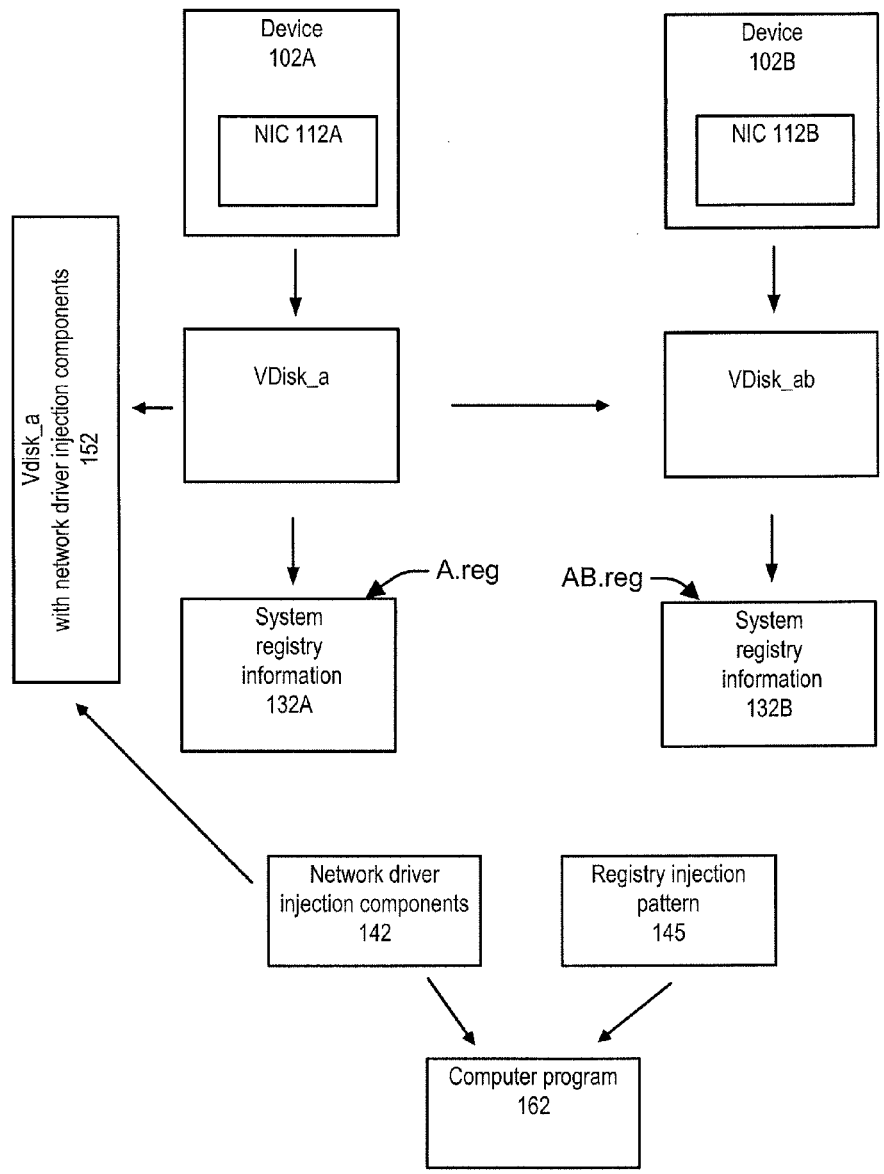
FIG. 1B is a conceptual block diagram illustrating an example of a process of building a software program for providing network driver injection.

Now referring to FIG. 1B, an example of a process of building a software program for providing network driver injection is described below based on Windows XP OS, as an example. The subject technology is not limited to Windows XP OS, and the subject technology may be used for other operating systems. The exact tools to use may be different on different OS.

a. Select at least two devices (e.g., a first device 102A and a second device 102B) which have exactly the same hardware except that the network interface cards (NICs) on the two devices are different. A device may be a machine (e.g., a computing machine, a computer, a platform, a source platform or a client device).

For example, the motherboards, processors and video cards of the two devices are the same, but a network interface card (NIC) 112A of the device 102A and a network interface card (NIC) 112B of the device 102B are different or have different attributes, such as different manufacturers, different models, different revisions, and/or different bus slots into which the NICs are plugged. Preferably, the hardware characteristics of the two devices are as close as possible so that the differences between their registry values are minimal b. Build a virtual disk image for device 102A. This image is called VDisk_a.

c. Build a virtual disk image that is compatible with both device 102A and device 102B using a traditional method (e.g., the second approach described above) to create a golden VDisk. This image is called VDisk_ab.

d. Boot the first device 102A from VDisk_a.

e. Extract the first system registry information 132A of the device 102A after the operation d. For example, for a Windows OS, use Window's regedit.exe tool to export the HKEY_LOCAL_MACHINE (HKLM) system registry hive to a text file A.reg. In this example, the first system registry information 132A may be contained in the text file A.reg.

Figure 2:
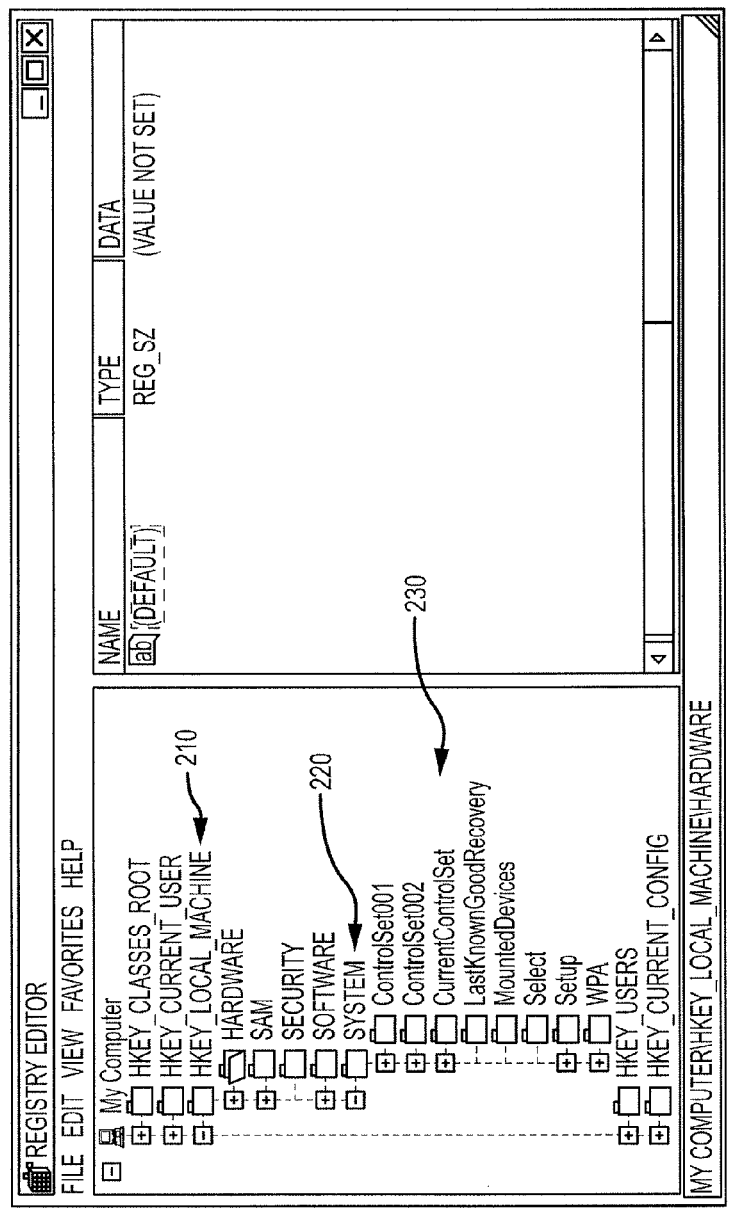
FIG. 2 illustrates an example of a screen shot of a registry editor 200 showing various operating system registries that may be utilized by a Windows OS on a machine or Source Platform.

FIG. 2 illustrates an example of a screen shot of a registry editor 200 showing various operating system registries utilized by a Windows OS on a client device. The registries include four types as shown in FIG. 2: HKEY_CLASSES_ROOT, HKEY_CURRENT_USER, HKEY_LOCAL_MACHINE, HKEY_USERS, AND HKEY_CURRENT_CONFIG. In one aspect, only HKEY_LOCAL_MACHINE (HKLM) is necessary for the subject technology. The HKLM system registry hive may refer to HKEY_LOCAL_MACHINE\SYSTEM 220.

f. Referring back to FIG. 1B, boot the first device 102A from VDisk_ab g. Extract the second system registry information 132B of the device 102A after the operation f. For example, use Window's regedit.exe tool to export the HKLM system registry hive to a text file AB.reg. In this example, the system registry information 132B may be contained in the text file AB.reg.

h. Determine network driver injection components 142 based on the differences between the first system registry information 132A and the second system registry information 132B and based on registries that do not affect network functionalities.

h1. Determine a first set of registries (e.g., a superset of registries), which is obtained from the differences between the registries of the first system registry information 132A and registries of the second system registry information 132B.

For example, use a file comparison tool to compare A.reg and AB.reg. Enlist the registry differences. This can be the superset of registries to be injected into VDisk_a in order to make VDisk_a compatible with the second device 102B.

h2. Determine a second set of registries (e.g., the final registries to be injected into VDisk_a), obtained by filtering out, from the first set of registries, those registries that do not affect network functionalities.

For example, this process may be achieved by removing one or more registries of the first set of registries from the second system registry information 132B obtained from VDisk_ab one by one (e.g., reverting the change from the registry list obtained in the operation h1 on VDisk_ab one by one), then attempting to boot the first device 102A and the second device 102B from VDisk_ab without those registries that have been removed. If the first device 102A and the second device 102B functions correctly on VDisk_ab with the modified registries, such those registries that have been removed are irrelevant and can be taken out from the final registries to be injected into VDisk_a. This process may be repeated until all registries that are irrelevant to network functionalities are eliminated.

The network driver injection components 142 may consist of (i) the second set of registries (e.g., the final registries to be injected into VDisk_a) and (ii) the associated files (e.g., driver installation files and driver binary files associated with the final set of registries to be injected into VDisk_a).

2. Perform Injection: Inject the network driver injection components 142 into VDisk_a. For example, after gathering the list of registries to inject, perform the injection manually on VDisk_a and verify that VDisk_a with the network driver injection 152 can now boot the first device 102A and the second device 102B. For instance, boot the first device 102A using VDisk_a with the network driver injection 152, and determine whether VDisk_a with the network driver injection 152 is compatible with the first device 102A by detecting whether the booting has occurred properly. In addition, boot the second device 102B using VDisk_a with the network driver injection 152, and determine whether VDisk_a with the network driver injection 152 is compatible with the second device 102B by detecting whether the booting has occurred properly. Repeat the foregoing operations 1 and 2 on a few other devices.

3. Generalize the Changes: Determine a registry injection pattern 145 applicable to one or more other devices.

For example, based on the above operations and observations, deduce a registry injection pattern that can apply to any device (e.g., any client device) coupled to any VDisk. For instance, after applying the above operations on multiple devices, determine whether the existing registry values from one device(s) conflict with the existing registry values from another device(s). If the existing registry values conflict, then there is a need to adjust the registry values to avoid the conflict. A registry injection pattern 145 can be generated based on the evaluation of the existing registry values and conflicts. In a computer program generated in the operation 4 below, the functions such as AssignNewNetClassSubKey and AssignNewBusSpecificID are examples of some of the functions written based on the registry injection pattern 145.

4. Produce a Computer Program to Perform the Injection. Based on some or all of the foregoing operations 1-3, produce a computer program 162 (or a software application). This computer program may be based on the network driver injection components 142. It may further be based on the registry injection pattern 145 described above. The computer program can then be encoded onto a machine-readable storage medium.

Illustration of Systems for Driver Injection

Figure 3:
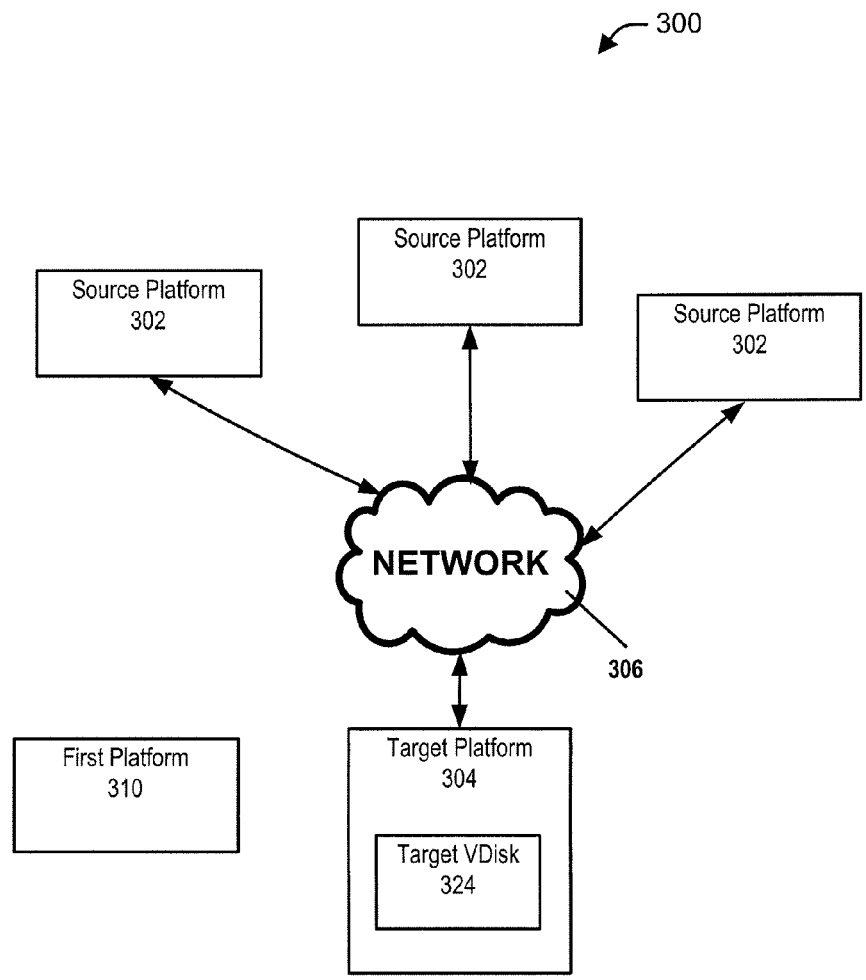
FIG. 3 is a conceptual block diagram illustrating an example of a network system.

FIG. 3 illustrates a simplified diagram of a computer network system in accordance with an aspect of the present disclosure.

A computer network system 300 may include one ore more remote Source Platforms 302 in communication with a Target Platform 304 via a network 306. In one aspect, the Target Platform 304 is configured to allow remote sessions (e.g., remote desktop sessions) wherein users can access applications and files on the Target Platform 304 by logging onto the Target Platform 304 from a Source Platform 302. Such a connection may be established using any of several well-known techniques such as the Remote Desktop Protocol (RDP) on a Windows-based server.

By way of illustration and not limitation, a Source Platform 302 can represent a computer, a mobile phone, a laptop computer, a thin Source Platform, a personal digital assistant (PDA), a portable computing device, a virtual machine, or a suitable device with a processor. In one example, a Source Platform 302 is a smartphone (e.g., iPhone, Android phone, Blackberry, etc.). In certain configurations, a Source Platform 302 can represent an audio player, a game console, a camera, a camcorder, an audio device, a video device, a multimedia device, or a device capable of supporting a connection to a remote Target Platform. In one example, a Source Platform 302 can be mobile. In another example, a Source Platform 302 can be stationary. In one example, a Source Platform 302 may be a device having at least a processor and memory, where the total amount of memory of the Source Platform 302 could be less than the total amount of memory in a Target Platform 304. In one example, a Source Platform 302 does not have a hard disk. In one aspect, a Source Platform 302 has a display smaller than a display supported by a Target Platform 304. In one aspect, a Source Platform may include one or more Source Platforms. In one aspect, each of the Source Platforms 302 may be the same (e.g., the same system configurations and the same network component configurations) or different (e.g., different system configurations or different network component configuration).

In one aspect, a Target Platform 304 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a Target Platform 304 can be stationary. In another aspect, a Target Platform 304 can be mobile. In certain configurations, a Target Platform 304 may be any device that can represent a Source Platform. In one aspect, a Target Platform 304 may include one or more Target Platforms.

In one example, a first device is remote to a second device when the first device is not directly connected to the second device. In one example, a first remote device may be connected to a second device over a communication network such as a Local Area Network (LAN), a Wide Area Network (WAN), and/or other network.

When a Source Platform 302 and a Target Platform 304 are remote with respect to each other, a Source Platform 302 may connect to a Target Platform 304 over a network 306, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 306 can be a LAN network, a WAN network, a wireless network, the Internet, an intranet or other network. A network 306 may include one or more routers for routing data between Source Platforms and/or Target Platforms. A remote device (e.g., Source Platform, Target Platform) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the subject technology is not limited to these examples.

In one aspect of the disclosure, a "Source Platform" may be sometimes referred to as a source machine, a source, a client, a client device or vice versa. Similarly, a "Target Platform" may be sometimes referred to as a target machine, a server or vice versa.

In one aspect, the terms "local" and "remote" are relative terms, and a Source Platform may be referred to as a local Source Platform or a remote Source Platform, depending on whether a Source Platform is described from the Source Platform side or from the Target Platform side, respectively. Similarly, a Target Platform may be referred to as a local Target Platform or a remote Target Platform, depending on whether the Target Platform is described from the Target Platform side or from a Source Platform side, respectively.

In one aspect, devices placed on a Source Platform side (e.g., devices connected directly to a Source Platform(s) or to one another using wires or wirelessly) may be referred to as local devices with respect to a Source Platform and remote devices with respect to a Target Platform. Similarly, devices placed on a Target Platform side (e.g., devices connected directly to a Target Platform(s) or to one another using wires or wirelessly) may be referred to as local devices with respect to a Target Platform and remote devices with respect to a Source Platform.

Figure 4:
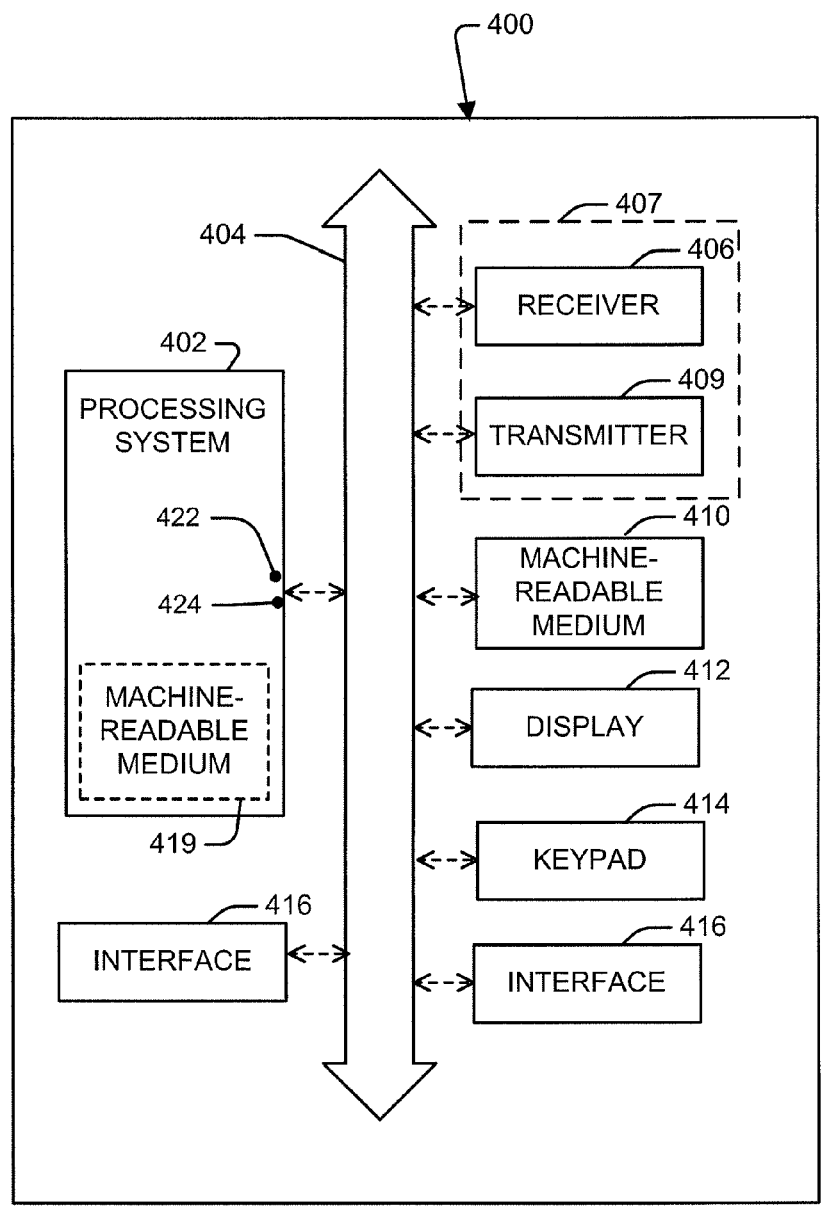
FIG. 4 is a conceptual block diagram illustrating an example of a machine.

FIG. 4 is a conceptual block diagram illustrating an example of a machine. A machine 400 may be, for example, a Source Platform, a Target Platform, a Development Machine, a source platform, a target platform, a source machine, a target machine, a development machine, a computing machine, a computing device, a client device, a device, or a computer. The machine 400 may include a processing system 402. The processing system 402 is capable of communication with a receiver 406 and a transmitter 409 through a bus 404 or other structures or devices. It should be understood that communication means other than busses could be utilized with the disclosed configurations. The processing system 402 can generate audio, video, multimedia, and/or other types of data to be provided to the transmitter 409 for communication. In addition, audio, video, multimedia, and/or other types of data can be received at the receiver 406, and processed by the processing system 402.

The processing system 402 may include a general-purpose processor or a specific-purpose processor for executing instructions and may further include a machine-readable medium 419, such as a volatile or non-volatile memory, for storing data and/or instructions for software programs. The instructions, which may be stored in a machine-readable medium 410 and/or 419, may be executed by the processing system 402 to control and manage access to the various networks, as well as provide other communication and processing functions. The instructions may also include instructions executed by the processing system 402 for various user interface devices, such as a display 412 and a keypad 414. The processing system 402 may include an input port 422 and an output port 424. Each of the input port 422 and the output port 424 may include one or more ports. The input port 422 and the output port 424 may be the same port (e.g., a bi-directional port) or may be different ports.

The processing system 402 may be implemented using software, hardware, or a combination of both. By way of example, the processing system 102 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 419) may include storage integrated into a processing system, such as might be the case with an ASIC. Machine-readable media (e.g., 410) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 402. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a machine-readable storage medium. Instructions may be executable, for example, by a machine (e.g., Source Platform or Target Platform) or by a processing system of a Source Platform or Target Platform. Instructions can be, for example, a computer program including code.

Interfaces or interface cards 416 may be any type of interface and may reside between any of the components shown in FIG. 4. An interface 416 may also be, for example, an interface to the outside world (e.g., a network interface card or an Internet network interface card). There may be one or more interfaces or interface cards 416. A transceiver block 407 may represent one or more transceivers, and each transceiver may include a receiver 406 and a transmitter 409. A functionality implemented in a processing system 402 may be implemented in a portion of a receiver 406, a portion of a transmitter 409, a portion of a machine-readable medium 410, a portion of a display 412, a portion of a keypad 414, or a portion of an interface 416, and vice versa. In one aspect, machine may include only some or all of the elements shown in FIG. 4. A machine may include other elements not shown in FIG. 4. A machine may include more than one of the same elements.

Illustration of Method for Driver Injection

An example of a method for performing driver injection from one or more Source Platforms into a Target VDisk is illustrated below. In one aspect, the method may be performed by a computer program generated by the operation 4 described under the subheading "Illustration of Process for Building Software Program for Driver Injection" (e.g., a computer program called VDiskImageCreation.exe written in C++ programming language). In this example, the method utilizes Windows XP. However, the subject technology is not limited to programs written in C++ or the Windows OS. In one aspect, the subject technology may be practiced utilizing other tools, programming languages or operating systems.

Referring to FIGS. 3, 4, 5, 6A, 6B, 7, 8, 9 and 10, an example of the method is illustrated below, and the method may utilize some or all of the operations described below.

1. A Target VDisk may be built from a machine (e.g., 402 in FIG. 4). The machine may be, for example, a Target Platform 304 in FIG. 3 or another machine. In one example, a Target VDisk is the Target VDisk 324 in FIG. 3 built from the Target Platform 304. In another example, a Target VDisk may be an image previously built from another machine such as a first platform 310, and copied to the Target Platform 304 or to another platform. In one aspect, while it may be rare, it is possible to use one of the Source Platforms 302 to contain the Target VDisk and use that Source Platform 302 as a Target Platform during Driver Injection (e.g., 630 in FIG. 6A). In one example, a Target VDisk may be located at the same platform during the Driver Injection (e.g., 630 in FIG. 6A) and during streaming (e.g., 670 in FIG. 6B). In another example, a Target VDisk may reside in one platform during the Driver Injection (e.g., 630 in FIG. 6A) and then copied to another platform for streaming (e.g., 670 in FIG. 6B). A Target VDisk may reside in a machine-readable medium (see, e.g., 324 in FIG. 3 and 419, 410 in FIG. 4) of a platform. In one example, the Target VDisk may consist of an operating system. In another example, the Target VDisk may consist of an operating system and one or more software applications. In yet another example, the Target VDisk may consist of a copy of the entire hard disk of a platform.

2. A computer program 615 in FIG. 6A for driver injection (e.g., VDiskImageCreation) may reside on a Development Machine 625. For example, the computer program 615 may reside in a machine-readable medium (e.g., 419, 410 in FIG. 4) and may be executed by a processing system (e.g., 402 in FIG. 4) of the Development Machine 625. In one aspect, the Development Machine may be a Source Platform (e.g., 400 in FIG. 4 or 302 in FIG. 3) whose network components are to be injected into the existing Target VDisk (e.g., the Target VDisk obtained from the operation 1 under this subheading). In another aspect, a Development Machine 625 may be any other machine (not a Source Platform) in which the computer program 615 resides, and this machine may have access to a Source Platform's network component information and the associated files (e.g., driver installation files and driver binary files).

For the discussions provided below for driver injection, a Source Platform is chosen as the Development Machine 625, and references are made to a Source Platform rather than a Development Machine. But it should be understood that the term Source Platform as used for driver injection (e.g., driver injection stage 101B) may be replaced with the term Development Machine, which can be a Source Platform or another machine, unless stated otherwise.

3. When the computer program 615 begins, a module of the computer program 615 may facilitate mounting of the Target VDisk as a drive volume bearing a specific drive letter (e.g., e:/ or f:/). This capability is generally available in an OS streaming product. In this case, the Target VDisk is only mounted as a drive volume, the Target VDisk itself is not copied onto the Source Platform. See operation 620 in FIG. 6A.

Alternatively, a user can make the system registry file of the Target VDisk reachable by the computer program by copying the file from Target VDisk to the Source Platform (e.g., onto a machine-readable medium 419 or 410 in FIG. 4). In one aspect, a module of the computer program may facilitate the copying of the file. The file may be only a few mega bytes in size (e.g., 1-5 MB) instead of several gigabytes (e.g., 10-20 GB). In this case, the system registry file is copied onto the Source Platform without copying the entire Target VDisk.

4. A module of the computer program 615 may call another module to initiate drive injection. For example, a module of the computer program (VDiskImageCreation.exe) may call the module InjectDriver, passing in the drive letter assigned to the system volume of the Source Platform (e.g., C:), and the drive letter assigned to the system volume of Target VDisk (e.g., e:/), to perform drive injection. See operation 630 in FIG. 6A.

5. A module of the computer program 615 (e.g., InjectDriver) may perform some or all of the following. See operation 710 in FIG. 7.

a. Load the system registry file of the Target VDisk to a current registry on the Source Platform. For example, for a Windows OS, use Windows' system application programming interface (API) to load Target VDisk's system registry hive file (e.g., 520 in FIG. 5) to the current registry of a Source Platform. Use a registry hive name different from any existing registry hive name. For example, call it "{_SYSTEM_}" (see 590 in FIG. 5) to distinguish it from "SYSTEM" 220 in FIG. 5. See operation 720 in FIG. 7.

b. Determine the location (or path) of the current system information of the Target VDisk. For example, for the Windows OS, a first set of system information is located at "ControlSet001" 530, a second set of system information is located at "ControlSet002" 540, and the "Select" registry value 550 indicates whether "ControlSet001" 530 or "ControlSet002" 540 is the current set. Thus, for this example, find the set of registry under {_SYSTEM_} 520 that will be used when VDisk boots up by looking into the "Select" registry value 550 under "HKLM\{_SYSTEM_}" registry key 520. Construct a registry key path to the Target VDisk's system information, e.g., "HKLM\{_SYSTEM_}\ControlSet00x" where x is the "Select" registry value 550. See operation 730 in FIG. 7.

c. While the example presented here uses a Source Platform as the Development Machine, if the Development Machine is not the same as the Source Platform, load the system registry file of the Source Platform to a current registry on the Development Machine. For example, for a Windows OS, use Windows' system application programming interface (API) to load the Source Platform's system registry hive file to the current registry of the Development Machine. Use a registry hive name different from any existing registry hive name. For example, call it "{_SRCSYSTEM_}" to distinguish it from "SYSTEM" 220 in FIG. 5 or {_SYSTEM_}. See operation 734 in FIG. 7.

d. Determine the location (or path) of the current system information of the Source Platform. Construct a registry key path to the Source Platform's system information, e.g., "HKLM\{_SRCSYSTEM_}\ControlSet00x". In this example, "HKLM\{_SRCSYSTEM_}\ControlSet00x" may be referred to as <Current System registry hive name of Source Platform>. See operation 738 in FIG. 7.

e. Determine whether the operating system of the Source Platform is compatible with the operating system of the Target VDisk. For example, detect if the OS version between the Source Platform and the Target VDisk are of the same major build. This is because Windows drivers typically do not work across different major OS revisions (e.g., XP and Windows 7's drivers are not binary compatible). In one aspect, the network component driver(s) copied from the Source Platform as a result of driver injection operation will fail to function on the Target if the major OS version between the Source Platform and the Target are different. See operation 740 in FIG. 7.

f. Determine whether the hardware abstraction layer (HAL) for the Target VDisk is lower than, or the same as, the HAL of the Source Platform. For example, detect if the HAL used in the Target VDisk is lower than or equal to that in the Source Platform. A Windows OS using a specific level of HAL can generally boot up devices which the basic input/output system (BIOS) supports the same or higher HAL, but not lower. Hence, a Target VDisk will not be able to boot a Source Platform after driver injection if the Source Platform is of lower HAL than Target. See operation 750 in FIG. 7.

Figure 8:
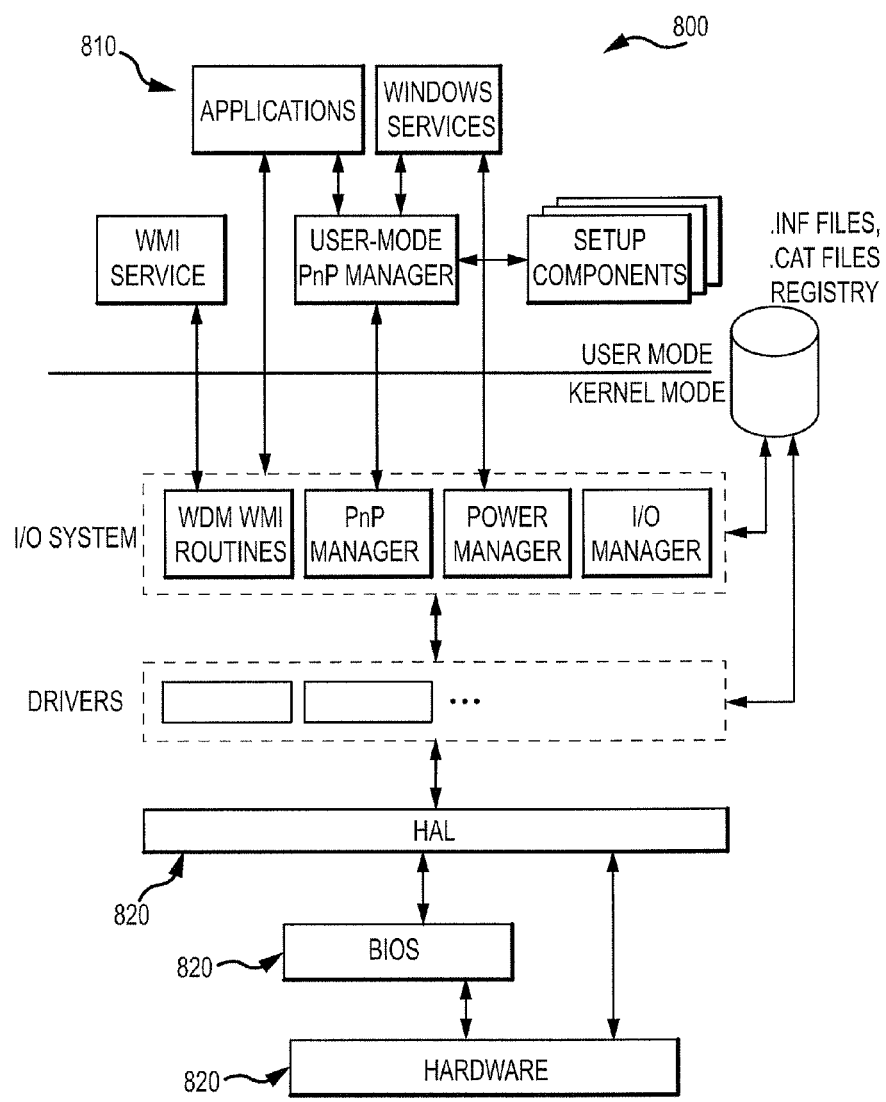
FIG. 8 is a conceptual block diagram illustrating examples of different layers from software to hardware in a machine.

FIG. 8 is a conceptual block diagram showing examples of different layers from software to hardware in a machine 800. The top layer 810 may include applications that may reside in the machine. In one example, a HAL 820 may be described as a loadable kernel-mode module that provides the low-level interface to the hardware platform 820 on which an operating system is running. The HAL 820 hides hardware-dependent details such as I/O interfaces, interrupt controllers and multiprocessor communication mechanisms, e.g., any functions that are architecture-specific and machine-dependent. The HAL 820 may communicate with the BIOS 820 and the hardware 820 of the machine 800.

For Windows XP, some examples of different HAL levels are provided below from the lowest to the highest (in terms of the level of functionalities):

Standard PC
Advanced Configuration and Power Interface (ACPI) PC
ACPI Uniprocessor PC
ACPI Multiprocessor PC Some examples of different HAL levels on Vista/Windows 7 are provided below from the lowest to the highest (in terms of level of functionalities):

Advanced Configuration and Power Interface (ACPI) PC
ACPI x86-based PC
ACPI x64-based PC
ACPI IA64-based PC g. Determine whether the network interface card(s) (NIC(s)) of the Source Platform are compatible with the Target VDisk. For example, call the CheckNICCompatibility function, which detects if the Source Platform's NIC(s) are compatible with the Target VDisk's NIC(s). See operations 760 in FIG. 7 and 910 in FIG. 9.

h. If the network interface card(s) are not compatible with the Target VDisk, perform network interface driver injection. For example, if the Source Platform is not compatible with the Target VDisk, call the InjectWSM-NIC function to inject OS streaming and NIC related registries, and to copy the NIC driver binary file(s) and the NIC driver installation file(s), from the Source Platform to the Target VDisk. See operations 770 in FIG. 7 and 1010 in FIG. 10.

i. Unload the system registry file of the Target VDisk from the current registry on the Source Platform. For example, unload the Target VDisk's system registry hive file from the current registry. See operation 780 in FIG. 7.

j. If the Development Machine is not the same as the Source Platform, unload the system registry file of the Source Platform from the current registry on the Development Machine. See operation 790 in FIG. 7.

6. The computer program 615 facilitates unmounting of the Target VDisk from the Source Platform. For example, the computer program called VDiskImageCreation.exe unmounts the Target VDisk. See operation 640 in FIG. 6A.

7. The Target VDisk now has the driver injection and is ready to stream to the Source Platform. For example, the Target VDisk may be streamed to the Source Platform as shown at operation 670 in FIG. 6B. One or more Source Platforms 302 in FIG. 3 may receive the Target VDisk 324 from a Target Platform 304 in FIG. 3 via streaming over the network 306. Streaming may be accomplished using a separate computer program after the computer program exits at operation 650 in FIG. 6A. Alternatively, the computer program 615 shown in FIG. 6A may include a module for streaming 8. Some or all of the processes described above in the operations 1 through 7 under the subheading "Illustration of Method for Driver Injection" may be repeated for other Source Platforms with the same Target VDisk and the same Target Platform (in which case, the operation 1 is skipped). Alternatively, some or all of the processes may be repeated for other Source Platforms with a different Target VDisk and/or a different Target Platform.

Illustration of Checking NIC Compatibility

Figure 9:
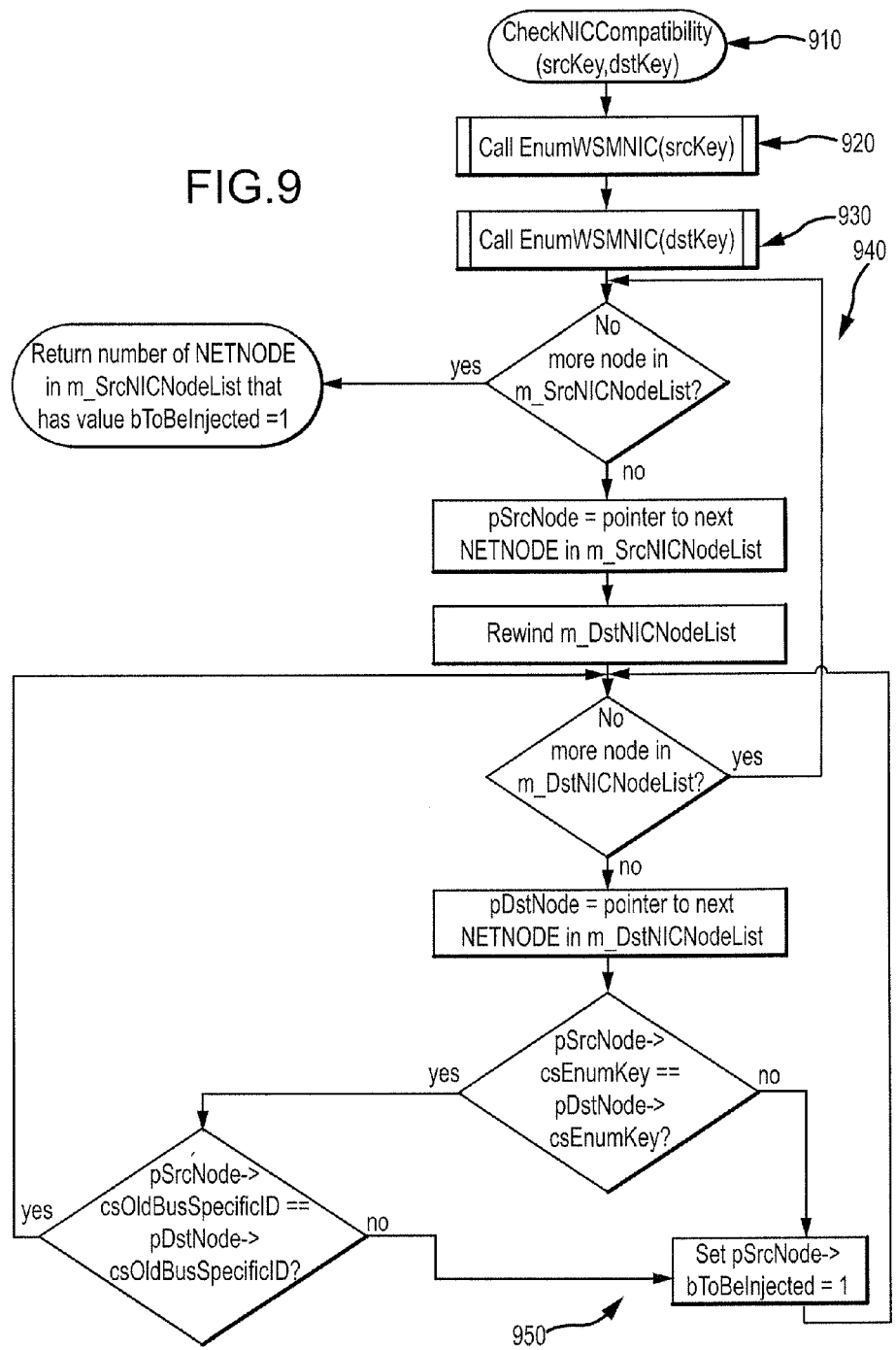
FIG. 9 is a conceptual flow diagram illustrating an example of a method for performing a check NIC compatibility function (e.g., CheckNICCompatility) in response to the operation 760 of FIG. 7.

An example of a method for determining whether the network interface card(s) (NIC(s)) of the Source Platform are compatible with the Target VDisk is illustrated below. An operation 910 for checking the NIC compatibility is shown in FIG. 9. The operation 910 represents, for example, the operation 760 in FIG. 7. In one example, this operation 910 is called the CheckNICCompatibility function, and it may perform some or all of the following operations:

1. Determine one or more network interface card drivers bound to one or more operating system streaming drivers for the Source Platform. For example, call the EnumWSM-NIC function, passing in the system registry key path of the Source Platform (e.g., "HKLM\SYSTEM\ CurrentControlSet\") to obtain a list of NICs whose drivers are currently bound to the OS streaming drivers in the Source Platform. Such a list is stored in m_SrcNICNodeList. See operation 920 in FIG. 9.

In one aspect, a NETNODE contains information about the whole NIC, not just the NIC driver. When determining which NIC is to be included into the list, one needs to identify NIC driver(s), and determine which NIC driver(s) are currently bound to the OS streaming drivers.

2. Determine one or more network interface card drivers bound to one or more operating system streaming drivers for the Target VDisk. For example, call the EnumWSM-NIC function, passing in the system registry key path of the Target VDisk (e.g., "HKLM\{_SYSTEM_}\ ControlSet001\") to obtain a list of NICs whose drivers are currently bound to the OS streaming drivers in Target. Such a list is stored in m_DstNICNodeList. See operation 930 in FIG. 9.

3. Determine whether the one or more network interface cards of the Source Platform are the same as the one or more network interface cards for the Target VDisk. For example, evaluate each NIC in m_SrcNICNodeList and determine if such NIC is already present in m_DstNICNodeList by comparing the csEnumKey and csOldBusSpecificID values. Matches on both values may mean, for example, the two NICs are from the same manufacturer or vendor, are of the same model, are of the same revision, and are located at the same bus slot. It further means such NIC in the Source Platform is compatible with the Target VDisk. See operation 940 in FIG. 9.

4. For each NIC in m_SrcNICNodeList, set bToBeInjected value to 1 if it is not compatible with the Target VDisk. See operation 950 in FIG. 9.

The foregoing operations 1 and 2 select NIC(s) from a Source Platform to inject them into a Target VDisk by detecting the NIC(s) that are currently bound to the OS streaming driver at the Source Platform. There are, however, other methods of selecting NIC(s). For example, (i) prompt a user to select one or more NIC(s) present in the Source Platform, (ii) select the NIC(s) of specific characteristics (e.g., all Ethernet NICs), or (iii) select all NIC(s) in the Source Platform regardless of their characteristics. After injecting the selected NICs' driver/configuration from the Source Platform to the Target VDisk using the methods described in this disclosure, add an OS Streaming driver to bind to the newly injected NIC(s) at the Target VDisk. This can produce a Target VDisk that is compatible and streamable to a Source Platform.

In one aspect, the driver injection stage 101B can perform properly without having a streaming driver in a Source Platform, Target VDisk or a Development Machine. If a Target VDisk does not have a streaming driver, then a streaming driver can be added to (or copied onto) the Target VDisk and be made to bind to appropriate network component(s) on the Target VDisk before streaming the Target VDisk to a Source Platform (e.g., before the streaming operation 670 in FIG. 6B).

Illustration of Performing Network Interface Driver Injection

Figure 10:
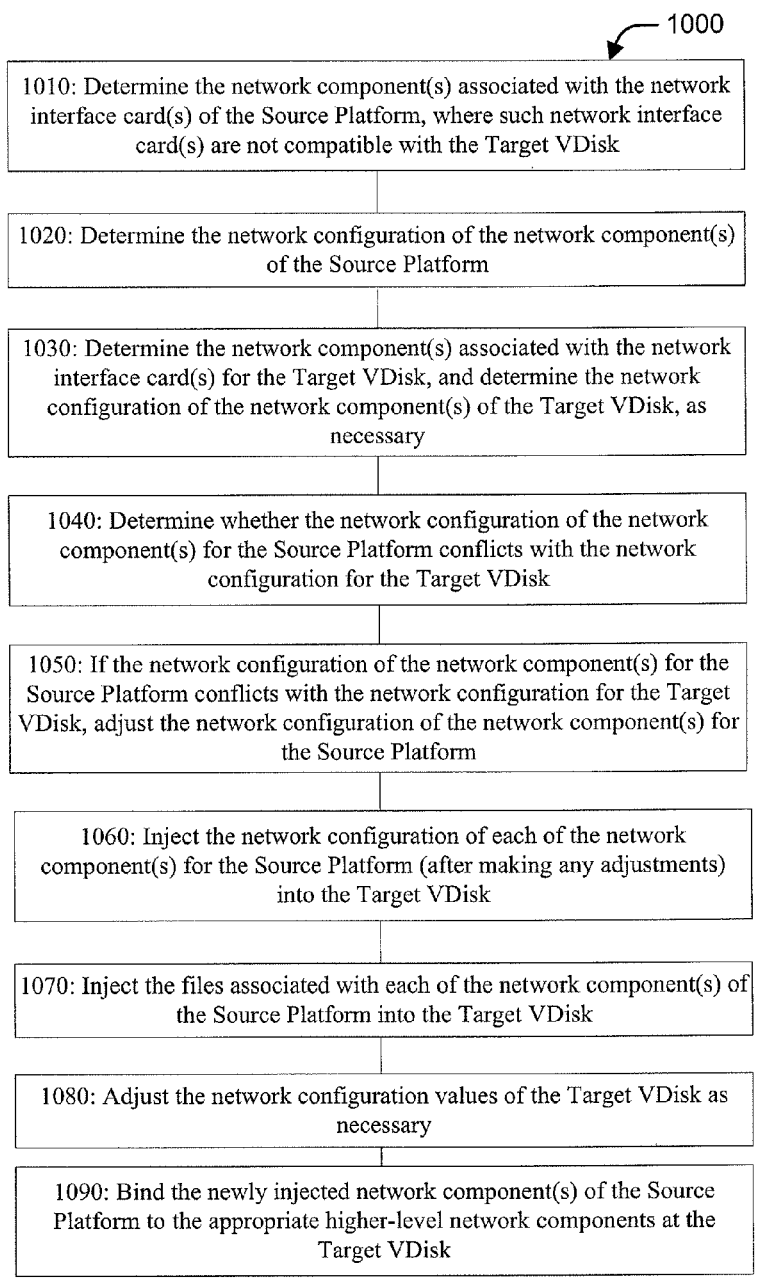
FIG. 10 is a conceptual flow diagram illustrating an example of a method for performing network interface driver injection (e.g., InjectWSMNIC) in response to the operation 770 of FIG. 7.

An example of a method for performing network interface driver injection is illustrated below. An operation 1000 for performing network interface driver injection if the network interface card(s) are not compatible with the Target VDisk is shown in FIG. 10. The operation 1000 represents, for example, the operation 770 in FIG. 7. In one example, this operation 1000 is called the InjectWSMNIC function, and it may perform some or all of the following operations. This operation is illustrated below with reference to FIGS. 3, 4, 5, 10, 11, 12A and 12B.

1. Determine the network component(s) associated with the network interface card(s) of the Source Platform, where such network interface card(s) are not compatible with the Target VDisk. See operation 1010 in FIG. 10. For example, for each to-be-injected NIC driver from the Source Platform, determine the OS streaming driver instance and network component instance that is bound to its upper edge in the network driver interface specification (NDIS) driver stack. These are the network components whose configurations and files are to be injected into the Target VDisk. These are described in more detail with reference to FIGS. 11, 12A and 12B below.

FIG. 11 is a conceptual block diagram illustrating an example of various layers that may reside in a machine (e.g., 302 or 304 in FIG. 3 or 410 in FIG. 4) that utilizes a Windows OS. The NDIS interface layers 1110 may include an NDIS miniport driver(s) 1110A, an NDIS intermediate driver(s) 1110B and an NDIS protocol driver(s) 1110C. The NDIS miniport driver(s) 1110A may be NIC driver(s) for network interface card(s) 1150, which reside on the physical layer. Examples of the NDIS intermediate drivers 1110B may include OS streaming driver(s) and packet scheduler driver(s). Examples of the NDIS protocol drivers 1110C may include TCPIP driver(s) and NetBT driver(s). In this example, the upper edge of an NDIS miniport driver(s) 1110A is bound to an NDIS intermediate driver(s) 1110B. The upper edge of an NDIS intermediate driver(s) 1110B is bound to an NDIS protocol driver(s) 1110C. The upper edge of an NDIS protocol driver(s) 1110C may be bound to network services) 1160. Examples of network services 1160 may include Winsock, LanmanServer, LanmanWorkStation, NDISUIO, and NetBIOS. Software applications may be at the application layer 1170 far above the network services) 160. A Source Platform or a Target Platform may have, for example, layers similar to those shown in FIG. 11. A Target VDisk may include, for example, some or all of items 1110A, 1110B, 1110C and 1160. In another example, if a machine operates with a different OS, then it may have different types of layers and different types of network drivers.

Figure 12A:
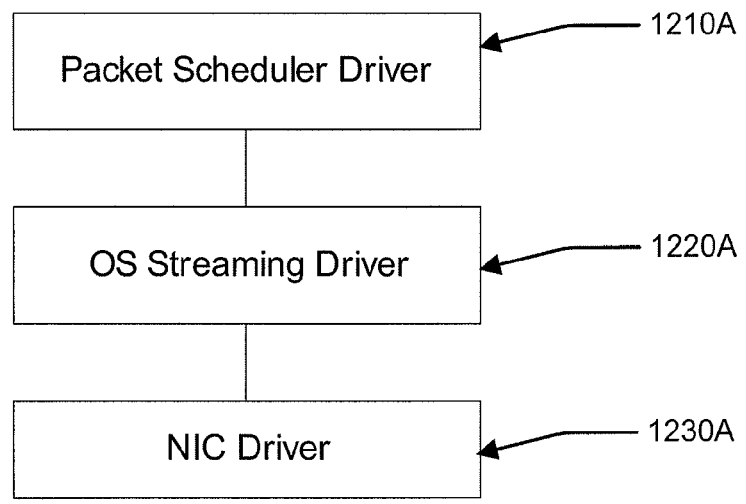
FIG. 12A is a conceptual block diagram illustrating an example of a binding relationship among network drivers on a streaming enabled Source Platform using Windows XP.
Figure 12B:
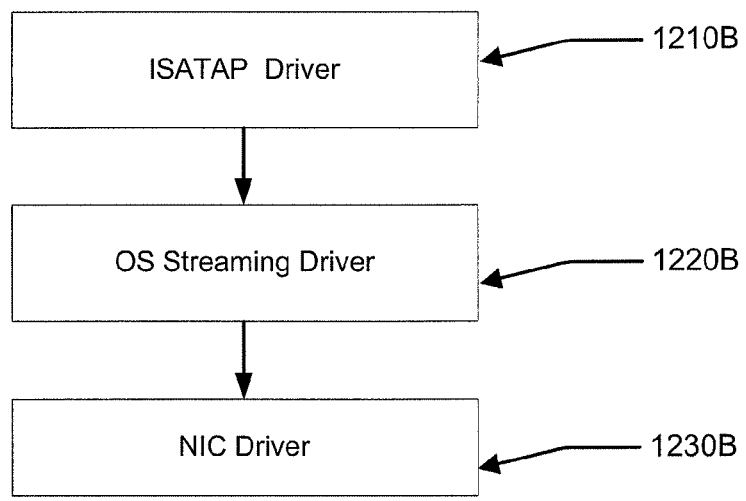
FIG. 12B is a conceptual block diagram illustrating an example of a binding relationship among network drivers on a Source Platform using Windows Vista or Windows 7.

FIG. 12A is a conceptual block diagram illustrating an example of a binding relationship among network drivers on a Source Platform using Windows XP. In this example, an upper edge of a network interface card (NIC) driver 1230A is bound to an OS streaming driver 1220A. An upper edge of the OS streaming driver 1220A is bound to a packet scheduler driver 1210A. These drivers (e.g., 1230A, 1220A and 1210A) are the network components associated with an NIC on the Source Platform. In this example, the configuration and files for the NIC driver 1230A, the configuration and files for the OS streaming driver 1220A, and the configuration and files for the packet scheduler driver 1210A are to be injected into the Target VDisk. The drivers 1230A, 1220A and 1210A may be examples of the drivers 1110A, 1110B and 1110C in FIG. 11. A Target VDisk may have FIG. 12B is a conceptual block diagram illustrating an example of a binding relationship among network drivers on a Source Platform using Windows Vista or Windows 7. In this example, an upper edge of a network interface card (NIC) driver 1230B is bound to an OS streaming driver 1220B. An upper edge of the OS streaming driver 1220B is bound to an Intra-Site Automatic Tunnel Addressing Protocol (ISATAP) driver 1210B. These drivers (e.g., 1230B, 1220B and 1210B) are the network components associated with an NIC on the Source Platform. In this example, the configuration and files for the NIC driver 1230B, the configuration and files for the OS streaming driver 1220B, and the configuration and files for the ISATAP driver 1210B are to be injected into the Target VDisk. The drivers 1230B, 1220B and 1210B may be examples of the drivers 1110A, 1110B and 1110C in FIG. 11.

2. Determine the network configuration of the network component(s) of the Source Platform. See operation 1020 in FIG. 10. For example, determine detailed information related to each network component found in the foregoing operation 1 above under the subheading "Illustration of Method for Performing Network Interface Driver Injection." A network configuration may be configuration information, setup information or system registry information for a network component. A network configuration may include (but not limited to), for example, some or all of the following: a driver installation file name and its location, a windows service name, a driver binary file name and its location, a global unique identifier (GUID), a bus type (e.g., peripheral component interconnect (PCI), system root), a PCI bus location (PCI NIC only), an instance index, etc. Please note that this may not be an exhaustive list. For a Windows OS, at least some of the network configuration information may be found, for example, at the system registries under "HKLM\SYSTEM\CuaentControlSet\" (see item 230 in FIG. 2 or item 570 in FIG. 5). In one aspect, at least all of the items listed above may be found at the system registries under "HKLM\SYSTEM\ CurrentControlSet\".

3. Determine the network component(s) associated with the network interface card(s) for the Target VDisk, and determine the network configuration of the network component(s) of the Target VDisk, as necessary. See operation 1030 in FIG. 10. A method similar to those described in the foregoing operations 1-2 may apply. For a Windows OS, the network configuration information for Target VDisk may be found, for example, at the system registries under "HKLM\{_SYSTEM_}\ControlSet00x\" (see, e.g., item 530 or 540 in FIG. 5).

4. Determine whether the network configuration of the network component(s) for the Source Platform conflicts with the network configuration for the Target VDisk. See operation 1040 in FIG. 10. For example, determine whether any of the network configuration values obtained from the foregoing operation 2 need to be adjusted before they are injected into the Target VDisk to avoid any conflict with the existing values in the Target VDisk.

5. If the network configuration of the network component(s) for the Source Platform conflicts with the network configuration for the Target VDisk, adjust the network configuration of the network component(s) for the Source Platform so that the network configuration of the network component(s) for the Source Platform does not conflict with the existing network configuration of the Target VDisk. See operation 1050 in FIG. 10. For example, if there is a conflict, determine new values for the network configuration of the network component(s) for the Source Platform. Provided below are some examples of potentially conflicting network configuration items. These are simply some examples (not an exhaustive list), and there may be other potentially conflicting network configuration items.

a. Driver installation file name: For example, if a driver installation file name for a network component for the Source Platform is OEMx.inf, and OEMx.inf already exists in the Target VDisk for another driver, then rename OEMx.inf of the Source Platform to another name, such as OEMy.inf, when this file is copied into the Target VDisk. The new name OEMy.inf should be a brand new file name that does not already exist in the Target VDisk.

The process of determining whether there is a conflict on the driver installation file name may be performed by searching the Target VDisk (e.g., searching the Windows\inf folder, which is one of the system folders) and determining whether the file names used by a network component(s) of the Source Platform are already used on the Target VDisk.

b. Instance index: As another example, if a network component's current instance index value is two in the Source Platform, and the same instance index is already used in the Target VDisk, then a new instance index (e.g., three) needs to be used for the network component that is unused in the Target VDisk.

6. Inject the network configuration of each of the network component(s) for the Source Platform (after making any adjustments needed to the network configuration as described in the foregoing operation 5) into the Target VDisk. See operation 1060 in FIG. 10. For example, copy the network configuration of each of the network component(s) for the Source Platform (after any adjustment) into the system registry file of the Target VDisk. As an illustration, copy certain registries under HKLM\SYSTEM\CurrentControlSet\ . . . 570 in FIG. 5 into registries under HKLM\{_SYSTEM_}\ControlSet00x\ . . . 530 or 540 in FIG. 5, whichever one is selected as the current one.

7. Inject the files associated with each of the network component(s) of the Source Platform into the Target VDisk. See operation 1070 in FIG. 10. For example, copy the driver installation files and driver binary files associated with each of the network component(s) of the Source Platform into the Target VDisk.

8. Adjust the network configuration values of the Target VDisk as necessary. See operation 1080 in FIG. 10. For example, update the system registry values (e.g., the number of instances of a network component) in the system registry file of the Target VDisk as necessary.

9. Bind the newly injected network component(s) of the Source Platform to the appropriate higher-level network component(s) at the Target VDisk (e.g., protocol driver(s) and/or network service(s) at the Target VDisk). See operation 1090 in FIG. 10. For example, select at least one network component of the Target VDisk as a reference network component (e.g., a reference NIC driver). Determine the existing binding relationship between the reference network component and the higher-level network component(s) at the Target VDisk. Then establish a binding relationship between the injected network component(s) and the higher-level network component(s) of the Target VDisk.

Detailed Illustration of Performing Network Interface Driver Injection

A detailed example of a method for performing network interface driver injection, when the network interface card(s) are not compatible with the Target VDisk, is illustrated below with reference to FIGS. 13-17. The method described with reference to FIGS. 13-17 may represent a more detailed description of the method described with reference to FIG. 10.

In one aspect of the disclosure, the method described with reference to FIG. 10 and the method described with reference to FIGS. 13-17 have the following exemplary relationship.

Figure 13:
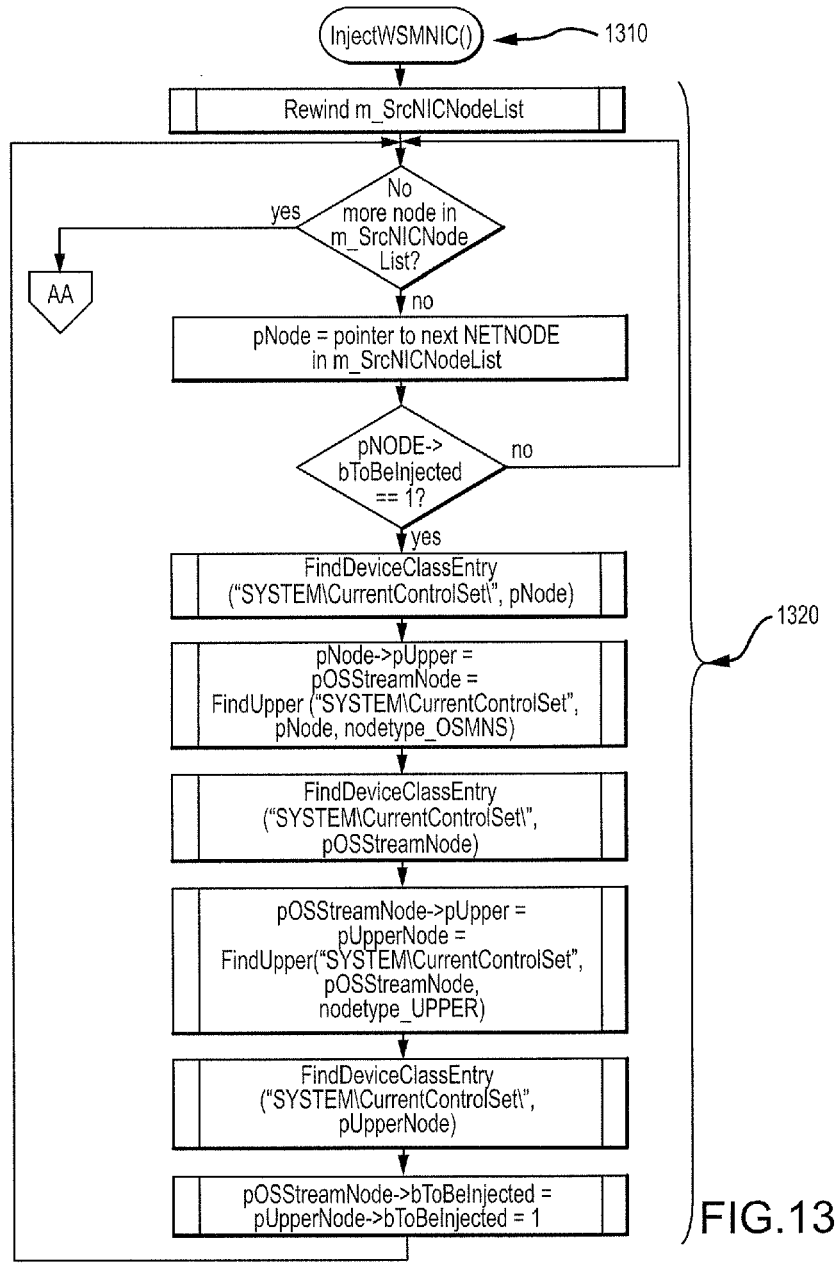
FIGS. 13, 14, 15, 16 and 17 are conceptual flow diagrams illustrating an example of a method for performing network interface driver injection (e.g., InjectWSMNIC) in response to the operation 770 of FIG. 7.

An example of the operation 1010 of FIG. 10 is illustrated as an operation 1320 of FIG. 13.

An example of the operation 1020 of FIG. 10 is illustrated as an operation 1320 of FIG. 13.

Figure 14:
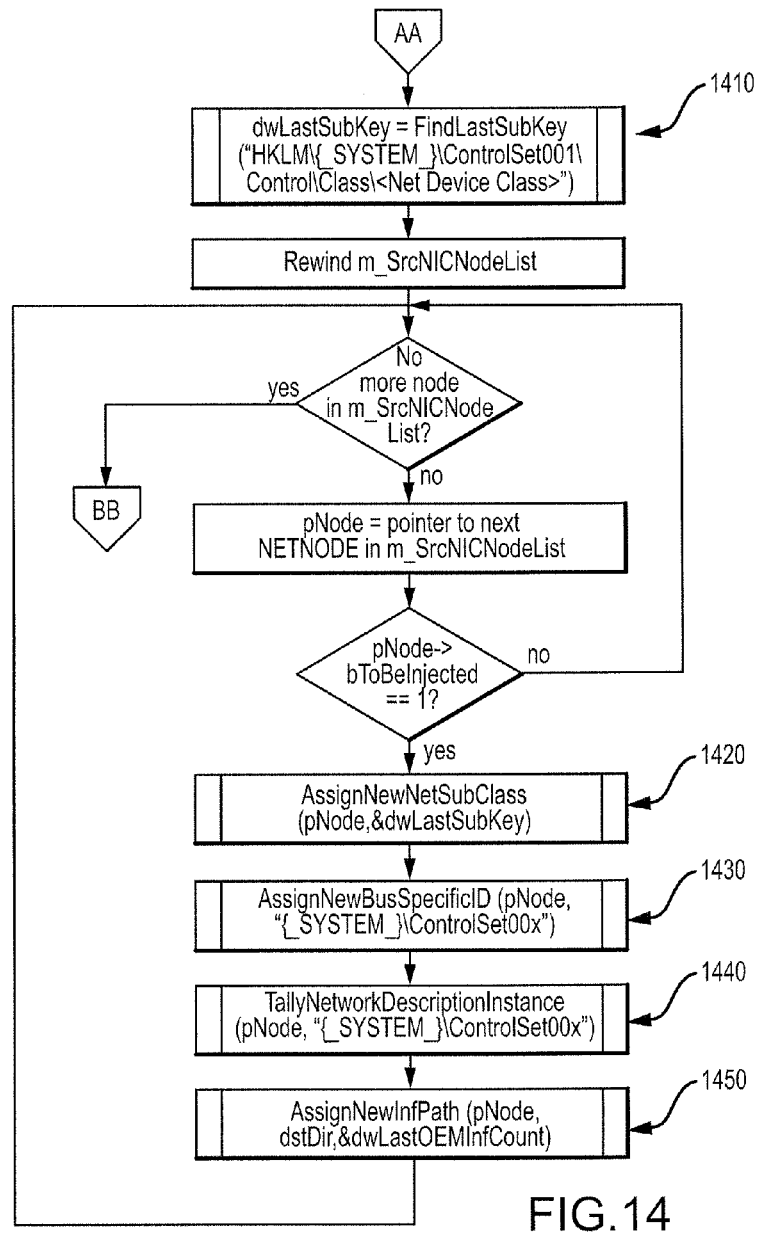
Figure 15:
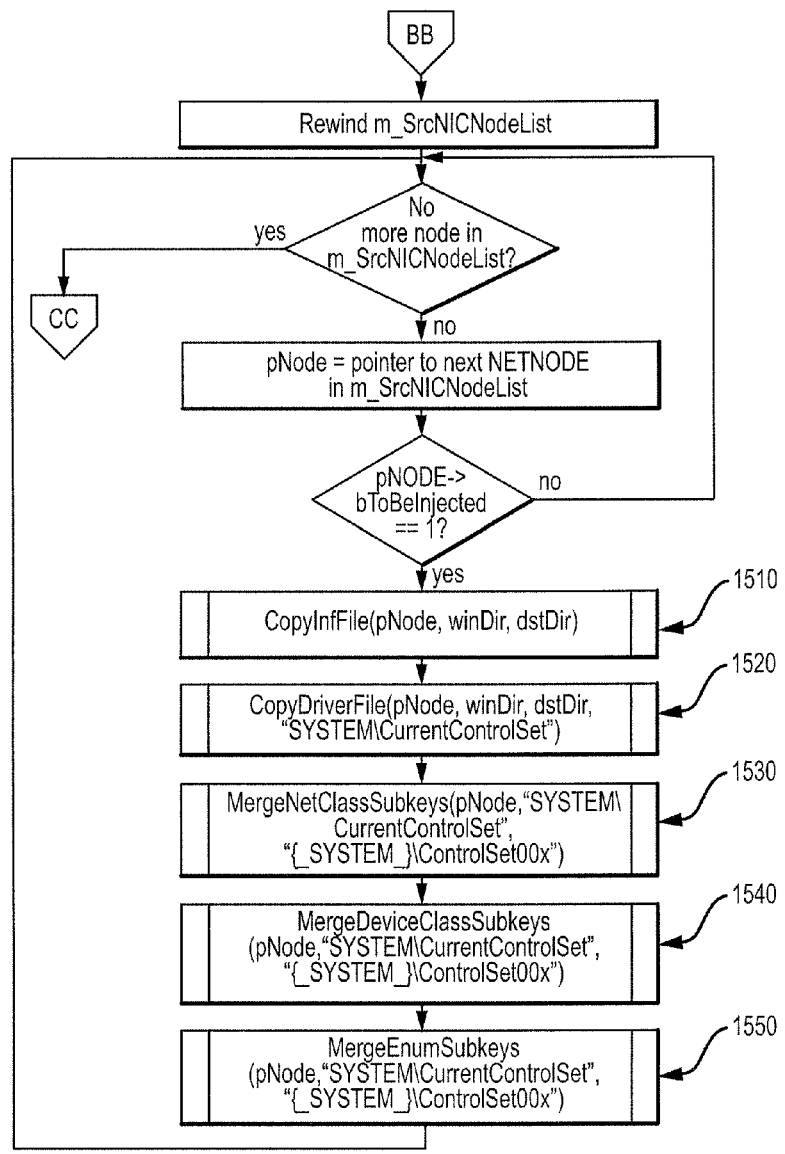
Figure 16:
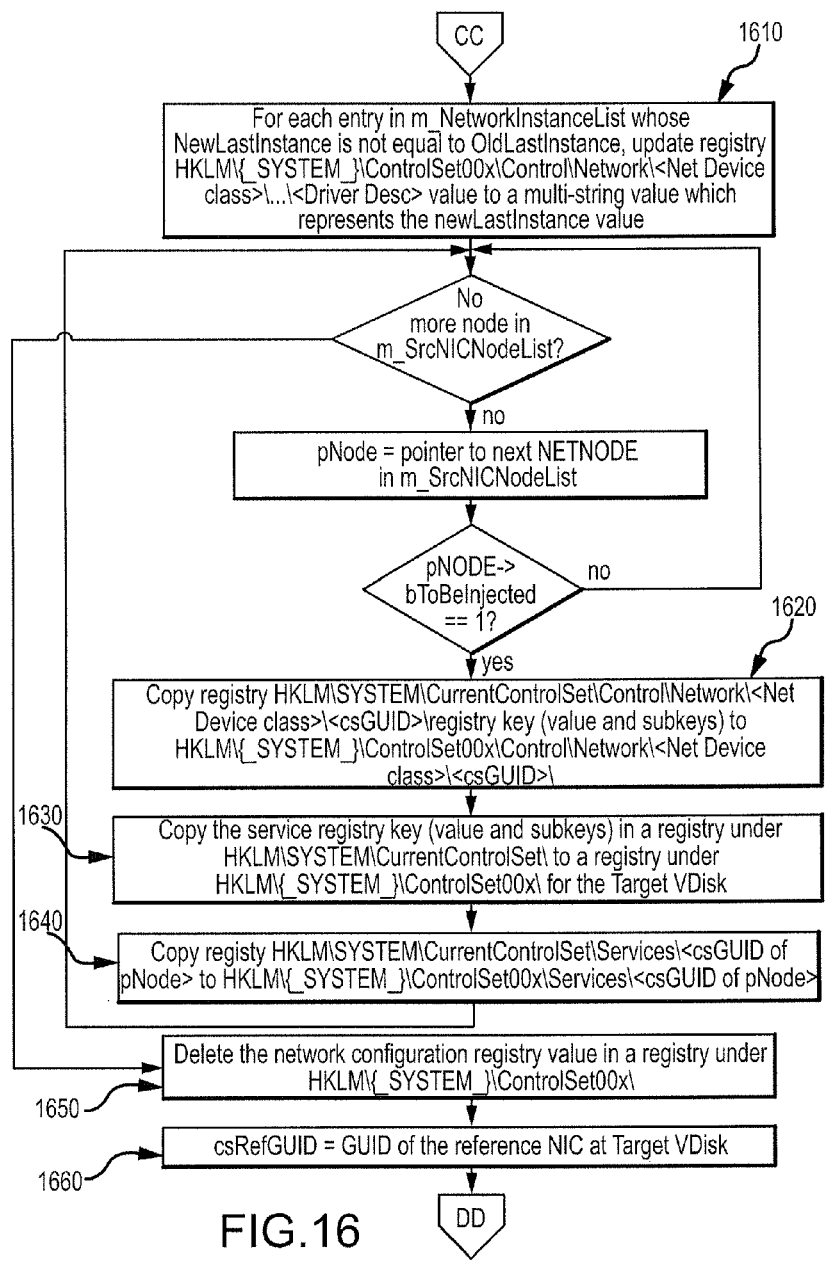
Figure 17:
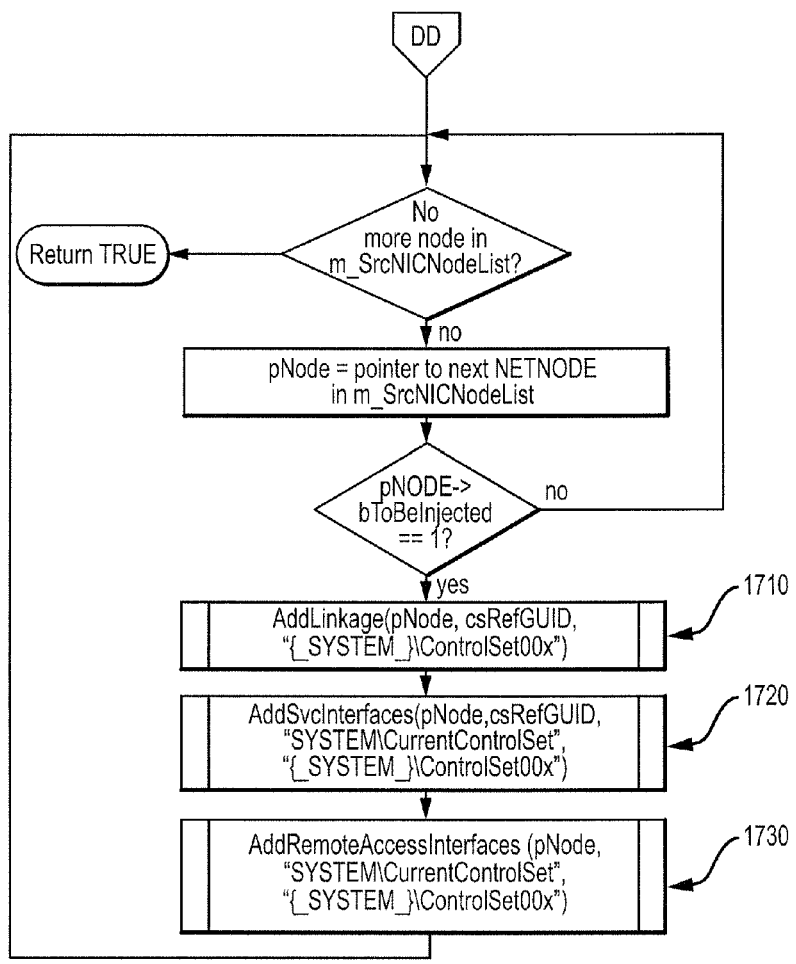

An example of the operation 1030 of FIG. 10 is illustrated as an operation 1410 of FIG. 14.

An example of the operations 1040 and 1050 of FIG. 10 is illustrated as operations 1420, 1430, 1440 and 1450 of FIG. 14. An example of the operation 1060 of FIG. 10 is illustrated as operations 1530, 1540, 1550, 1620, 1630 and 1640 of FIGS. 15 and 16. An example of the operation 1070 of FIG. 10 is illustrated as operations 1510 and 1520 of FIG. 15. An example of the operation 1080 of FIG. 10 is illustrated as an operation 1610 of FIG. 16. An example of the operation 1080 of FIG. 10 is illustrated as an operation 1650 of FIG. 16. An example of the operation 1090 of FIG. 10 is illustrated as an operation 1660 of FIG. 16 and operations 1710, 1720 and 1730 of FIG. 17.

In this example, the method provides a more detailed description of the InjectWSMNIC function (see, e.g., 1310 in FIG. 13, 1000 in FIG. 10, 770 in FIG. 7) when used on a Source Platform (e.g., 302 in FIG. 3, 400 in FIG. 4) utilizing a Windows OS. Now referring to FIGS. 12A and 13-17, the method may perform some or all of the following operations:

1. For each NIC driver (e.g., 1230A in FIG. 12A) in m_SrcNICNodeList, call FindUpper function to find the network component bound to its upper edge. This may be, for example, an OS streaming driver (e.g., 1220A in FIG. 12A). Call FindUpper again to find the network component bound to the OS streaming driver to its upper edge. This may be, for example, a packet scheduler driver (e.g., 1210A in FIG. 12B). Set bToBeInjected value to 1 for the NETNODE of all three network components, i.e., the NIC driver, the OS streaming driver, and the packet scheduler driver. Now information about all network components to be injected from the Source Platform to the Target VDisk has been determined. See operation 1320 in FIG. 13.

2. Call FindDeviceClassEntry for each to-be-injected NETNODE. See operation 1320 in FIG. 13.
3. Call FindLastSubKey to find the last subkey number of the Net Device class registry key of the Target VDisk, e.g., under the registry key path HKLM\{_SYSTEM_}\ ControlSet001\. See operation 1410 in FIG. 14. NETNODEs from the Source Platform may be injected into the Target VDisk using the next subkey number up. For example, it may be injected into a new subkey under the Net Device class registry of the system registry key, e.g., HKLM\{_SYSTEM_}\ControlSet00x, where x is the "Select" registry value 550 in FIG. 5.
4. For each to-be-injected NIC and its upper nodes in m_SrcNICNodeList:
   a. Call the AssignNewNetClassSubKey function to assign the NETCLASS subkey to be used by this NETNODE in the Target VDisk. See operation 1420 in FIG. 14.
   b. Call the AssignNewBusSpecificID function to assign the new bus specific ID to be used by this NETNODE in the Target VDisk. See operation 1430 in FIG. 14.
   c. Call the TallyNetworkDescriptionInstances function to keep track of the instance numbers of each NETNODE after it is injected into the Target VDisk. See operation 1440 in FIG. 14.
   d. Call the AssignNewInfPath function to set the csNewInfPath field. This is the name of its driver installation file after this NETNODE is injected into the Target VDisk. See operation 1450 in FIG. 14.
5. For each to-be-injected NIC and its upper nodes in m_SrcNICNodeList:
   a. Call the CopyInfFile function to copy a driver installation file from the Source Platform to the Target VDisk. See operation 1510 in FIG. 15. The driver installation file name may have been changed based on the operation 1450 of FIG. 14.
   b. Call the CopyDriverFile function to copy a driver binary from the Source Platform to the Target VDisk. See operation 1520 in FIG. 15. The driver file name is not changed.
   c. Call the MergeNetClassSubKeys function to merge the Net Device class registry key of the to-be-injected node from the Source Platform to the Target VDisk. See operation 1530 in FIG. 15. This operation may be based on the operations 1420 and 1450 of FIG. 14.
   d. Call the MergeDeviceClassSubKeys function to merge the NDIS LAN class registry key of the to-be-injected node from the Source Platform to the Target VDisk. See operation 1540 in FIG. 15. This operation may be based on the operation 1430 of FIG. 14.
   e. Call the MergeEnumSubKey function to merge the Enum registry key of the to-be-injected node from the Source Platform to the Target VDisk. See operation 1550 in FIG. 15. This operation may be based on the operation 1430 of FIG. 14.
6. Enumerate mNetworkInstanceList. For each entry whose NewLastInstance is not equal to OldLastInstance, update registry HKLM\{_SYSTEM_}\ControlSet00x\Control\ Network\<Net Device class>\ . . . \<Driver Desc> value to a multi-string value which represents the newLastInstance value (e.g., "1 2"->"1 2 3"). See operation 1610 in FIG. 16. This operation may be based on the operation 1440 of FIG. 14.

7. For each to-be-injected NIC node in m_SrcNICNodeList:
   a. Copy the registry HKLM\SYSTEM\CurrentControlSet\ Control\Network\<Net Device class>\<csGUID>\ registry key (value and subkeys) to HKLM\{_SYSTEM_}\ ControlSet00x\Control\Network\<Net Device class>\<csGUID>\. See operation 1620 in FIG. 16.
   b. Copy the service registry key (value and subkeys) from the Source Platform in a registry under the key path HKLM\SYSTEM\CurrentControlSet\, to a registry under the key path HKLM\{_SYSTEM_}\ ControlSet00x\ for the Target VDisk. See operation 1630 in FIG. 16.
   c. Copy the registry HKLM\SYSTEM\CurrentControlSet\ Services\<csGUID of pNode> to HKLM\ {_SYSTEM_}\ControlSet00x\Services\<csGUID of pNode>. See operation 1640 in FIG. 16.
   d. If <csService> key already exists in the Target VDisk (e.g., in a registry under the key path HKLM\{_SYSTEM_}\ControlSet00x\), no need to copy the key. This may be because the NIC already exists in the Target VDisk but is located on a different bus slot.

8. Delete the network configuration registry value in a registry under the key path HKLM\{_SYSTEM_}\ ControlSet00x\. See operation 1650 in FIG. 16. This is so that the operating system may recognize that changes have been made to the current system information of the Target VDisk. For example, the system registry file of the Target VDisk may have been changed. See operation 1650 in FIG. 16.

9. Prepare to insert new NIC driver GUIDs (from the Source Platform) onto the binding list of various protocol drivers and network services at the Target VDisk. First find an existing NIC driver from the Target VDisk as reference. For example, any NIC driver currently bound to an OS streaming driver in the Target VDisk can be a reference NIC driver. Set csRefGUID to be equal to the GUID of the reference NIC driver. See operation 1660 in FIG. 16.

10. For each to-be-injected NIC node in m_SrcNICNodeList:
    a. Call the AddLinkage function to add the NIC components from the Source Platform into a "linkage" registry key of various network services at the Target VDisk. See operation 1710 in FIG. 17.
    b. Call the AddSvcInterfaces function to add the NIC components from the Source Platform into a supported adapters or interfaces list of various network services at the Target VDisk. See operation 1720 in FIG. 17.
    c. Call the AddRemoteAccessInterfaces function to add the NIC components from the Source Platform into a supported interfaces list of the Remote Access Service at the Target VDisk. See operation 1730 in FIG. 17.

Upon completing the foregoing operations 9 and 10 described above, the following may occur. For example, referring to FIGS. 11 and 12, the NIC driver 1110A and/or a corresponding NIC component(s) 1110B (such as an OS streaming driver 1220A and a packet scheduler driver 1210A) injected from the Source Platform into the Target VDisk, can be made to bind to a corresponding protocol driver 1110C and a corresponding network service(s) 1160, based on the reference NIC driver.

Please note that a network component may be made to bind to another network component that is not immediately adjacent. For example, in FIG. 12A, a NIC driver 1230A may be made to bind to a packet scheduler driver 1210A. In FIG. 11, an NDIS miniport driver 1110A may be made to bind to a network service 1160 or an NDIS protocol driver 1110C.

Illustration of Machine-Readable Medium for Driver Injection and Streaming

The subject technology is illustrated, for example, according to various aspects described below. These are provided as examples, and do not limit the subject technology. The instructions and code for some aspects of the subject technology below are presented, for example, with reference to FIG. 18. The instructions and code for other aspects can be presented in a similar manner.

A machine-readable storage medium (e.g., 1800 in FIG. 18, or 410, 419 in FIG. 4) encoded with instructions (e.g., 1815 in FIG. 18) executable by a processing system (e.g., 402 in FIG. 4) to perform a method for providing network driver injection into a target image (e.g., 324 in FIG. 3) to transform the target image to be compatible with one or more source machines. The instructions comprising code for: facilitating access to a source system registry file of a source machine (e.g., 1805 in FIG. 18), facilitating access to a target system registry file of the target image, without copying the target image (e.g., 1810 in FIG. 18), wherein the target image comprises an operating system, determining whether one or more source network interface cards of the source machine are compatible with the target image (e.g., 1820 in FIG. 18), and if the one or more source network interface cards are not compatible with the target image, performing network interface driver injection (e.g., 1830 in FIG. 18). The operation of performing network interface driver injection comprises: determining one or more source network components associated with the one or more source network interface cards (e.g., 1830-A in FIG. 18), determining source network configuration of the one or more source network components (e.g., 1830-B in FIG. 18), determining target network configuration of one or more target network components of the target image (e.g., 1830-C in FIG. 18), determining whether the source network configuration conflicts with the target network configuration (e.g., 1830-D in FIG. 18), if the source network configuration conflicts with the target network configuration, adjusting the source network configuration so that the source network configuration does not conflict with the target network configuration (e.g., 1830-E in FIG. 18), and injecting, to the target system registry file, the source network configuration of the one or more source network components (e.g., 1830-F in FIG. 18).

The instructions may further comprise code for facilitating access to one or more files associated with the one or more source network components of the source machine, wherein the method is for facilitating operating system streaming over a network (e.g., 306 in FIG. 3). The operation of facilitating access to a target system registry file of the target image, without copying the target image, comprises: facilitating access to the target system registry file of the target image, without copying the target image onto a development machine, and wherein the operation of facilitating access to a source system registry file of a source machine, the operation of facilitating access to a target system registry file of the target image, the operation of determining, and the operation of performing network interface driver injection are to be performed by the development machine.

The instructions may further comprise code for: selecting at least one of the one or more target network components as a reference network component; determining a binding relationship between the reference network component and one or more network services for the target image; and establishing a binding relationship between at least one of the one or more source network components and the one or more network services.

The instructions may further comprise code for: determining whether an operating system of the source machine is compatible with an operating system of the target image and determining whether a hardware abstraction layer for the target image is lower than, or the same as, a hardware abstraction layer of the source machine. If the operating system of the source machine is compatible with the operating system of the target image and if the hardware abstraction layer for the target image is lower than, or the same as, the hardware abstraction layer of the source machine, performing the following operations: the operation of determining whether one or more source network interface cards of the source machine are compatible with the target image and if the one or more source network interface cards are not compatible with the target image, the operation of performing network interface driver injection.

The operation of performing network interface driver injection may further comprise facilitating copying of one or more files associated with the one or more source network components of the source machine onto the target image, wherein the target image is on a target machine, wherein the operation of determining one or more source network components associated with the one or more source network interface cards is to be performed, by a development machine, based solely on the source system registry file of the source machine, wherein the operation of determining source network configuration of the one or more source network components is to be performed, by the development machine, based on the source system registry file of the source machine and based on the one or more files associated with the one or more network components of the source machine, and wherein the operation of determining target network configuration of one or more target network components of the target image is to be performed, by the development machine, based on the target system registry file of the target image and based on one or more files associated with the one or more target network components of the target image.

The operation of facilitating access to a target system registry file of the target image, without copying the target image, may comprise facilitating mounting of the target image as a drive volume on a development machine, without copying the entire target image onto the development machine; and loading the target system registry file to a registry of the development machine, wherein the instructions further comprise code for: unloading the target system registry file from the registry of the development machine, after the operation of performing network interface driver injection; and facilitating unmounting of the target image from the development machine.

The instructions may further comprise code for facilitating streaming of the target image from a target machine to the source machine over a network.

The operation of facilitating access to a target system registry file of the target image, without copying the target image, may comprise facilitating copying, onto a development machine, of the target system registry file of the target image, without copying the entire target image onto the development machine and loading the target system registry file to a registry of the development machine. The instructions further may comprise code for: unloading the target system registry file from the registry of the development machine, after the operation of performing network interface driver injection and facilitating removal of the target system registry file from the development machine.

According to some aspects, the target image resides on a target machine, and the source machine is located remotely from the target machine over a network, wherein the one or more source network components comprises at least a network interface card driver and an operating system streaming driver, and wherein the target image is a virtual disk image.

According to some aspects, the operation of determining whether one or more source network interface cards of the source machine are compatible with the target image, comprises: determining one or more source network interface card drivers bound to one or more source operating system streaming drivers for the source machine; determining one or more target network interface card drivers bound to one or more target operating system streaming drivers for the target image; determining whether the one or more source network interface cards of the source machine are the same as the one or more target network interface cards for the target image, wherein the operation of determining whether one or more source network interface cards of the source machine are compatible with the target image, is to be performed based on the source system registry file and the target system registry file. The operation of determining whether the one or more source network interface cards of the source machine are the same as the one or more target network interface cards for the target image, may comprise determining whether a first one of the one or more source network interface cards and a first one of the one or more target network interface cards are from the same manufacturer, have the same model, have the same revision, and are for the same bus slot.

According to some aspects, the operation of determining one or more source network components associated with the one or more source network interface cards, comprises: determining an instance of a first source intermediate network driver bound to an upper edge of an instance of a source network interface card driver for one of the one or more source network interface cards and determining an instance of a second source intermediate network driver bound to an upper edge of the instance of the first source intermediate network driver. The one or more source network components may comprise the instance of the source network interface card driver, the instance of the first source intermediate network driver, and the instance of the second source intermediate network driver. The operation of determining source network configuration of the one or more source network components, may comprise determining, based on the source system registry file, a driver installation file name and location, a driver binary file name and location, a windows services name, and a global unique identifier, for each of the one or more source network components. The operation of, if the source network configuration conflicts with the target network configuration, adjusting the source network configuration, may comprise changing an installation file name, if a conflict exists with the installation file name; changing an instance index value, if a conflict exists with the instance index value; and determining instance numbers of the one or more source network components.

According to some aspects, the operation of performing network interface driver injection, further comprises: facilitating copying of one or more files associated with the one or more source network components of the source machine onto the target image, wherein the target image is on a target machine, wherein the operation of facilitating copying of one or more files, comprises: facilitating copying of one or more driver installation files associated with the one or more source network components of the source machine onto the target image; and facilitating copying of one or more driver binary files associated with the one or more source network components of the source machine onto the target image, wherein the operation of injecting, to the target system registry file, the source network configuration of the one or more source network components, comprises: facilitating copying of registry values of the source network configuration of the one or more source network components into the target system registry file; and updating registry values of the target system registry file.

According to some aspects, the development machine is the source machine.

According to some aspects, the operation of facilitating access to one or more files associated with the one or more source network components of the source machine, comprises: facilitating access to the one or more files associated with the one or more source network components of the source machine, without copying the one or more files onto the development machine.

According to some aspects, the operation of determining whether one or more source network interface cards of the source machine are compatible with the target image, comprises: facilitating selecting of the one or more source network interface cards of the source machine; determining whether the one or more source network interface cards of the source machine are the same as the one or more target network interface cards for the target image, wherein the operation of determining whether one or more source network interface cards of the source machine are compatible with the target image, is to be performed based on the source system registry file and the target system registry file, and wherein the operation of determining whether the one or more source network interface cards of the source machine are the same as the one or more target network interface cards for the target image, comprises: determining whether a first one of the one or more source network interface cards and a first one of the one or more target network interface cards are from the same manufacturer, have the same model, have the same revision, and are for the same bus slot.

Illustration of Method for Driver Injection and Streaming

The subject technology is illustrated, for example, according to various aspects described below. These are provided as examples, and do not limit the subject technology. The operations of the method for some aspects of the subject technology below are presented, for example, with reference to FIG. 19. The operations of the methods for the other aspects can be presented in a similar manner.

Some aspects of the subject technology relate to a method (e.g., 1900) for providing network driver injection into a target image (e.g., 324 in FIG. 3) to transform the target image to be compatible with one or more source machines. The method may comprise various operations (e.g., 1905, 1910, 1920, 1930-A, 1930-B, 1930-C, 1930-D, 1930-E, and 1930-F in FIG. 19) similar to those described with respect to FIG. 18.

Figure 18:
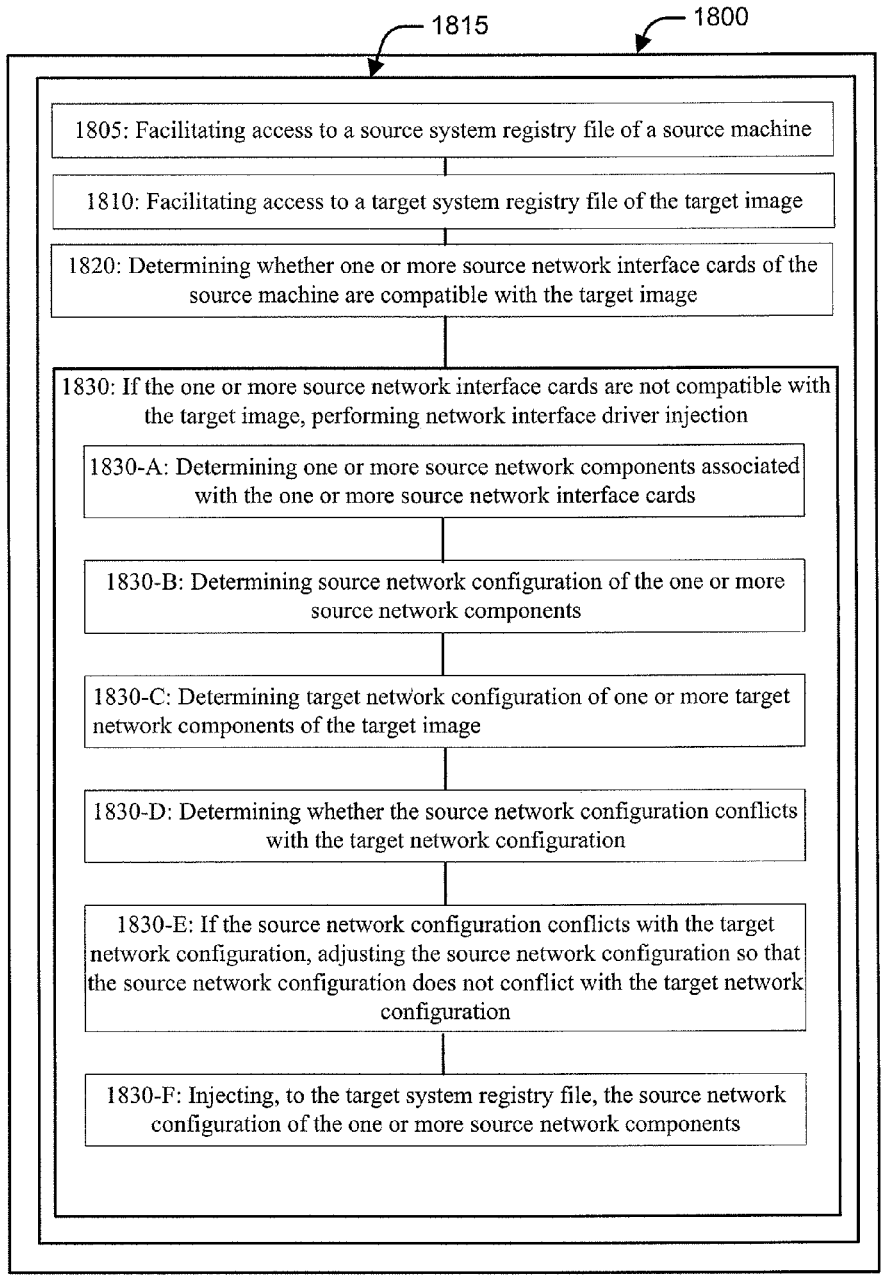
FIG. 18 is a conceptual block diagram illustrating an example of a hardware configuration for a machine-readable medium.
Figure 19:
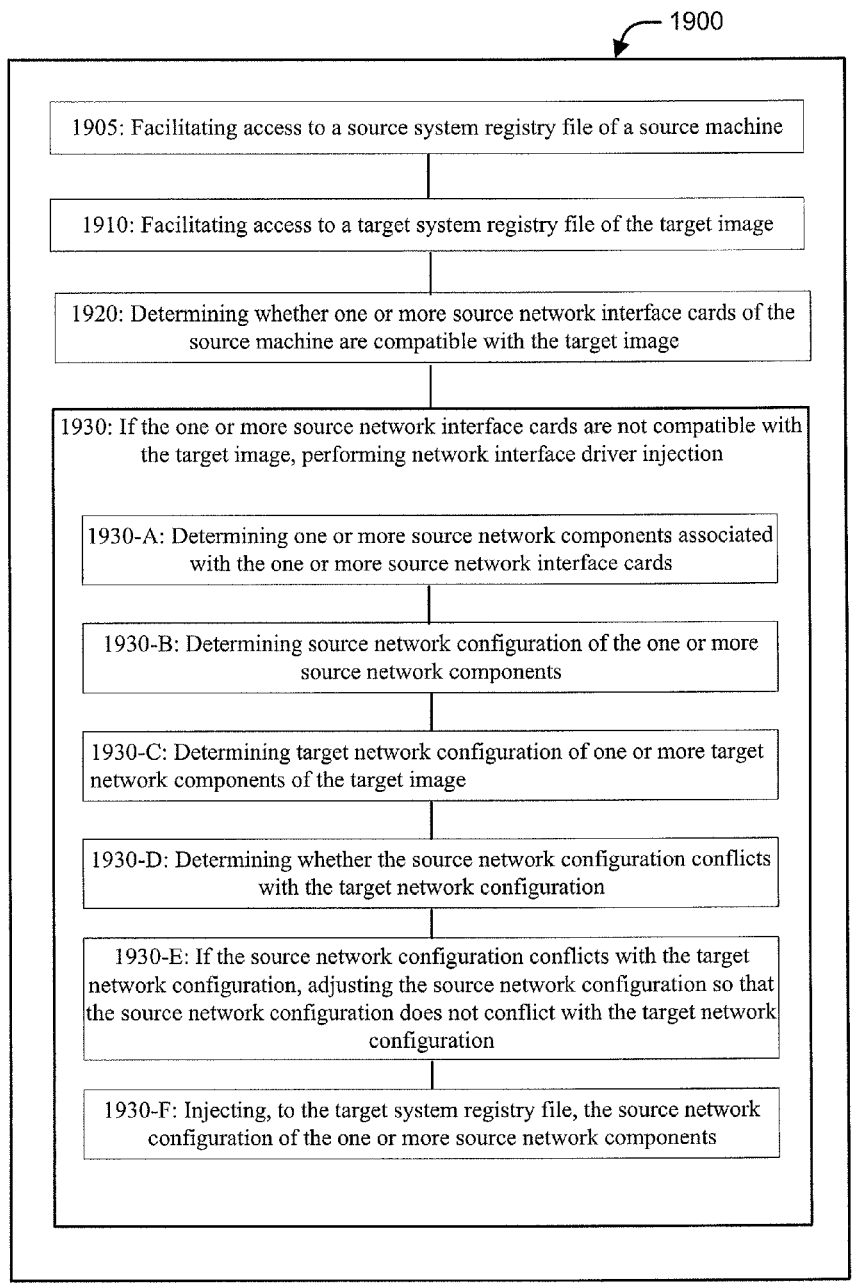
FIG. 19 is a conceptual flow diagram illustrating an example of a method for providing network driver injection.

The method may comprise other operations similar to those described in the foregoing paragraphs in connection with FIG. 18.

In one aspect, all of the operations described under the above subheading "Illustration of Method for Driver Injection and Streaming" are performed by the development machine (or the processing system of the development machine). In another aspect, at least some of the operations described under the above subheading are performed by the development machine (or the processing system of the development machine). A development machine may be a source machine or another machine.

Illustration of Apparatus for Driver Injection and Streaming

The subject technology is illustrated, for example, according to various aspects described below. These are provided as examples, and do not limit the subject technology. The instructions and code for aspects below are presented, for example, with reference to FIG. 20. The instructions and code for the other aspects can be presented in a similar manner.

Figure 20:
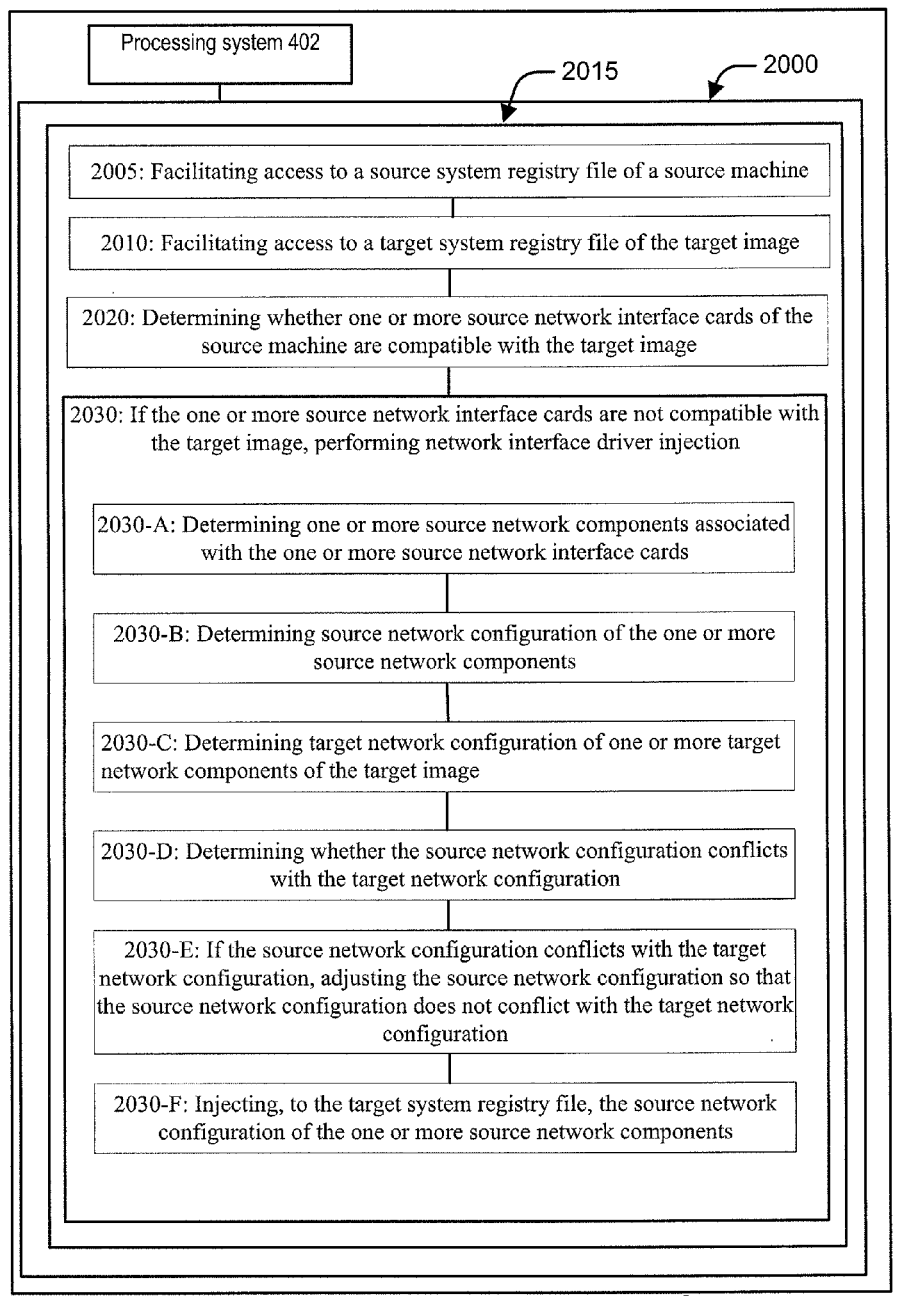
FIG. 20 is a conceptual block diagram illustrating an example of a hardware configuration of an apparatus.

Some aspects of the subject technology relate to an apparatus (e.g., 2090 in FIG. 20), comprising: a processing system (e.g., 402 in FIG. 4 or FIG. 20); and a machine-readable storage medium (e.g., 2000 in FIG. 20) encoded with instructions (e.g., 2015 in FIG. 20) executable by the processing system, wherein the instructions comprise code for performing various operations (e.g., 2010, 2020, 2030, 2030-A, 2030-B, 2030-C, 2030-D, 2030-E, and 2030-F in FIG. 20) similar to those described with respect to FIG. 18.

The instructions may comprise code for other operations similar to those described in the foregoing paragraphs in connection with FIG. 18.

Illustration of Means for Driver Injection and Streaming

The subject technology is illustrated, for example, according to various aspects described below. These are provided as examples, and do not limit the subject technology. The first aspect below is presented, for example, with reference to FIG. 21. The other aspects can be presented in a similar manner.

Figure 21:
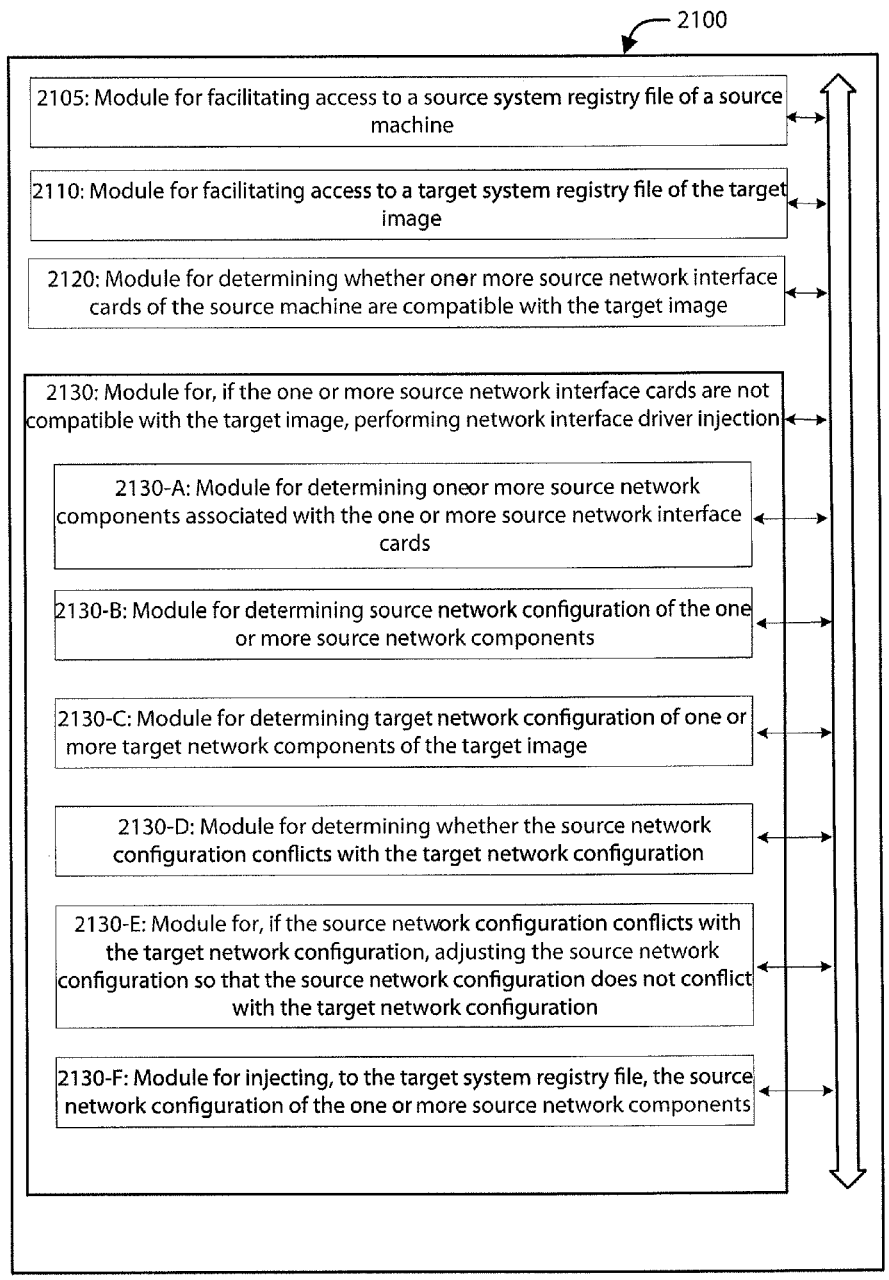
FIG. 21 is a conceptual block diagram illustrating an example of a hardware configuration of an apparatus.
Figure 22:
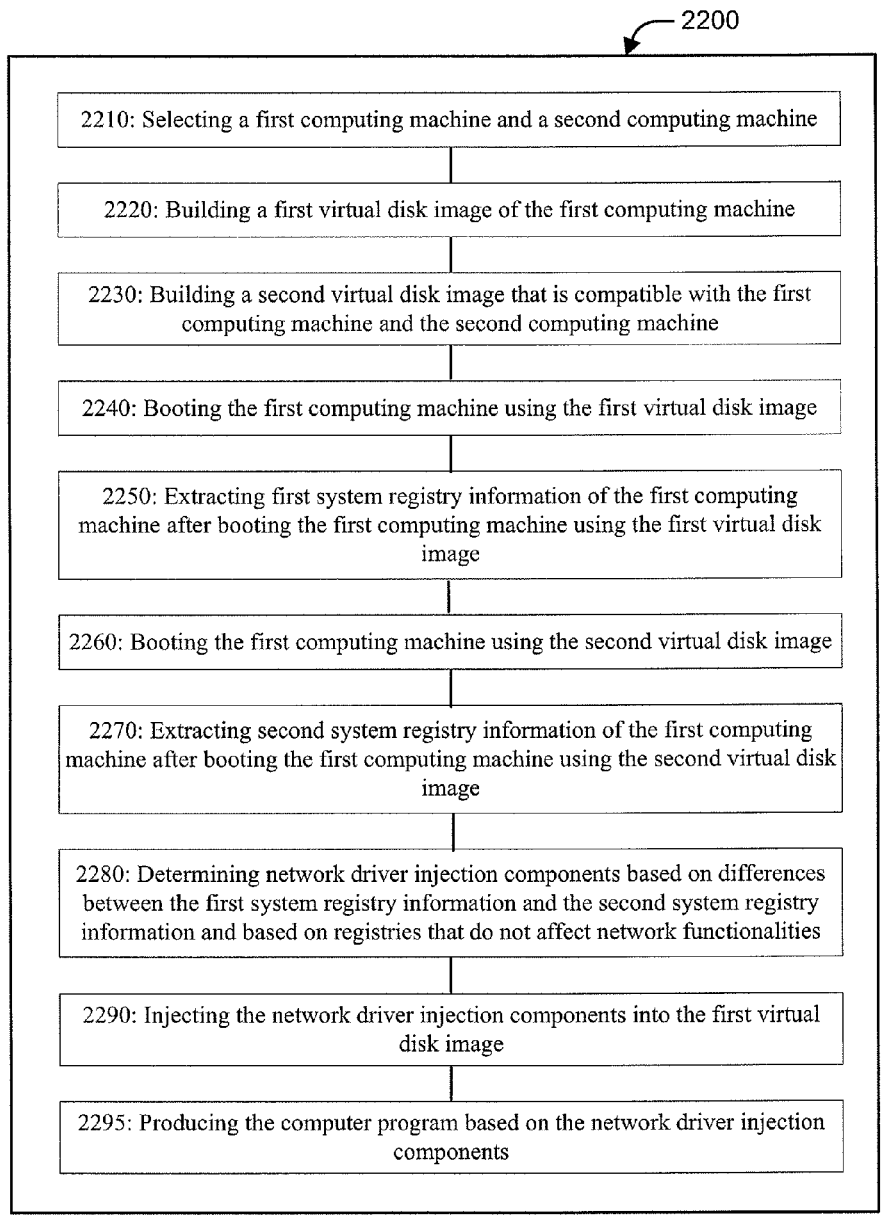
FIG. 22 is a conceptual flow diagram illustrating an example of a method of building a computer program for providing network driver injection.

The "means" described below may be implemented, for example, as modules as shown in FIG. 21. Modules may be implemented as electronic hardware, computer software, or combinations of both. Software modules may include computer program subroutines, functions or other software components that may be encoded onto a machine-readable medium or a machine-readable storage medium. Software modules may be executable by a processing system. Hardware modules may be implemented using one or more processors, one or more microcontrollers, one or more controllers, one or more Digital Signal Processors (DSPs), one or more Application Specific Integrated Circuits (ASICs), one or more Field Programmable Gate Arrays (FPGAs), one or more Programmable Logic Devices (PLDs), one or more state machines, one or more gated logic, one or more discrete hardware components, or any other suitable device(s) that can perform calculations or other manipulations of information. A hardware module may be implemented on one device or on multiple devices. Multiple hardware modules may be implemented on one device or on multiple devices.

Various aspects of the subject technology relate to an apparatus (e.g., 2100 in FIG. 21), comprising: means for performing various operations (e.g., 2105, 2110, 2120, 2130, 2130-A, 2130-B, 2130-C, 2130-D, 2130-E, and 2130-F in FIG. 21) similar to those described with respect to FIG. 18.

The apparatus may comprise means for performing other operations similar to those described in the foregoing paragraphs in connection with FIG. 18.

Illustration of Method of Building a Computer Program

The subject technology is illustrated, for example, according to various aspects described below. These are provided as examples, and do not limit the subject technology. The operations of the method for the first aspects below are presented, for example, with reference to FIG. 22. The operations of the methods for the other aspects can be presented in a similar manner.

Various aspects of the subject technology are related to a method (e.g., 2200 in FIG. 22) of building a computer program for providing network driver injection into a target image (e.g., 324 in FIG. 3) to transform the target image to be compatible with one or more computing machines, for facilitating operating system streaming over a network (e.g., 306 in FIG. 3), the method comprising: selecting a first computing machine and a second computing machine (e.g., 2210 in FIG. 22), wherein the first computing machine comprises a first network interface card, the second computing machine comprises a second network interface card, wherein configuration of the second network interface card is different from configuration of the first network interface card; building a first virtual disk image of the first computing machine (e.g., 2220 in FIG. 22); building a second virtual disk image that is compatible with the first computing machine and the second computing machine (e.g., 2230 in FIG. 22); booting the first computing machine using the first virtual disk image (e.g., 2240 in FIG. 22); extracting first system registry information of the first computing machine after booting the first computing machine using the first virtual disk image, the first system registry information comprising configuration values for the first network interface card based on the first virtual disk image (e.g., 2250 in FIG. 22); booting the first computing machine using the second virtual disk image (e.g., 2260 in FIG. 22); extracting second system registry information of the first computing machine after booting the first computing machine using the second virtual disk image, the second system registry information comprising configuration values for the first network interface card and the second network interface card based on the second virtual disk image; (e.g., 2270 in FIG. 22); determining network driver injection components based on differences between the first system registry information and the second system registry information and based on registries that do not affect network functionalities (e.g., 2280 in FIG. 22); injecting the network driver injection components into the first virtual disk image (e.g., 2290 in FIG. 22); and producing the computer program based on the network driver injection components (e.g., 2295 in FIG. 22).

According to one aspect, the method further comprises determining a registry injection pattern applicable to one or more other computing machines, before the operation of producing the computer program; and encoding the computer program onto a machine-readable storage medium, wherein the operation of producing the computer program based on the network driver injection components is based further on the registry injection pattern.

According to one aspect, the network driver injection components comprise registries and one or more files associated with network components of the second computing machine, wherein the operation of injecting network driver injection components into the first virtual disk image, comprises: injecting the registries of the network driver injection components into the first virtual disk image; injecting the one or more files associated with the network components into the first virtual disk image, wherein the operation of injecting the one or more files, comprises: injecting one or more driver installation files associated with the network components into the first virtual disk image; and injecting one or more driver binary files associated with the network components into the first virtual disk image.

According to one aspect, the configurations of the first and second network interface cards are different in at least one of the following attributes: a network interface card manufacturer, a network interface card model, a network interface card revision, or a bus slot for a network interface card.

According to one aspect, the operation of determining network driver injection components, comprises: determining a first set of registries, which is obtained from differences between registries of the first system registry information and registries of the second system registry information; and determining a second set of registries, obtained by filtering out a third set of registries from the a first set of registries, wherein the third set of registries comprises registries that do not affect network functionalities, wherein the network driver injection components comprise the second set of registries, wherein the operation of determining a second set of registries, comprises: determining a fourth set of registries by removing one or more registries of the first set of registries, from the registries of the second system registry information; booting the first computing machine using the second virtual disk image with the fourth set of registries without the one or more registries; booting the second computing machine using the second virtual disk image with the fourth set of registries without the one or more registries; determining whether the second virtual disk image having the fourth set of registries without the one or more registries is compatible with the first computing machine; determining whether the second virtual disk image having the fourth set of registries without the one or more registries is compatible with the second computing machine; and if the second virtual disk image having the fourth set of registries without the one or more registries is compatible with the first computing machine and if the second virtual disk image having the fourth set of registries without the one or more registries is compatible with the second computing machine, excluding the one or more registries from the second set of registries, and wherein the method further comprises: booting the first computing machine using the first virtual disk image with the network driver injection components; booting the second computing machine using the first virtual disk image with the network driver injection components; and determining whether the first virtual disk image with the network driver injection components is compatible with the first computing machine and the second computing machine.

Appendix Illustration of Driver Injection for One Example of Scenario

The disclosure provided under this subheading is simply one exemplary scenario and does not limit the subject technology.

Using Driver Injection to Create Golden Image

Overview

In one approach, a single virtual disk image may be streamed to multiple client devices as long as the devices have similar hardware characteristics. In this example, the mother board, the Preboot eXecution Environment (PXE) capable network card and the video card need to be the same.

According to another approach, a technique can facilitate creation of a "golden" virtual disk image to support multiple heterogeneous client platforms in which the mother board, network card or video card is different. The process involves first creating a hard disk OS installation containing all drivers for all source platforms, then installing a streaming component such as the WSM Client software, and finally capturing a snapshot of the OS installation to a virtual disk image.

In accordance with an aspect of the subject technology, the driver injection feature of the subject technology greatly shortens the time and procedures involved in creating a golden image. The disclosure in this subheading describes how to use driver injection to create a golden image to support client devices (e.g., Source Platforms) with heterogeneous hardware characteristics for one exemplary scenario.

Features for this Example of Scenario

1. In one aspect, each client platform needs to have a reference device with a PXE enabled network adapter and a hard disk available.
2. In one aspect, each reference device needs to have a Windows OS installed in its hard disk.
3. In one aspect, the Windows OS version installed on all reference devices needs to bear the same major version number. For example, Windows 2000, 2003 and XP have the same major Windows version number. Vista and Windows7 have another major Windows version number. Hence, the reference devices cannot have a mix between XP and Windows 7.
4. In one aspect, the final golden virtual disk image will have the lowest hardware abstraction layer (HAL) among all supported platforms. For example, if the native HAL for three source platforms are:
   Advanced Configuration and Power Interface (ACPI) PC
   ACPI Uniprocessor PC
   ACPI Multiprocessor PC,
   then the final golden VDisk will use the "Advanced Configuration and Power Interface (ACPI) PC" HAL.
5. In one aspect, depending on the source platforms' characteristics, the presence of a PS/2 mouse and a keyboard interface on the source platforms may be mandatory.
6. In one aspect, some wireless network adapters may need to be disabled on the golden VDisk.
7. In one aspect, Windows XP OS is used.
8. In one aspect, Wyse's streaming manager called WSM Server release 3.5 or above is used for the server or a target platform.
9. In one aspect, Wyse's streaming manager called WSM Client release 3.5 or above is installed on the source platforms' hard disks.

Process for this Example of Scenario

In one aspect, the driver injection to prepare a golden virtual disk for streaming may involve some or all of the following steps:
1. Prepare a VDisk for one of the source platforms (first platform). This is the "base" VDisk.
2. If the base VDisk is in private mode, make a back up copy.
3. Install WSM Client on a second source platform.
4. Boot the second source platform from hard disk, run VDiskImageCreation.exe to inject a NIC driver of the second source platform to the VDisk of the first platform.
5. Boot the second source platform from the VDisk.
6. Install the rest of the drivers for the second source platform to the VDisk.
7. If the base VDisk is in persistent or volatile cache mode, commit changes to the VDisk by merging a cache file for the second source platform into the VDisk.
8. Repeat steps 2 to 7 for each additional source platform.

Some Details for this Example of Scenario

Since many of the steps are standard operations, the disclosure under this subheading is focused on discussing the steps that are specific to the driver injection feature.

Selection of First Platform

The driver injection process starts with a VDisk for the first platform. In one aspect, the first platform needs to bear the lowest HAL among all source platforms. For example, if the native HAL for three source platforms are:

Advanced Configuration and Power Interface (ACPI) PC
ACPI Uniprocessor PC
ACPI Multiprocessor PC then the VDisk will use the "Advanced Configuration and Power Interface (ACPI) PC" HAL.

This "base" VDisk can be a new disk created from the first platform, or any existing VDisk streamable to the first platform.

Although it is suggested to start with a base VDisk that has latest WSM Client, this is not a requirement. One can use a VDisk created from older streaming manager releases.

The base VDisk may contain any number of partitions.

Cache Mode for Base VDisk

During the driver injection process, the base VDisk may be configured to private, persistent or volatile cache mode. However, using different cache modes has different implications:

1. If the base VDisk is in private mode, driver injection changes will be written to the VDisk directly. If there is any error during the injection process, the base VDisk may become unusable even for the original first platform. However, if the driver injection process succeeds, one can save the step to commit the driver injection changes to the base VDisk. It is hence recommended that if the base VDisk is in private mode, a backup copy of the base VDisk be made before starting driver injection.
2. If the base VDisk is in persistent cache mode, driver injection changes will be written to the cache file for the new device. If the driver injection fails, the cache file will be discarded automatically. If the driver injection succeeds, a user needs to commit the changes by merging the cache file to the base VDisk explicitly. Once the changes are committed, the cache file for the first platform will no longer be usable. This means any changes made on the first platform during the previous streaming sessions will be lost. If such changes are desirable, one needs to consider merging the cache file from the first platform to the base VDisk before driver injection.
3. If the base VDisk is in volatile cache mode, driver injection changes will be written to the cache file for the new device. By default such cache file will be discarded upon client device reboot. This nature of volatile cache mode makes it impossible to test the changes made by driver injection. Therefore, an exception has been made: If the driver injection is successful, the created cache file will be renamed to <cache file name>_TMPUSE automatically. A streaming server will use this TMPUSE cache file for subsequent streaming session of target device, and treat it as a persistent cache mode. Once the driver injection changes are confirmed working on the new device, the user needs to commit the changes by merging the TMPUSE cache file to the base VDisk explicitly, and then delete the TMPUSE cache file.

Injecting Driver

Figure 23A:
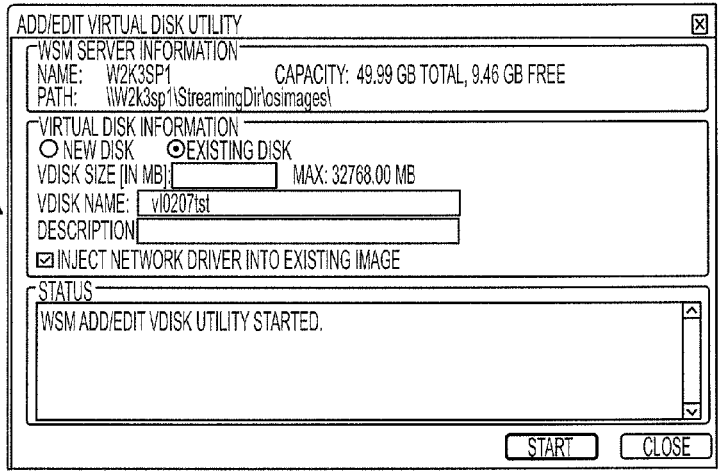
FIG. 23A illustrates an example of a screen shot of an Add/Edit Virtual Disk Utility dialog.
Figure 23B:
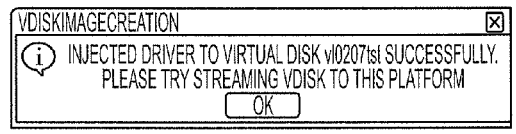
FIG. 23B illustrates an example of a screen shot of a VDiskImageCreation window.
Figure 23C:
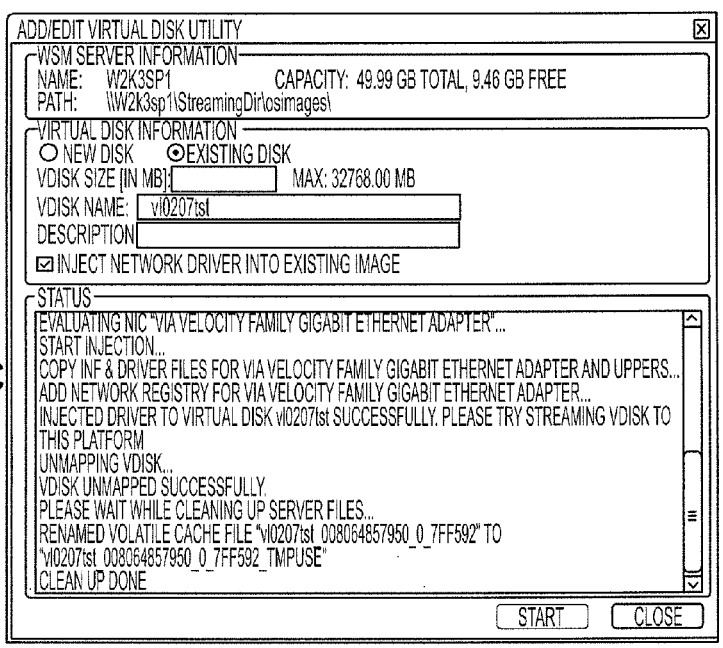
FIG. 23C illustrates an example of a screen shot of an Add/Edit Virtual Disk Utility dialog.

In one aspect, to inject an NIC driver of a device to a VDisk, the following exemplary steps may be utilized:

1. Install WSM Client 3.5 or above in the source platform.
2. Boot the source platform from hard disk.
3. Navigate Windows Explorer to "<WSM Client install folder>\OS" folder, run VDiskImageCreation.exe.
4. Select "Existing Disk", and enter the base VDisk name, check "inject Network Driver into Existing Image" If one desires to extend the VDisk size at the same time, fill in the VDisk Size field. Otherwise, leave this field blank. In one aspect, the VDisk needs to be in private mode for VDisk size adjustment to work. See FIG. 23A.
5. Once the driver injection is done, click "OK". See FIG. 23B.
6. Close Add/Edit Virtual Disk Utility dialog. See FIG. 23C.

Now the VDisk is ready to stream to the source platform.

Installing Additional Drivers

Once the source platform successfully boots from the "new" VDisk, Windows's hardware discovery wizard will prompt to install drivers for hardware found in the source platform. The drivers and corresponding .inf files can usually be found in the local hard disk.

Occasionally, the local hard disk volume is not assigned a driver letter. If this is the case, go to My Computer->Manage->Disk Manager, right click on local hard disk, select Change driver letter and Path, then Add a drive letter.

One can point the hardware installation wizard to the local disk drive (<local disk>:\windows\inf), which contains all the driver inf files. Driver binaries are usually under <local disk>:\windows\system32\drivers, <local disk>:\windows\system32, or <local disk>:\windows folders.

It is found that on some platforms, installing video and audio drivers from binaries found in local disk causes the display or audio hardware to malfunction. It is recommended that one install these drivers from complete driver installation packages provided by the hardware vendor if possible.

In order to install drivers for newly discovered hardware, one may need to use a keyboard and/or a mouse to select some menus from the hardware discovery wizard. If the Universal Serial Bus (USB) controller driver is not already installed on the VDisk, one will not be able to use the USB keyboard and mouse. Hence, it is recommended that a PS2 keyboard and mouse be attached to the platform when it first boots from the new VDisk. Once the USB controller driver is installed, the USB keyboard mouse can be used in subsequent boots. For a platform that does not have a PS2 keyboard/mouse interface, one may not be able to proceed with drivers installations.

In one aspect, it is recommend that a user does not try to upgrade the driver for the PXE enabled Ethernet network adapter. Doing so can cause a VDisk to hang. A driver upgrade for the PXE enabled Ethernet network adapter needs to be done before driver injection when the platform is booted from a hard disk.

Installing some wireless network drivers may cause network stack re-bind, which in turn may cause a VDisk to hang. If this is the case, one may need to roll back the driver injection changes by deleting the cache file for the target device, re-injecting the NIC driver to the VDisk, and disabling the wireless network adapter from the new VDisk. If wireless network adapter functionality is needed, one may need to use a traditional tool to create a golden VDisk.

Once all drivers are installed, reboot the device once to the new VDisk to confirm proper operation.

Committing Driver Injection changes to VDisk

In one aspect, if the VDisk is in persistent or volatile cache mode, once the VDisk is confirmed to work properly on the source platform, the changes made on the cache file may need to be committed to the VDisk itself. This can be done by merging the cache file for the source platform into the VDisk file.

Check Compatibility Between a Device and an Existing VDisk

When a VDisk is created through a normal image capturing process, it can be streamed to multiple devices bearing the same hardware characteristics as the original device from where the VDisk was captured. However, in some cases, even if a device looks the same (e.g., the same model from the same manufacturer) as the original device, streaming may fail. This is because the network card between the two devices may have slightly different revision number, or may be located on a different PCI slot. These subtle differences between the network cards can cause the VDisk to fail in booting. When attempting to stream a device from an incompatible VDisk, a device typically hangs at Windows boot up progress bar.

In the past, a user did not realize the incompatibility until actually streaming the VDisk to a target device. WSM 3.5 introduces a tool to detect compatibility between an existing VDisk and a device. This tool may be especially useful in large streaming deployment where thousands of client devices from the same manufacturing model are used. It is often impractical to find out that a VDisk is not compatible with some client devices at branch offices after the VDisk has been qualified and deployed from the headquarters.

This tool can be run on a device without installing the streaming software WSM Client. It may take one input parameter: a path to the system hive file of the VDisk. It generates a log file showing the compatibility check result. Below describes some typical steps to use this tool in a large scale streaming deployment scenario:

In one aspect, at the headquarters, perform the following:
1. On any desktop, install WSMClient and WSMClientUtilities (version 3.5 or above). Create a temporary folder called "CheckCompat"
2. Run VDiskImageMap.exe to map to the VDisk against whose compatibility is to be checked.
3. Copy the system registry hive file of the VDisk to the CheckCompat folder on the client desktop. (e.g., copy <vdisk drive>:\windows\system32\config\system c:\temp\checkcompat\system).
4. Unmap Vdisk.
5. Copy three binaries, OSMCheckCompat.exe, SelectNIC.exe and OSMComCls.dll from <WSM client utilities install folder> to the CheckCompat folder.
6. The CheckCompat folder now contains four files: system, OSMCheckCompat.exe, SelectNIC.exe and OSMComCls.dll. Zip up CheckCompat folder and send it to all branch offices.

In one aspect, at the branch offices, perform the following on each client device:
1. Unzip checkcompat.zip.
2. From the command window, change the directory to the checkcompat folder.
3. Run "OSMCheckcompat.exe system".
4. If a device has multiple network adapters, a user will be prompted to select the NIC to be used for streaming.
5. If a device has only one network adapter, simply click the "OK" button when the selectNIC finishes detecting the NIC.
6. Send the resulting log file to the headquarters for analysis.

Below are last few lines from some sample log file:

---
sample 1: device and VDisk are compatible
04072010 [19:00:38:312] [ 244] INFO: !!!!!!!!!!!!!!!!!!!!!!!!!!!!!!!!!!!!
04072010 [19:00:38:312] [ 244] INFO: COMPUTER NAME : mlam-c.wsm3.local
04072010 [19:00:38:312] [ 244] INFO: OSMCheckCompat SUCCEEDED. Incompatible NIC count : 0
04072010 [19:00:38:312] [ 244] INFO: !!!!!!!!!!!!!!!!!!!!!!!!!!!!!!!!!!!!
OR
sample 2: device and VDisk are incompatible. There is one NIC to be injected to VDisk
04072010 [19:00:01:812] [ 264] INFO: !!!!!!!!!!!!!!!!!!!!!!!!!!!!!!!!!!!!
04072010 [19:00:01:812] [ 264] INFO: COMPUTER NAME : mlam-c.wsm3.local
04072010 [19:00:01:812] [ 264] INFO: OSMCheckCompat SUCCEEDED. Incompatible NIC count : 1 >>
04072010 [19:00:01:812] [ 264] INFO: VIA Velocity Family Gigabit Ethernet Adapter
04072010 [19:00:01:812] [ 264] INFO: Enum\PCI\VEN_1106&DEV_3119&SUBSYS_01101106&REV_11\4&eedbbf7&0&1898
04072010 [19:00:01:812] [ 264] INFO: !!!!!!!!!!!!!!!!!!!!!!!!!!!!!!!!!!!!
OR
sample 3: device and VDisk are incompatible. VDisk cannot be used on such device
04072010 [19:10:51:046] [1604] INFO: !!!!!!!!!!!!!!!!!!!!!!!!!!!!!!!!!!!!
04072010 [19:10:51:046] [1604] INFO: COMPUTER NAME : mlam-c.wsm3.local
04072010 [19:10:51:046] [1604] ERROR: OSMCheckCompat FAILED
04072010 [19:10:51:046] [1604] ERROR: Mismatch OS Version between current platform and VDisk
04072010 [19:10:51:046] [1604] INFO: !!!!!!!!!!!!!!!!!!!!!!!!!!!!!!!!!!!!
---

In one aspect, at the Headquarters, the following may be performed:
1. Parse the log files (via script or manual), identify the client devices that need to perform driver injection on. The line "Enum\PCI\VEN_1106&DEV_3119&SUBSYS_01101106&REV_11\4&eedbbf7&0&1898" identifies the "ID" of the incompatible NIC. In one aspect, if multiple client devices have the exact same NIC ID, driver injection only needs to be performed on one of those client devices. Resulting VDisk will be compatible to the whole "group".
2. Perform driver injection on each of the incompatible client device "group" one by one.

OSMCheckCompat.exe Command Line Options:

---
OSMCheckCompat.exe <VDisk system registry file name> [/l<log file name>] [/v<log level in hex>] [/?]
where /? - display usage;
    <log level in hex> follows bit mask defined in OSMLogging.h, i.e.
        ERRORS_ONLY = 0x01;

```
        WARNINGS_ONLY = 0x02;
        DEBUG_ONLY   = 0x04;
        VERBOSE_ONLY = 0x08;
        INFO_ONLY    = 0x10;
if no path is specified for system registry file or log file, the path from where program
currently runs will be used
e.g., OSMCheckCompat.exe c:\temp\system /lcheckcompat.log /l0x17
above command checks compatibility between current device and the c:\temp\system registry,
it
outputs INFO+ERRORS+WARNINGS+DEBUG messages to checkcompat.log at current
folder
Program exits with code −1 if fails
        with code 0 if all NICs are compatible with VDisk
        with code > 0 where code is the number of NIC(s) that is not compatible with
        VDisk
```

Running OSMCheckCompat when WSM Client is Installed: Although OSMCheckCompat.exe can be run on a system without installing WSM Client, it can also be run on a system after installing WSM Client. In one aspect, use the following steps:

1. On a device that has any version of WSM Client installed, install WSM Client Utilities version 3.5 or above.
2. Use VDiskImageMap.exe to map to the VDisk against which compatibility is to be checked.
3. From the command window, run OSMCheckCompat.exe, and provide the full path to the system hive file of Target VDisk. (e.g., "c:\program files\Wyse\WSM Client Utilities\OSMCheckCompat.exe e: \Windows\System32\Config\system")

Closing Subheading

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology. For example, the specific orders of operations may be rearranged, and some or all of the components may be partitioned in a different way.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, a file may include one or more files. Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A non-transitory machine-readable storage medium encoded with instructions executable by a processing system to perform a method for providing network driver injection into a target image to transform the target image to be compatible with one or more source machines, the instructions comprising code for: facilitating access to a source system registry file of a source machine, without copying a source image; facilitating access to a target system registry file of a target machine, without copying the target image, wherein the target image comprises an operating system; determining whether one or more source network interface cards of the source machine are compatible with the target image; and if the one or more source network interface cards are not compatible with the target image, performing network interface driver injection, wherein the operation of performing network interface driver injection comprises: determining one or more source network components associated with the one or more source network interface cards; determining source network configuration of the one or more source network components; determining target network configuration of one or more target network components of the target image; determining whether the source network configuration conflicts with the target network configuration; if the source network configuration conflicts with the target network configuration, adjusting the source network configuration so that the source network configuration does not conflict with the target network configuration; and injecting, to the target system registry file, the source network configuration of the one or more source network components.

2. The machine-readable storage medium of claim 1, wherein the instructions further comprise code for: facilitating access to one or more files associated with the one or more source network components of the source machine, wherein the method is for facilitating operating system streaming over a network, wherein the operation of facilitating access to the target system registry file of the target machine, without copying the target image, comprises: facilitating access to the target system registry file of the target image, without copying the target image onto a development machine, and wherein the operation of facilitating access to the source system registry file of the source machine, the operation of facilitating access to the target system registry file of the target image, the operation of determining whether one or more source network interface cards of the source machine are compatible with the target image, and the operation of performing network interface driver injection are performed by the development machine.

3. The machine-readable storage medium of claim 1, wherein the instructions further comprise code for: selecting at least one of the one or more target network components as a reference network component; determining a binding relationship between the reference network component and one or more network services for the target image; and establishing a binding relationship between at least one of the one or more source network components and the one or more network services.

4. The machine-readable storage medium of claim 1, wherein the instructions further comprise code for: determining whether an operating system of the source machine is compatible with an operating system of the target image; and determining whether a hardware abstraction layer for the target image is lower than, or the same as, a hardware abstraction layer of the source machine; and if the operating system of the source machine is compatible with the operating system of the target image and if the hardware abstraction layer for the target image is lower than, or the same as, the hardware abstraction layer of the source machine, performing the following operations: the operation of determining whether one or more source network interface cards of the source machine are compatible with the target image; and if the one or more source network interface cards are not compatible with the target image, the operation of performing network interface driver injection.

5. The machine-readable storage medium of claim 1, wherein the operation of performing network interface driver injection, further comprises: facilitating copying of one or more files associated with the one or more source network components of the source machine onto the target image, wherein the target image is on the target machine, wherein the operation of determining one or more source network components associated with the one or more source network interface cards is to be performed, by a development machine, based solely on the source system registry file of the source machine, wherein the operation of determining source network configuration of the one or more source network components is to be performed, by the development machine, based on the source system registry file of the source machine and based on the one or more files associated with the one or more network components of the source machine, and wherein the operation of determining target network configuration of one or more target network components of the target image is to be performed, by the development machine, based on the target system registry file of the target image and based on one or more files associated with the one or more target network components of the target image.

6. The machine-readable storage medium of claim 1, wherein the operation of facilitating access to the target system registry file of the target machine, without copying the target image, comprises: facilitating mounting of a the target image as a drive volume on a development machine, without copying the entire target image onto the development machine; and loading the target system registry file to a registry of the development machine, wherein the instructions further comprise code for: unloading the target system registry file from the registry of the development machine, after the operation of performing network interface driver injection; and facilitating unmounting of the target image from the development machine.

7. The machine-readable storage medium of claim 1, wherein the instructions further comprise code for: facilitating streaming of the target image from the target machine to the source machine over a network.

8. The machine-readable storage medium of claim 1, wherein the operation of facilitating access to the target system registry file of the target image, without copying the target image, comprises: facilitating copying, onto a development machine, of the target system registry file of the target image, without copying the entire target image onto the development machine; and loading the target system registry file to a registry of the development machine, wherein the instructions further comprise code for: unloading the target system registry file from the registry of the development machine, after the operation of performing network interface driver injection; and facilitating removal of the target system registry file from the development machine.

9. The machine-readable storage medium of claim 1, wherein the target image resides on the target machine, and the source machine is located remotely from the target machine over a network, wherein the one or more source network components comprises at least a network interface card driver and an operating system streaming driver, and wherein the target image is a virtual disk image.

10. The machine-readable storage medium of claim 1, wherein the operation of determining whether one or more source network interface cards of the source machine are compatible with the target image, comprises: determining one or more source network interface card drivers bound to one or more source operating system streaming drivers for the source machine; determining one or more target network interface card drivers bound to one or more target operating system streaming drivers for the target image; determining whether the one or more source network interface cards of the source machine are the same as the one or more target network interface cards for the target image, wherein the operation of determining whether one or more source network interface cards of the source machine are compatible with the target image, is to be performed based on the source system registry file and the target system registry file, and wherein the operation of determining whether the one or more source network interface cards of the source machine are the same as the one or more target network interface cards for the target image, comprises: determining whether a first one of the one or more source network interface cards and a first one of the one or more target network interface cards are from the same manufacturer, have the same model, have the same revision, and are for the same bus slot.

11. The machine-readable storage medium of claim 1, wherein: the operation of determining one or more source network components associated with the one or more source network interface cards, comprises: determining an instance of a first source intermediate network driver bound to an upper edge of an instance of a source network interface card driver for one of the one or more source network interface cards; and determining an instance of a second source intermediate network driver bound to an upper edge of the instance of the first source intermediate network driver, the one or more source network components comprise the instance of the source network interface card driver, the instance of the first source intermediate network driver, and the instance of the second source intermediate network driver, the operation of determining source network configuration of the one or more source network components, comprises: determining, based on the source system registry file, a driver installation file name and location, a driver binary file name and location, a windows services name, and a global unique identifier, for each of the one or more source network components, and the operation of, if the source network configuration conflicts with the target network configuration, adjusting the source network configuration, comprises: changing an installation file name, if a conflict exists with the installation file name; changing an instance index value, if a conflict exists with the instance index value; and determining instance numbers of the one or more source network components.

12. The machine-readable storage medium of claim 1, wherein: the operation of performing network interface driver injection, further comprises facilitating copying of one or more files associated with the one or more source network components of the source machine onto the target image, wherein the target image is on a target machine; the operation of facilitating copying of one or more files, comprises: facilitating copying of one or more driver installation files associated with the one or more source network components of the source machine onto the target image; and facilitating copying of one or more driver binary files associated with the one or more source network components of the source machine onto the target image; and the operation of injecting, to the target system registry file, the source network configuration of the one or more source network components, comprises: facilitating copying of registry values of the source network configuration of the one or more source network components into the target system registry file; and updating registry values of the target system registry file.

13. The machine-readable storage medium of claim 2, wherein the development machine is the source machine.

14. The machine-readable storage medium of claim 2, wherein the operation of facilitating access to one or more files associated with the one or more source network components of the source machine, comprises: facilitating access to the one or more files associated with the one or more source network components of the source machine, without copying the one or more files onto the development machine.

15. The non-transitory machine-readable storage medium of claim 1, wherein: the operation of determining whether one or more source network interface cards of the source machine are compatible with the target image, comprises: facilitating selecting of the one or more source network interface cards of the source machine; and determining whether the one or more source network interface cards of the source machine are the same as the one or more target network interface cards for the target image; wherein the operation of determining whether one or more source network interface cards of the source machine are compatible with the target image, is performed based on the source system registry file and the target system registry file; and the operation of determining whether the one or more source network interface cards of the source machine are the same as the one or more target network interface cards for the target image, comprises: determining whether a first one of the one or more source network interface cards and a first one of the one or more target network interface cards are from the same manufacturer, have the same model, have the same revision, and are for the same bus slot.

16. A method for providing network driver injection into a target image to transform the target image to be compatible with one or more source machines, the method comprising: facilitating access to a source system registry file of a source machine; facilitating access to a target system registry file of a target machine, without copying a target image, wherein the target image comprises an operating system; determining whether one or more source network interface cards of the source machine are compatible with the target image; and if the one or more source network interface cards are not compatible with the target image, performing network interface driver injection, wherein the operation of performing network interface driver injection comprises: determining one or more source network components associated with the one or more source network interface cards; determining source network configuration of the one or more source network components; determining target network configuration of one or more target network components of the target image; determining whether the source network configuration conflicts with the target network configuration; if the source network configuration conflicts with the target network configuration, adjusting the source network configuration so that the source network configuration does not conflict with the target network configuration; and injecting, to the target system registry file, the source network configuration of the one or more source network components.

17. An apparatus, comprising: a processing system; and a non-transitory machine-readable storage medium encoded with instructions executable by the processing system, wherein the instructions comprise code for: facilitating access to a source system registry file of a source machine; facilitating access to a target system registry file of a target machine, without copying a target image, wherein the target image comprises an operating system; determining whether one or more source network interface cards of the source machine are compatible with the target image; and if the one or more source network interface cards are not compatible with the target image, performing network interface driver injection, wherein the operation of performing network interface driver injection comprises: determining one or more source network components associated with the one or more source network interface cards; determining source network configuration of the one or more source network components; determining target network configuration of one or more target network components of the target image; determining whether the source network configuration conflicts with the target network configuration; if the source network configuration conflicts with the target network configuration, adjusting the source network configuration so that the source network configuration does not conflict with the target network configuration; and injecting, to the target system registry file, the source network configuration of the one or more source network components.

* * * * *